(12) United States Patent
Sakaguchi et al.

(10) Patent No.: US 10,946,891 B2
(45) Date of Patent: Mar. 16, 2021

(54) ELECTRIC POWER STEERING APPARATUS

(71) Applicant: NSK Ltd., Tokyo (JP)

(72) Inventors: Toru Sakaguchi, Maebashi (JP); Shoya Maruyama, Tokyo (JP)

(73) Assignee: NSK LTD., Tokyo (JP)

(*) Notice: Subject to any disclaimer, the term of this patent is extended or adjusted under 35 U.S.C. 154(b) by 0 days.

(21) Appl. No.: 16/333,356

(22) PCT Filed: Mar. 6, 2018

(86) PCT No.: PCT/JP2018/008467
§ 371 (c)(1),
(2) Date: Mar. 14, 2019

(87) PCT Pub. No.: WO2018/190036
PCT Pub. Date: Oct. 18, 2018

(65) Prior Publication Data
US 2020/0385052 A1 Dec. 10, 2020

(30) Foreign Application Priority Data

Apr. 12, 2017 (JP) .............................. JP2017-078907
Dec. 6, 2017 (JP) .............................. JP2017-234074

(51) Int. Cl.
*B62D 5/04* (2006.01)
*B62D 3/12* (2006.01)
*B62D 6/00* (2006.01)

(52) U.S. Cl.
CPC ......... *B62D 5/0463* (2013.01); *B62D 5/0469* (2013.01); *B62D 6/008* (2013.01)

(58) Field of Classification Search
CPC .. B62D 5/0424; B62D 5/0463; B62D 5/0466; B62D 5/0469; B62D 5/0487; B62D 6/08
See application file for complete search history.

(56) References Cited

U.S. PATENT DOCUMENTS

2013/0151081 A1* 6/2013 Delarche .............. B62D 5/0493
701/42
2016/0221601 A1* 8/2016 Barthomeuf ............ B60R 25/02
(Continued)

FOREIGN PATENT DOCUMENTS

JP 2006-341657 A 12/2006
JP 2009-179229 A 8/2009
(Continued)

OTHER PUBLICATIONS

International Search Report of PCT/JP2018/008467 dated Jul. 31, 2018 [PCT/ISA/210].
(Continued)

*Primary Examiner* — Peter D Nolan
*Assistant Examiner* — Ce Li Li
(74) *Attorney, Agent, or Firm* — Sughrue Mion, PLLC

(57) ABSTRACT

An electric power steering apparatus that suppresses occurrence of an abnormal noise at end hitting without providing uncomfortable feeling of steering for a driver, attenuates impact force, and enables suppression of the abnormal noise without making a turning radius worse. The apparatus includes a viscoelastic model following control section that sets a viscoelastic model as a reference model within a predetermined range in front of a rack end, and outputs a control output to correct a current command value; and a rack end approach judging section that performs judgment of being in the predetermined range in front of the rack end based on steering position information; adjusts the control output based on at least the steering position information, a steering velocity and a steering state, and corrects the current command value by the adjusted control output.

36 Claims, 36 Drawing Sheets

(56) References Cited

U.S. PATENT DOCUMENTS

| | | | | |
|---|---|---|---|---|
| 2016/0221605 A1* | 8/2016 | Pregniard | .......... | B62D 15/0235 |
| 2016/0280255 A1* | 9/2016 | Wilhelm | .............. | B62D 5/0463 |
| 2017/0297613 A1* | 10/2017 | Sakaguchi | ............... | B62D 6/08 |
| 2017/0327144 A1* | 11/2017 | Sakaguchi | ........... | B62D 5/0463 |
| 2017/0327145 A1* | 11/2017 | Sakaguchi | ........... | B62D 5/0469 |
| 2017/0334481 A1* | 11/2017 | Sakaguchi | ........... | B62D 5/0469 |
| 2018/0194389 A1* | 7/2018 | Imamura | .............. | B62D 5/0469 |

FOREIGN PATENT DOCUMENTS

| | | |
|---|---|---|
| JP | 2016-124337 A | 7/2016 |
| WO | 2016/104568 A1 | 6/2016 |
| WO | 2016/104571 A1 | 6/2016 |

OTHER PUBLICATIONS

International Preliminary Report on Patentability of PCT/JP2018/008467 dated Oct. 16, 2018 [PCT/IPEA/409].

* cited by examiner

PRIOR ART

ELECTRIC POWER STEERING APPARATUS

CROSS REFERENCE TO RELATED APPLICATIONS

This application is a National Stage of International Application No. PCT/JP2018/008467, filed Mar. 6, 2018, claiming priorities to Japanese Patent Application Nos. 2017-078907, filed Apr. 12, 2017 and 2017-234074, filed Dec. 6, 2017.

TECHNICAL FIELD

The present invention relates to an electric power steering apparatus that calculates a current command value based on at least a steering torque, drives a motor based on the current command value, and provides a steering system of a vehicle with an assist force, in particular to an electric power steering apparatus that sets a viscoelastic model as a reference model, reduces the assist force by reducing the current command value in the vicinity of a rack end, lowers impact energy by attenuating power at end hitting, suppresses a hitting sound (an abnormal noise) which a driver feels unpleasant, and improves steering feeling.

BACKGROUND ART

An electric power steering apparatus (EPS) which provides a steering system of a vehicle with an assist force by means of a rotational torque of a motor, applies a driving force of the motor as the assist force to a steering shaft or a rack shaft by means of a transmission mechanism such as gears or a belt through a reduction mechanism. In order to accurately generate the assist force, such a conventional electric power steering apparatus performs a feedback control of a motor current. The feedback control adjusts a voltage supplied to the motor so that a difference between a current command value and a detected motor current value becomes small, and the adjustment of the voltage supplied to the motor is generally performed by an adjustment of a duty ratio of a pulse width modulation (PWM) control.

A general configuration of the conventional electric power steering apparatus will be described with reference to FIG. 1. As shown in FIG. 1, a column shaft (a steering shaft or a handle shaft) 2 connected to a steering wheel 1 is connected to steered wheels 8L and 8R through reduction gears 3, universal joints 4a and 4b, a rack-and-pinion mechanism 5, and tie rods 6a and 6b, further via hub units 7a and 7b. In addition, the column shaft 2 is provided with a torque sensor 10 for detecting a steering torque of the steering wheel 1, and a motor 20 for assisting a steering force of the steering wheel 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist command by using an assist map based on a steering torque Th detected by the torque sensor 10 and a vehicle speed Vel detected by a vehicle speed sensor 12, and controls a current supplied to the motor 20 by means of a voltage control value Vref obtained by performing compensation or the like to the calculated current command value.

A controller area network (CAN) 40 exchanging various information of a vehicle is connected to the control unit 30, and it is possible to receive the vehicle speed Vel from the CAN. Further, it is also possible to connect a non-CAN 41 exchanging a communication, analog/digital signals, a radio wave or the like except with the CAN 40 to the control unit 30.

In such an electric power steering apparatus, the control unit 30 mainly comprises a CPU (including an MPU and an MCU), and general functions performed by programs within the CPU are, for example, shown in FIG. 2.

Functions and operations of the control unit 30 will be described with reference to FIG. 2. The steering torque Th from the torque sensor 10 and the vehicle speed Vel from the vehicle speed sensor 12 are inputted into a torque control section 31 to calculate a current command value, and a calculated current command value Iref1 is inputted into a subtracting section 32B, where a detected motor current value Im is subtracted from the current command value Iref1. A deviation I (=Iref1−Im) which is the subtracted result at the subtracting section 32B is controlled at a current control section 35 performing a proportional-integral (PI) control and so on. The voltage control value Vref obtained by the current control is inputted into a PWM-control section 36 which calculates the duty ratio, and PWM-drives the motor 20 through an inverter 37 by means of a PWM signal. The motor current value Im of the motor 20 is detected by a motor current detector 38, and is inputted and fed back to the subtracting section 32B. Further, a rotational angle sensor 21 such as a resolver is connected to the motor 20 and a rotational angle θr is detected and outputted.

In such an electric power steering apparatus, in the case that a large assist force is applied by a motor in the vicinity of a maximum steering angle (a rack end) in a steering system, large impact arises at the time when the steering system reaches the maximum steering angle, a hitting sound (an abnormal noise) occurs, and a driver may feel it unpleasant.

To cope with such a problem, the present applicant has proposed an electric power steering apparatus that constitutes a control system based on a physical model, constitutes a model following control where an output (a distance to a rack end) of a controlled target follows a reference model, suppresses occurrence of the abnormal noise at end hitting without providing uncomfortable feeling of steering for a driver, and attenuates impact force, in WO 2016/104568 (Patent Document 1). The electric power steering apparatus in Patent Document 1 constitutes the control system based on the physical model, so that it is easy to forecast parameter design. The electric power steering apparatus in Patent Document 1 constitutes the model following control where an output of a controlled target follows a reference model so as to enable a robust suppressing-control of the end hitting against variations of a load state (an external disturbance) and the controlled target.

The electric power steering apparatus in Patent Document 1 outputs an assist force so as to balance the assist force with the sum of a manual input of a driver and a reaction force from a tire, in order that a steering wheel is not moved assuming that there is a virtual rack end, that is, there is a rack end even if the driver turns the steering wheel. At this time, the electric power steering apparatus assists in a direction opposite to a steering direction of the driver, so that there is a case where a safety measure such as limitation of the maximum value of the assist force is needed. Even in the case of assisting in the same direction as the steering direction of the driver, there is the case where the safety measure is needed.

As the safety measure, the present applicant has proposed an electric power steering apparatus that limits an output from a viscoelastic model following control section constituting the model following control in order to limit the maximum value of the assist force in WO 2016/104571 (Patent Document 2). The limitation of the output is performed at a control output limiting section, which limits the output by using a fixed limit value, a limit value corresponding to a rack shaft force or a column shaft torque, and so on. An apparatus is also proposed that changes a limit value in accordance with a steering velocity so as to enable more flexible handling such as performing strong control so that the virtual rack end exists at a high steering velocity, and enhancing safety by strong limitation of the control output at a low steering velocity.

THE LIST OF PRIOR ART DOCUMENTS

Patent Documents

Patent Document 1: WO 2016/104568
Patent Document 2: WO 2016/104571

SUMMARY OF THE INVENTION

Problems to be Solved by the Invention

However, even in the case of the electric power steering apparatus in Patent Document 2 which limits the maximum value of the assist force, since the electric power steering apparatus generates the control output so as to form the virtual rack end in front of the rack end in order to suppress an abnormal noise when hitting the rack end, in the case that the virtual rack end is formed in a position far from an actual rack end, the further the position is, the larger a turning radius of a vehicle becomes, and there is possibility that handling becomes worse. Even if the limit value is changed by only the steering velocity, this possibility is difficult to make small.

The present invention has been developed in view of the above-described circumstances, and it is an object of the present invention is to provide an electric power steering apparatus that constitutes a control system based on a physical model, constitutes a model following control where an output (a distance to a rack end) of a controlled target follows a reference model, suppresses occurrence of the abnormal noise at end hitting without providing uncomfortable feeling of steering for a driver, attenuates impact force, and enables suppression of the abnormal noise without making the turning radius worse.

Means for Solving the Problems

The present invention relates to an electric power steering apparatus that calculates a current command value based on at least a steering torque, and performs an assist-control of a steering system by driving a motor based on the current command value, the above-described object of the present invention is achieved by that comprising: a viscoelastic model following control section that sets a viscoelastic model as a reference model within a predetermined range in front of a rack end, and outputs a control output to correct the current command value; and a rack end approach judging section that performs judgment of being in the predetermined range in front of the rack end based on steering position information; wherein the electric power steering apparatus adjusts the control output based on at least the steering position information, a steering velocity and a steering state, and corrects the current command value by the adjusted control output.

Further, the present invention relates to an electric power steering apparatus that calculates a first current command value based on at least a steering torque, and performs an assist-control of a steering system by driving a motor based on the first current command value, the above-described object of the present invention is achieved by that comprising: a rack end approach judging section that performs judgment of being in a rack end approach region being a predetermined range in front of a rack end based on steering position information, and outputs a rack displacement and a switching signal; a viscoelastic model following control section that generates a second shaft force, setting a viscoelastic model as a reference model, based on at least one of a first shaft force obtained by performing a first conversion for the first current command value, and the rack displacement, and the switching signal; and a control output adjusting section that sets a limit value for the second shaft force based on at least the steering position information, a steering velocity, and a steering state signal which shows turning or returning, and limits the second shaft force; wherein the electric power steering apparatus performs the assist-control by correcting the first current command value by a second current command value which is obtained by performing a second conversion for the limited second shaft force.

Further, the present invention relates to an electric power steering apparatus that calculates a first current command value based on at least a steering torque, and performs an assist-control of a steering system by driving a motor based on the first current command value, the above-described object of the present invention is achieved by that comprising: a rack end approach judging section that performs judgment of being in a predetermined range in front of a rack end based on steering position information, and outputs a rack displacement and a switching signal; a viscoelastic model following control section that generates a second shaft force, setting a viscoelastic model as a reference model, based on at least one of a first shaft force obtained by performing a first conversion for the first current command value, and the rack displacement, and the switching signal; and a state judging section that judges a state of approaching the rack end based on at least the steering position information, a steering velocity, and a steering state signal which shows turning or returning, and outputs a judgment signal; and a control output adjusting section that adjusts the second shaft force based on the judgment signal; wherein the electric power steering apparatus performs the assist-control by correcting the first current command value by a second current command value which is obtained by performing a second conversion for the adjusted second shaft force.

Effects of the Invention

Since the electric power steering apparatus according to the present invention constitutes a control system based on a physical model, it is easy to forecast parameter design. Since the electric power steering apparatus constitutes a model following control where an output (a distance to the rack end) of a controlled target follows a reference model, the electric power steering apparatus enables a robust suppressing-control of end hitting against variations of a load state (an external disturbance) and the controlled target. Further, since the electric power steering apparatus adjusts the control output based on the steering position information, the steering velocity, the steering state and so on, a driver can turn a steering wheel to the rack end, and the electric power steering apparatus achieves suppression of an abnormal noise and comfortable steering force simultaneously. Ability to operate to the rack end enables reduction in an influence on the smallest turning radius.

MODE FOR CARRYING OUT THE INVENTION

An electric power steering apparatus according to the present invention constitutes a control system based on a physical model in the vicinity of a rack end, sets a viscoelastic model (a spring constant and a viscous friction coefficient) as a reference model, constitutes a model following control where an output (a distance to the rack end) of a controlled target follows the reference model, suppresses occurrence of an abnormal noise at end hitting without providing uncomfortable feeling of steering for a driver, and attenuates impact force.

The model following control comprises a viscoelastic model following control section, and the viscoelastic model following control section comprises a feedforward control section, or a feedback control section, or both of them. The electric power steering apparatus performs a normal assist-control out of a predetermined range in front of the rack end, and performs the model following control within the predetermined range in front of the rack end so as to suppress hitting to the rack end.

The present invention has a function (hereinafter referred to a "control output adjustment function") of adjusting a control output of the model following control based on information (steering position information) showing a steering position, such as a steering angle (a steering wheel angle, a column shaft angle), a steering velocity, a steering state (turning or returning), and so on.

In the model following control, an assist force is outputted so as to be balanced with a sum of a manual input of a driver and a reaction force from a tire (in the case that friction between the tire and a road surface is extremely small, the sum is only the manual input of the driver), in order that a steering wheel is not moved assuming that there is a virtual rack end, that is, there is a rack end even if the driver turns the steering wheel. In this case, however, the assist is performed in a direction opposite to a steering direction of the driver. One of the present inventions limits the maximum value of the assist force considering safety. Similarly, even in the case that the assist is performed in the same direction as the steering direction of the driver, the maximum value of the assist force is limited. There is possibility that because the virtual rack end is formed in a position far from an actual rack end, a turning radius of a vehicle becomes large, and handling becomes worse. In order to make the possibility small, the present invention sets a limit value based on a position of a rack displacement, the steering velocity and the steering state in a region in the vicinity of the rack end, in the limitation of the maximum value of the assist force. Moreover, a steering angle or a judgment rack position described below, which are the steering position information, may be used instead of the rack displacement.

Figure 3:
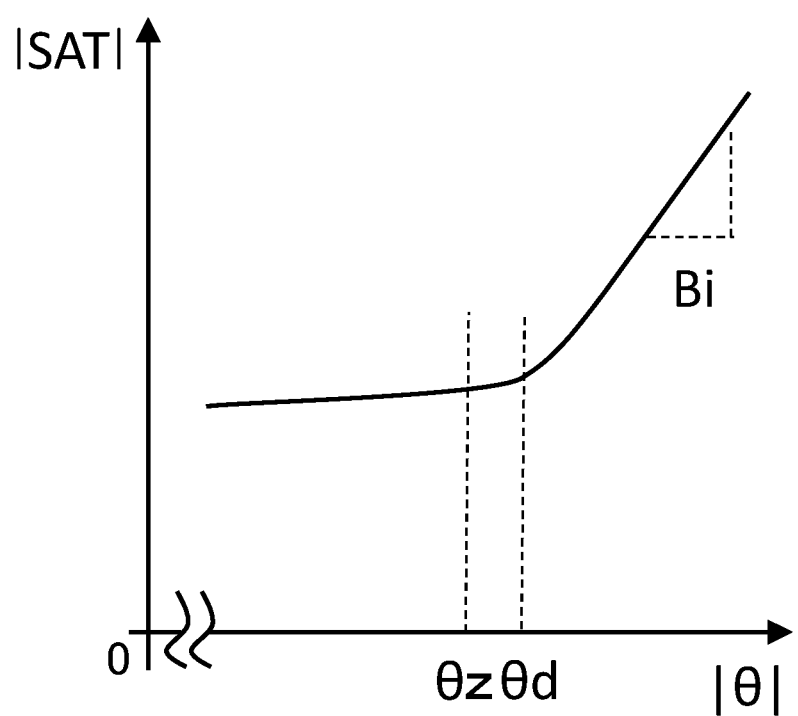
FIG. 3 is a diagram showing an example of a reaction force changing corresponding to a steering angle within a predetermined angle in front of a rack end.

In a predetermined angle in front of the rack end, as a magnitude (an absolute value) $|\theta|$ of a steering angle $\theta$ increases, a reaction force (a self-aligning torque (SAT)) from a tire also increases, and the reaction force rapidly increases from a certain magnitude $\theta d$, as shown in FIG. 3. Another of the present inventions performs processing considering an increase of the reaction force so that a driver can easily steer in a region where the reaction force rapidly increases. Specifically, the present invention sets a threshold $\theta z$ in the vicinity of the $\theta d$, and in a region where the magnitude $|\theta|$ of the steering angle exceeds the threshold $\theta z$, the present invention provides an assist force (hereinafter referred to a "compensatory assist force") which compensates the increase of the reaction force by using the steering velocity and the steering state as a judgment material. Moreover, the rack displacement or the judgment rack position described below, which are the steering position information, may be used instead of the steering angle.

Hereinafter, embodiments of the present invention will be described with reference to the accompanying drawings.

The present invention adds the control output adjustment function to an electric power steering apparatus proposed by Patent Document 1. First, embodiments (hereinafter referred to "basic embodiments") which do not add the control output adjustment function, will be described, and after that, embodiments of the present invention based on the basic embodiments will be described.

Figure 1:
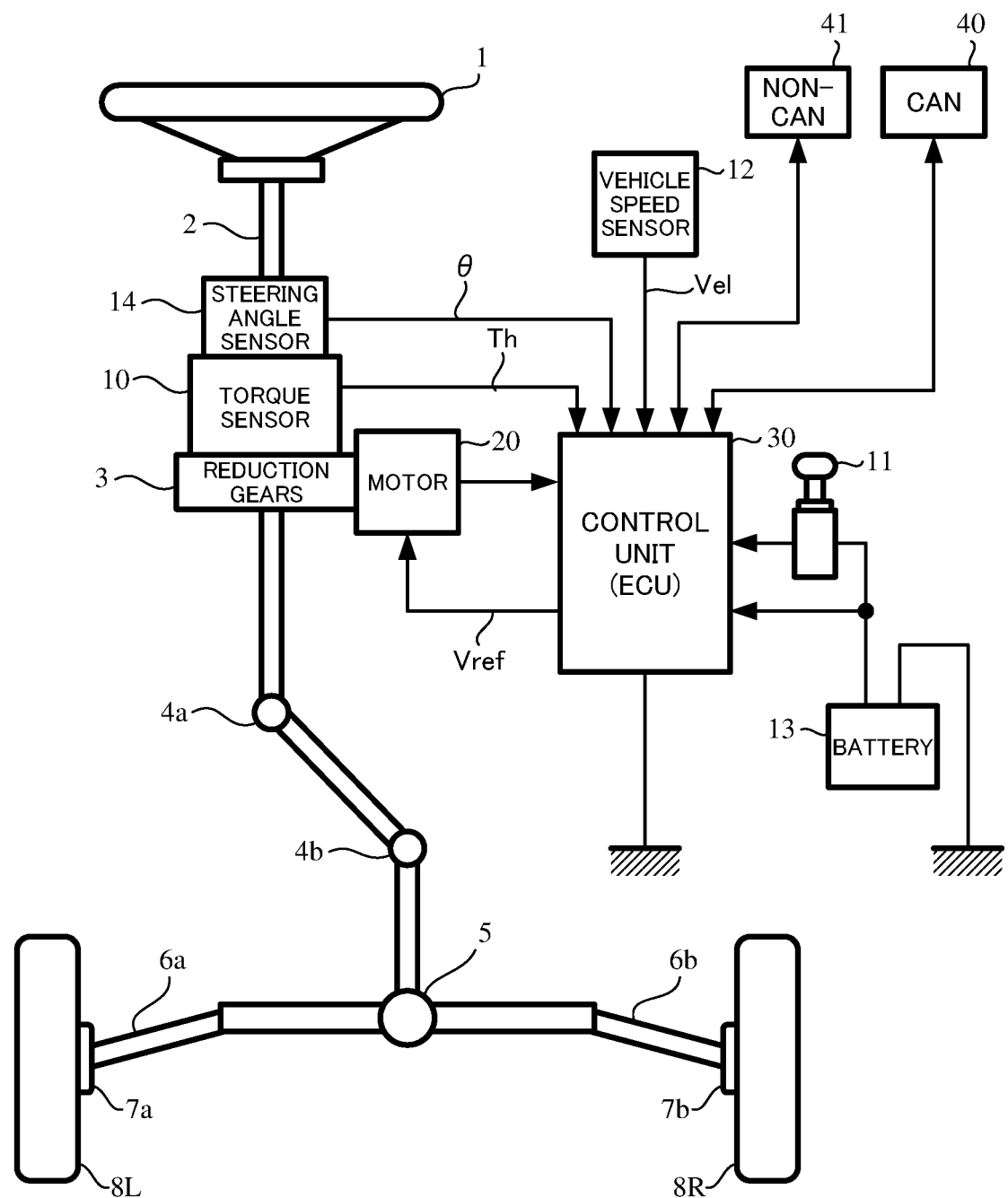
FIG. 1 is a configuration diagram illustrating a general outline of an electric power steering apparatus.
Figure 2:
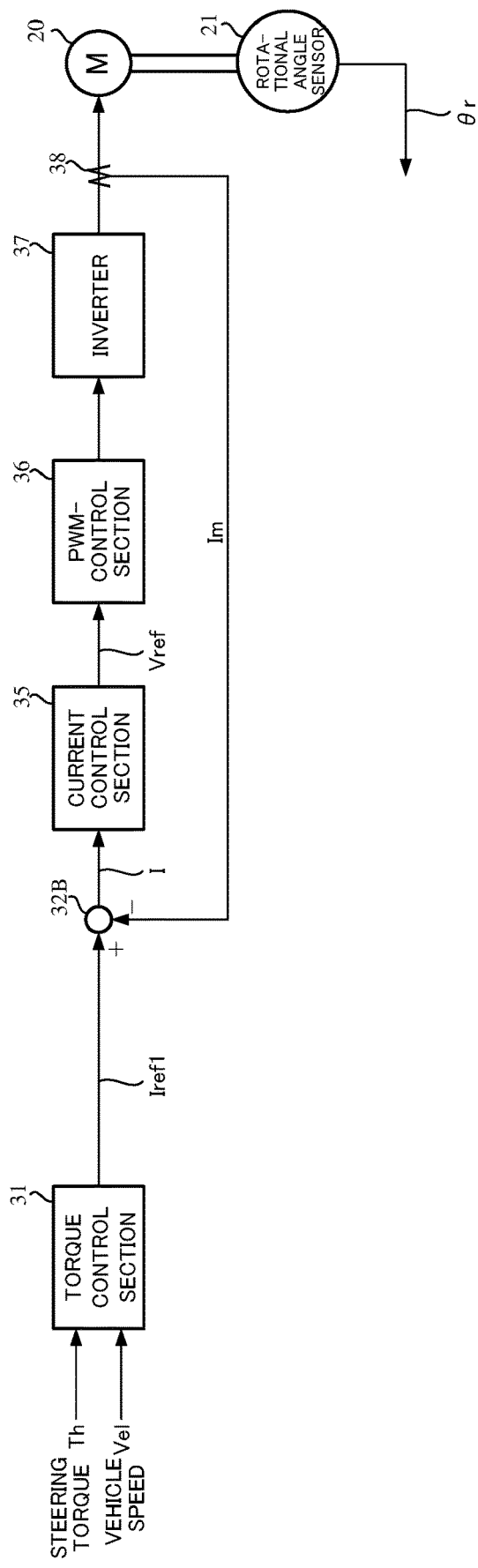
FIG. 2 is a block diagram showing a general configuration example of a control system of the electric power steering apparatus.
Figure 4:
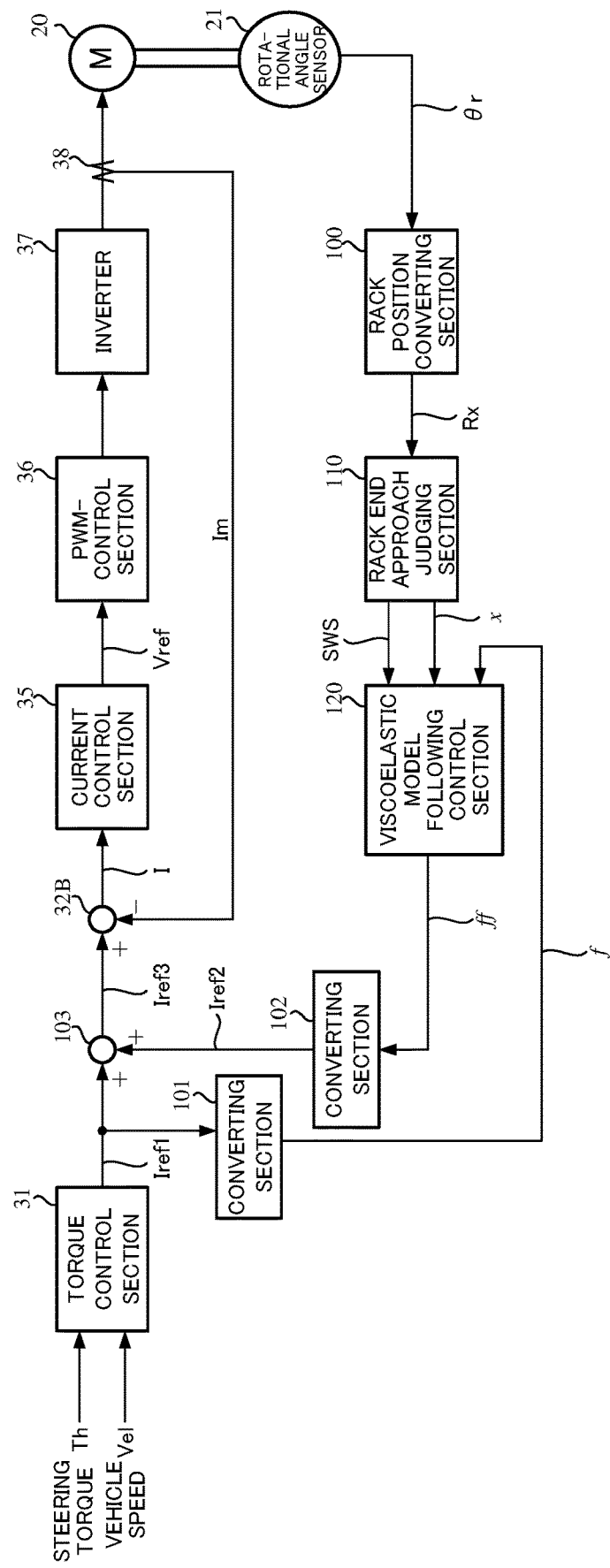
FIG. 4 is a block diagram showing a configuration example of a basic embodiment.

FIG. 4 shows an example of the basic embodiment corresponding to FIG. 2, a current command value Iref1 is converted to a rack shaft force f at a converting section 101, and the rack shaft force f is inputted into a viscoelastic model following control section 120. Although the rack shaft force f is equivalent to a column shaft torque, the column shaft torque is conveniently considered as the rack shaft force in the following explanation. Moreover, a generic term for the rack shaft force and the column shaft torque is a shaft force. Although a rack position or a rack displacement used to perform rack end approach processing is equivalent to a column shaft angle (a steering wheel angle), it is considered as the rack position or the rack displacement in the following explanation. It is possible to judge the rack end approach in accordance with the column shaft angle (the steering wheel angle). The same configurations as those of FIG. 2 are designated with the same numerals of FIG. 2, and an explanation is omitted.

A conversion from the current command value Iref1 to the rack shaft force f is performed based on the following expression 1.

$$f = G1 \times Iref1 \qquad \text{[Expression 1]}$$

where Kt is a torque constant [N·m/A], Gr is a reduction ratio, Cf is a stroke ratio [m/rev.], and G1=Kt×Gr×(2π/Cf).

Figure 5:
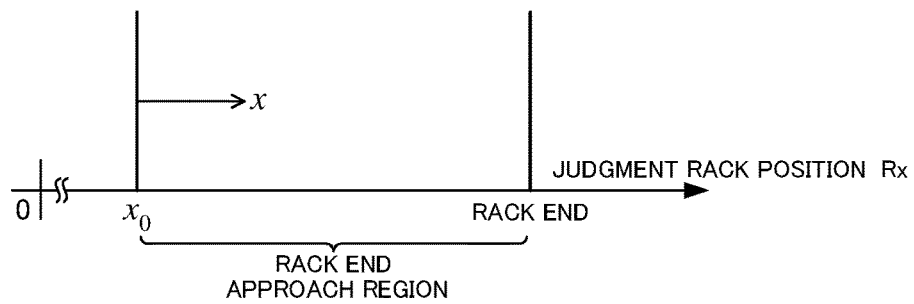
FIG. 5 is a diagram showing a characteristic example of a rack position converting section.

A rotational angle $\theta$ from a rotational angle sensor 21 is inputted into a rack position converting section 100, and is converted to a judgment rack position Rx. The judgment rack position Rx is inputted into a rack end approach judging section 110. As shown in FIG. 5, the rack end approach judging section 110 activates an end hitting suppressing-control function when the judgment rack position Rx is judged within a predetermined position $x_0$ (a rack end approach region), and outputs a rack displacement x and a switching signal SWS. FIG. 5 shows only a right side of the rack end approach region to the origin, and a left side of the rack end approach region is set symmetrically with respect to the origin. The rack displacement x is outputted as a positive value in the right side of the rack end approach region, is outputted as a negative value in the left side of the rack end approach region, and is zero out of the rack end approach region. The switching signal SWS is ON in the rack end approach region, and is OFF out of the rack end approach region. The switching signal SWS and the rack displacement x are inputted into the viscoelastic model following control section 120 together with the rack shaft force f. A rack shaft force ff, which is control-calculated at the viscoelastic model following control section 120, is converted to a current command value Iref2 at a converting section 102. The current command value Iref2 is added to the current command value Iref1 at an adding section 103, and the added result is obtained as a current command value Iref3. The above described assist-control is performed based on the current command value Iref3.

The predetermined position $x_0$ which sets the rack end approach region shown in FIG. 5 is possible to set in an appropriate position, and may be set to different values in the left side and the right side of the rack end approach region. Although the rotational angle $\theta r$ is obtained from the rotational angle sensor 21 that connected to a motor, it may be obtained from a steering angle sensor.

A conversion from the rack shaft force ff to the current command value Iref2 at the converting section 102 is performed based on the following expression 2.

$$Iref2 = ff/G1 \qquad \text{[Expression 2]}$$

Figure 6:
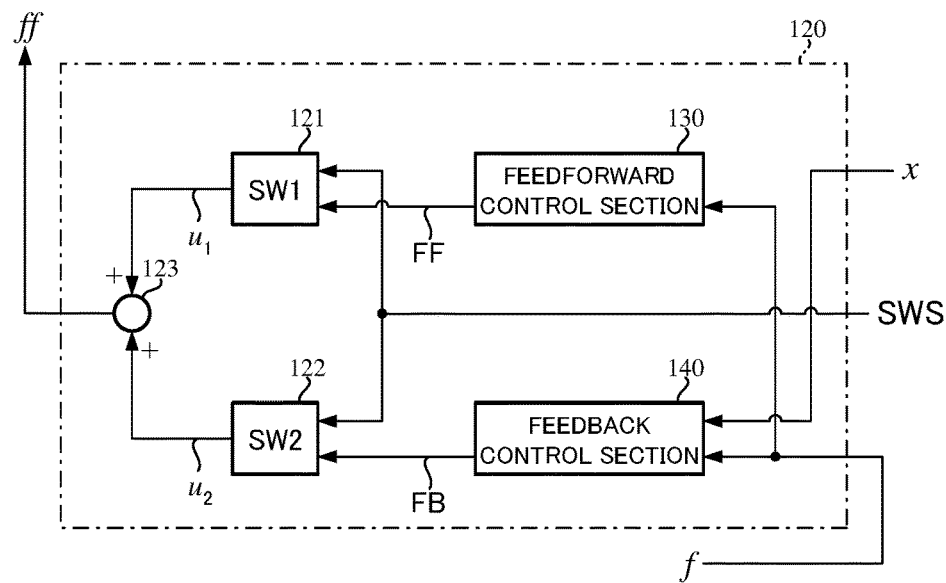
FIG. 6 is a block diagram showing a configuration example (a first basic embodiment) of a viscoelastic model following control section.
Figure 7:
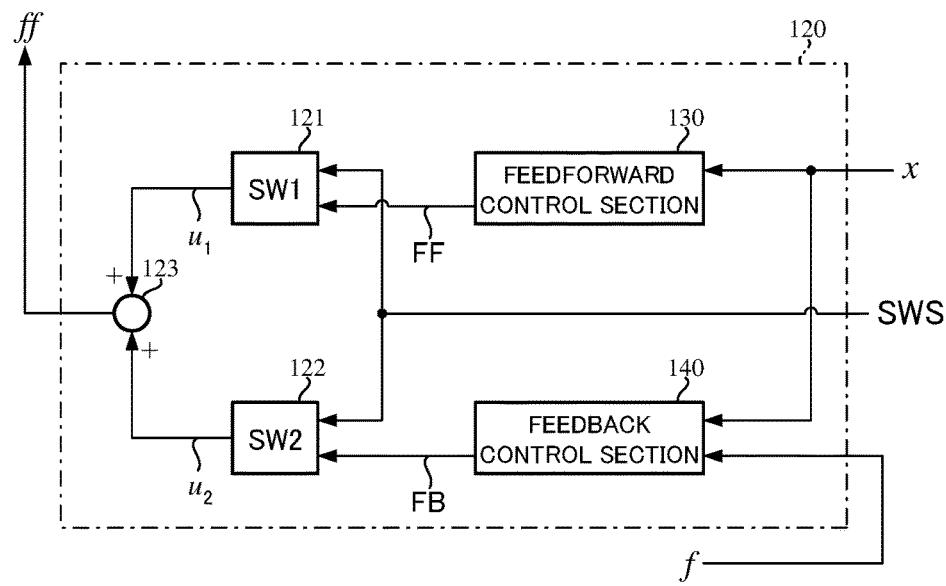
FIG. 7 is a block diagram showing a configuration example (a second basic embodiment) of the viscoelastic model following control section.

A detail of the viscoelastic model following control section 120 is shown in FIG. 6 or FIG. 7.

In a first basic embodiment shown in FIG. 6, the rack shaft force f is inputted into a feedforward control section 130 and a feedback control section 140, and the rack displacement x is inputted into the feedback control section 140. A rack shaft force FF from the feedforward control section 130 is inputted into a switching section 121, and a rack shaft force FB from the feedback control section 140 is inputted into a switching section 122. The switching sections 121 and 122 are turned on or off in accordance with the switching signal SWS. When the switching sections 121 and 122 are turned off in accordance with the switching signal SWS, each of outputs $u_1$ and $u_2$ is zero. When the switching sections 121 and 122 are turned on in accordance with the switching signal SWS, the rack shaft force FF from the switching section 121 is outputted as the rack shaft force $u_1$, and the rack shaft force FB from the switching section 122 is outputted as the rack shaft force $u_2$. The rack shaft forces $u_1$ and $u_2$ from the switching section 121 and 122 are added at an adding section 123, and the rack shaft force ff being the addition value is outputted from the viscoelastic model following control section 120. The rack shaft force ff is converted to the current command value Iref2 at the converting section 102.

Further, in a second basic embodiment shown in FIG. 7, the rack displacement x is inputted into the feedforward control section 130 and the feedback control section 140, and the rack shaft force f is inputted into the feedback control section 140. The following process is the same as that of the first basic embodiment, the rack shaft force FF from the feedforward control section 130 is inputted into the switching section 121, and the rack shaft force FB from the feedback control section 140 is inputted into the switching section 122. The switching sections 121 and 122 are turned on or off in accordance with the switching signal SWS. When the switching sections 121 and 122 are turned off in accordance with the switching signal SWS, each of the outputs $u_1$ and $u_2$ is zero. When the switching sections 121 and 122 are turned on in accordance with the switching signal SWS, the rack shaft force FF from the switching section 121 is outputted as the rack shaft force $u_1$ and the rack shaft force FB from the switching section 122 is outputted as the rack shaft force $u_2$. The rack shaft forces $u_1$ and $u_2$ from the switching section 121 and 122 are added at the adding section 123, and the rack shaft force ff being the addition value is outputted from the viscoelastic model following control section 120. The rack shaft force ff is converted to the current command value Iref2 at the converting section 102.

Figure 8:
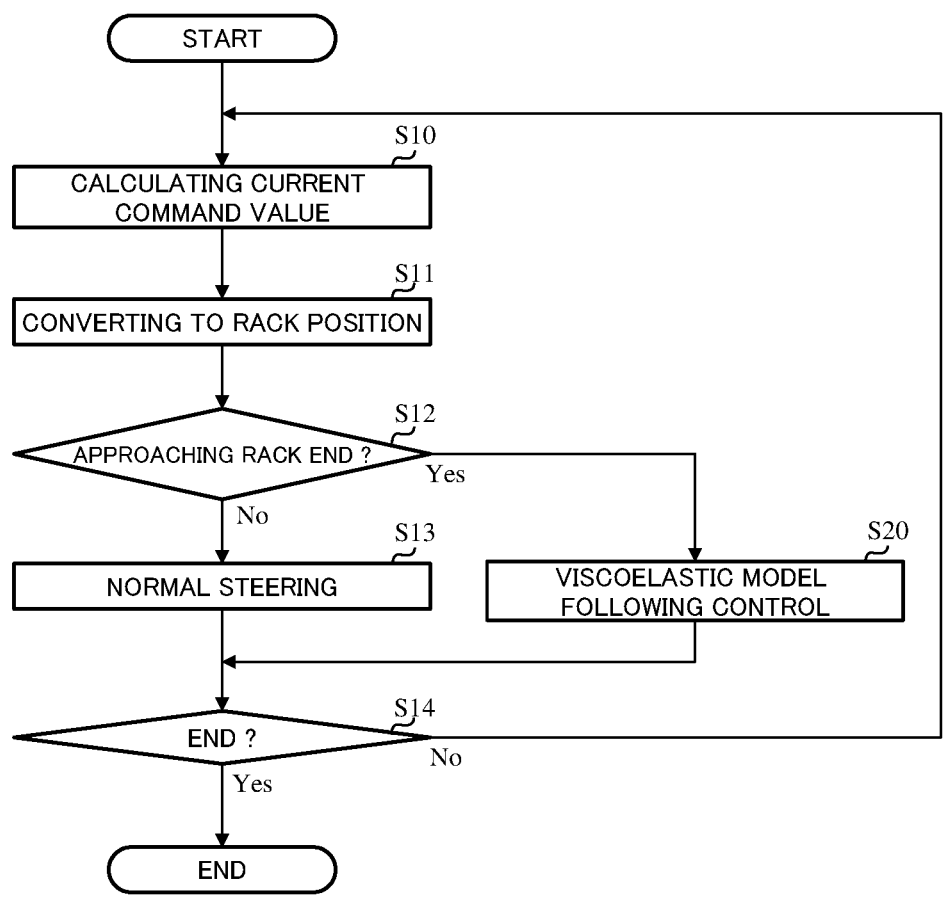
FIG. 8 is a flowchart showing a whole operating example of the basic embodiment.
Figure 9:
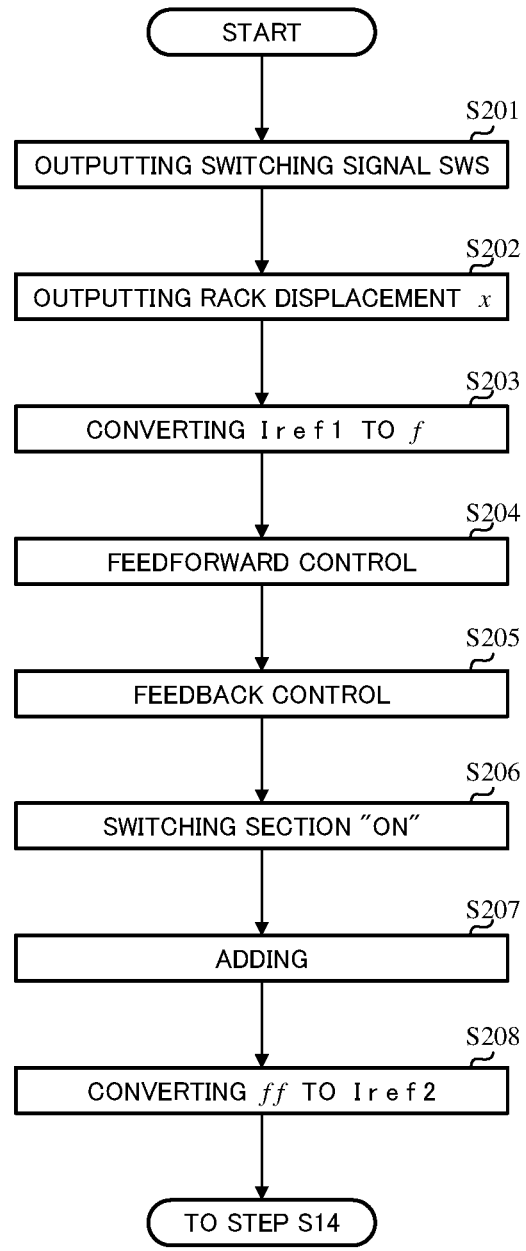
FIG. 9 is a flowchart showing an operating example (the basic embodiment) of a viscoelastic model following control.

In the above configurations, first, a whole operating example of the basic embodiment will be described with reference to a flowchart of FIG. 8, and next, an operating example of the viscoelastic model following control (the first and second basic embodiments) will be described with reference to a flowchart of FIG. 9.

In a start stage, the switching sections 121 and 122 are turned off in accordance with the switching signal SWS. When the operation is started, the torque control section 31 calculates the current command value Iref1 based on the steering torque Th and the vehicle speed Vel (Step S10). The rack position converting section 100 converts the rotational angle θr from the rotational angle sensor 21 to the judgment rack position Rx (Step S11). The rack end approach judging section 110 judges whether a rack approaches the rack end based on the judgment rack position Rx or not (Step S12). In the case that the rack does not approach the rack end, the rack shaft force ff from the viscoelastic model following control section 120 is not outputted, normal steering control based on the current command value Iref1 is performed (Step S13), and this control is continued to the end (Step S14).

On the other hand, in the case that it is judged that the rack approaches the rack end at the rack end approach judging section 110, the viscoelastic model following control is performed by the viscoelastic model following control section 120 (Step S20). That is, as shown in FIG. 9, the rack end approach judging section 110 outputs the switching signal SWS (Step S201) and the rack displacement x (Step S202). The converting section 101 converts the current command value Iref1 to the rack shaft force f in accordance with the expression 1 (Step S203). In the first basic embodiment shown in FIG. 6, the feedforward control section 130 performs the feedforward control based on the rack shaft force f (Step S204), and the feedback control section 140 performs the feedback control based on the rack displacement x and the rack shaft force f (Step S205). In the second basic embodiment shown in FIG. 7, the feedforward control section 130 performs the feedforward control based on the rack displacement x (Step S204), and the feedback control section 140 performs the feedback control based on the rack displacement x and the rack shaft force f (Step S205). In both cases, the order of the feedforward control and the feedback control may be alternated.

The switching signal SWS from the rack end approach judging section 110 is inputted into the switching sections 121 and 122, and the switching sections 121 and 122 are turned on (Step S206). When the switching sections 121 and 122 are turned on, the rack shaft force FF from the feedforward control section 130 is outputted as the rack shaft force $u_1$, and the rack shaft force FB from the feedback control 140 is outputted as the rack shaft force $u_2$. The rack shaft forces $u_1$ and $u_2$ are added at the adding section 123 (Step S207), and the rack shaft force ff which is the added result is converted to the current command value Iref2 at the converting section 102 in accordance with the expression 2 (Step S208). Although the present basic embodiments are configured to switch the rack shaft force FF and the rack shaft force FB at two switching sections 121 and 122 respectively and add them at the adding section 123, it is possible to switch output at one switching section after adding the rack shaft force FF and the rack shaft force FB.

The viscoelastic model following control section 120 is a control system based on a physical model in the vicinity of the rack end, constitutes a model following control where a viscoelastic model (a spring constant $k_0$ [N/m] and a viscous friction coefficient $\mu$ [N/(m/s)]) is set as a reference model (a physical model described by setting a force as an input and a displacement as an output), and suppresses hitting the rack end.

Figure 10:
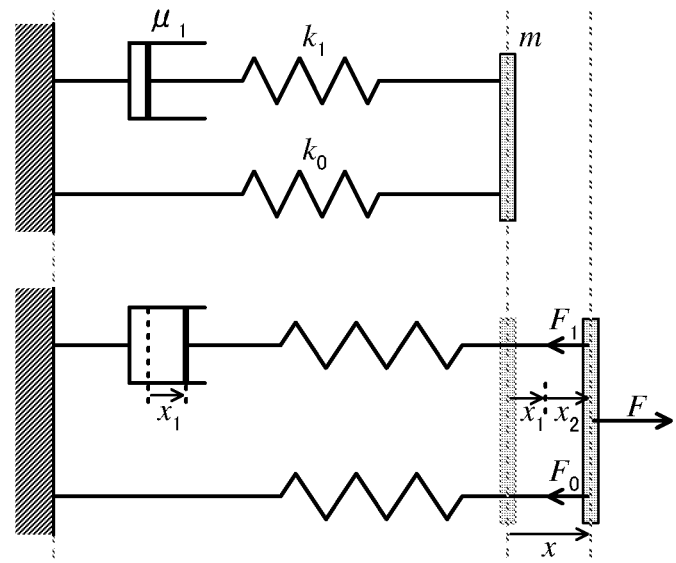
FIG. 10 is a schematic diagram of a viscoelastic model.

FIG. 10 is a schematic diagram in the vicinity of the rack end, and a relationship between mass m and forces $F_0$ and $F_1$ is represented by the following expression 3. The derivation of the expressions of the viscoelastic model is described in, for example, "Elementary Mechanics for Elastic Membrane and Viscoelasticity" (Kenkichi OHBA) of "Engineering Sciences & Technology", Kansai University, official journal of a scientific society, Vol. 17 (2010).

$$F = m\ddot{x} + F_0 + F_1 \qquad \text{[Expression 3]}$$

Assuming that spring constants $k_0$ and $k_1$ are defined for the rack displacements $x_1$ and $x_2$ respectively, the following expressions 4 to 6 are established.

$$x = x_1 + x_2 \qquad \text{[Expression 4]}$$

$$F_0 = k_0 x \qquad \text{[Expression 5]}$$

$$F_1 = \mu_1 \frac{dx_1}{dt} = k_1 x_2 \qquad \text{[Expression 6]}$$

Therefore, the expression 7 is obtained by substituting the expressions 4 to 6 into the expression 3.

$$\begin{aligned} F &= m\ddot{x} + k_0 x + k_1 x_2 \qquad \text{[Expression 7]} \\ &= m\ddot{x} + k_0 x + k_1 (x - x_1) \\ &= m\ddot{x} + (k_0 + k_1)x - k_1 x_1 \end{aligned}$$

The following expression 8 is obtained by differentiating the expression 7, and the expression 9 is obtained by multiplying both members of the expression 8 by "$\mu_1/k_1$".

$$\dot{F} = m\dddot{x} + (k_0 + k_1)\dot{x} - k_1 \dot{x}_1 \qquad \text{[Expression 8]}$$

$$\frac{\mu_1}{k_1}\dot{F} = \frac{\mu_1}{k_1}m\dddot{x} + \frac{\mu_1}{k_1}(k_0 + k_1)\dot{x} - \mu_1 \dot{x}_1 \qquad \text{[Expression 9]}$$

The expression 10 is obtained by adding the expressions 7 and 9.

$$F + \frac{\mu_1}{k_1}\dot{F} = \qquad \text{[Expression 10]}$$
$$m\ddot{x} + \frac{\mu_1}{k_1}m\dddot{x} + (k_0 + k_1)x - k_1 x_1 + \frac{\mu_1}{k_1}(k_0 + k_1)\dot{x} - \mu_1 \dot{x}_1$$

The following expression 11 is obtained by substituting the expressions 4 and 6 to the expression 10.

$$F + \frac{\mu_1}{k_1}\dot{F} = m\ddot{x} + \frac{\mu_1}{k_1}m\dddot{x} + k_0 x + \mu_1(1 + k_0/k_1)\dot{x} \qquad \text{[Expression 11]}$$

Here, assuming that $\mu_1/k_1 = \tau_e$, $k_0 = E_r$, and $\mu_1(1/k_0 + 1/k_1) = \tau_\delta$, the expression 11 can be expressed by the expression 12, and the expression 13 is obtained by performing Laplace transform with respect to the expression 12.

$$F + \tau_e \dot{F} = \tau_e m \dddot{X} + m\ddot{x} + E_r(x + \tau_\delta \dot{x}) \qquad \text{[Expression 12]}$$

$$(1 + \tau_e s)F(s) = \{\tau_e m s^3 + m s^2 + E_r(1 + \tau_\delta s)\}X(s) \qquad \text{[Expression 13]}$$

The following expression 14 is obtained by summarizing the expression 13 with "$X(s)/F(s)$".

$$\frac{X(s)}{F(s)} = \frac{1 + \tau_e s}{\tau_e m s^3 + m s^2 + E_r(1 + \tau_\delta s)} \qquad \text{[Expression 14]}$$

The expression 14 represents a third order physical model (transfer function) which indicates a characteristic from the input force f to the output displacement x. When the spring with the spring constant "$k_1 = \infty$" is used, "$\tau_e \to 0$" is satisfied. Because of "$\tau_\delta = \mu_1 \cdot 1/k_0$", the following expression 15 which is a quadratic function is derived.

$$\frac{X(s)}{F(s)} = \frac{1}{m \cdot s^2 + \mu_1 \cdot s + k_0} \qquad \text{[Expression 15]}$$

The quadratic function represented by the expression 15 is described as the reference model Gm in the present basic embodiments. That is, a function represented by the expression 16 is the reference model Gm. Here, $\mu_1$ is equal to $\mu$ ($\mu_1 = \mu$).

$$Gm = \frac{1}{m \cdot s^2 + \mu \cdot s + k_0} \qquad \text{[Expression 16]}$$

Next, an actual plant 146 of the electric power steering apparatus is represented by "P" which is denoted by the expression 17. Then, when the reference model following control according to the present basic embodiments is designed by a two-degree of freedom control system, the system is a configuration of FIG. 11 expressed as actual models Pn and Pd. A block 143 (Cd) shows a control element section. (refer to, for example, Hajime MAEDA and Toshiharu SUGIE, "System Control Theory for Advanced Control", published by Asakura Shoten in Japan)

$$P = \frac{Pn}{Pd} = \frac{N}{D} = \frac{1}{m \cdot s^2 + \eta \cdot s} \qquad \text{[Expression 17]}$$

In order to express the actual plant P with a ratio of a stable rational function, N and D are represented by the following expression 18. The numerator of "N" is that of "P", and the numerator of "D" is the denominator of "P". However, "$\alpha$" is determined such that a pole of "(s+$\alpha$)=0" can be selected arbitrary.

$$N = \frac{1}{(s+\alpha)^2}, \quad D = \frac{m \cdot s^2 + \eta \cdot s}{(s+\alpha)^2} \qquad \text{[Expression 18]}$$

Figure 11:
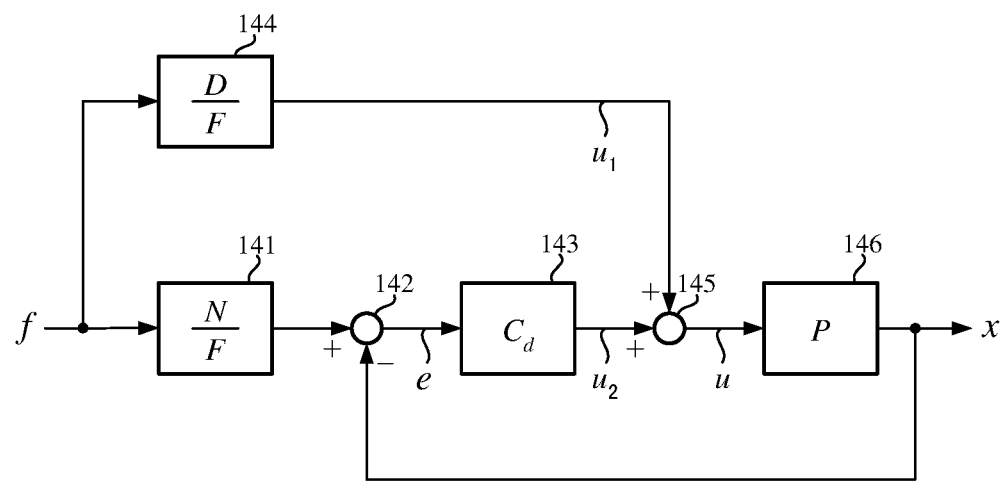
FIG. 11 is a block diagram showing detailed principle of the viscoelastic model following control section.

In the case of applying the configuration of FIG. 11 to the reference model Gm, it is necessary to set "1/F" as the following expression 19 in order to satisfy "x/f=Gm". The expression 19 is derived from the expressions 16 and 18.

$$\frac{1}{F} = GmN^{-1} = \frac{(s+\alpha)^2}{m \cdot s^2 + \mu \cdot s + k_0} \qquad \text{[Expression 19]}$$

A block N/F of the feedback control section is represented by the following expression 20.

$$\frac{N}{F} = \frac{1}{m \cdot s^2 + \mu \cdot s + k_0} \qquad \text{[Expression 20]}$$

A block D/F of the feedforward control section is represented by the following expression 21.

$$\frac{D}{F} = \frac{m \cdot s^2 + \eta \cdot s}{m \cdot s^2 + \mu \cdot s + k_0} \quad \text{[Expression 21]}$$

In an example of the two-degree of freedom control system shown in FIG. 11, an input (the current command value corresponding to the rack shaft force or the column shaft torque) u to the actual plant P is represented by the following expression 22.

$$u = u_1 + u_2 = \frac{D}{F}f + C_d e = \frac{D}{F}f + \left(\frac{N}{F}f - x\right)C_d \quad \text{[Expression 22]}$$

Further, an output (the rack displacement) x of the actual plant P is represented by the following expression 23.

$$x = \quad \text{[Expression 23]}$$
$$uP = P\frac{D}{F}f + P\left(\frac{N}{F}f - x\right)C_d = P\frac{D}{F}f + P\frac{N}{F}C_d f - PC_d x$$

The expression 23 is summarized, terms of the output x are arranged in a left member, and terms of the input f are arranged in a right member, so that the following expression 24 is derived.

$$(1 + PC_d)x = P\left(\frac{D}{F} + \frac{N}{F}C_d\right)f \quad \text{[Expression 24]}$$

The expression 25 is obtained by expressing the expression 24 as a transfer function of the output x to the input f. Here, the actual plant P is expressed as "P=Pn/Pd" after the third term.

$$\frac{x}{f} = \frac{P\left(\frac{D}{F} + \frac{N}{F}C_d\right)}{1 + PC_d} = \quad \text{[Expression 25]}$$
$$\frac{\frac{Pn}{Pd}\left(\frac{D}{F} + \frac{N}{F}C_d\right)}{1 + \frac{Pn}{Pd}C_d} = \frac{\frac{D}{F} + \frac{N}{F}C_d}{\frac{Pd}{Pn} + C_d} = \frac{Pn}{F} \cdot \frac{NC_d + D}{PnC_d + Pd}$$

If the actual plant P is correctly expressed, it is possible to obtain the relations "Pn=N" and "Pd=D". Since the characteristics of the output x to the input f is represented as "Pn/F (=N/F)", the following expression 26 is obtained.

$$\frac{x}{f} = \frac{Pn}{F} \cdot \frac{PnC_d + Pd}{PnC_d + Pd} = \frac{Pn}{F} \quad \text{[Expression 26]}$$

In the case that the characteristic of the output x to the input f (the reference model (the transfer function)) is considered as the following expression 27, it is possible to achieve the expression 26 by putting "1/F" to the following expression 28.

$$\frac{x}{f} = \frac{\omega_n^2}{s + 2\zeta\omega_n s + \omega_n^2} \quad \text{[Expression 27]}$$

$$\frac{1}{F} = \frac{\omega_n^2}{s + 2\zeta\omega_n s + \omega_n^2} Pn^{-1} \quad \text{[Expression 28]}$$

Figure 12A:
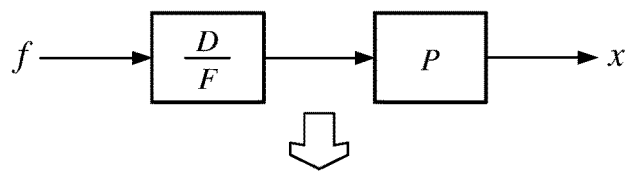
FIGS. 12A, 12B and 12C are block diagrams showing the detailed principle of the viscoelastic model following control section.
Figure 12B:
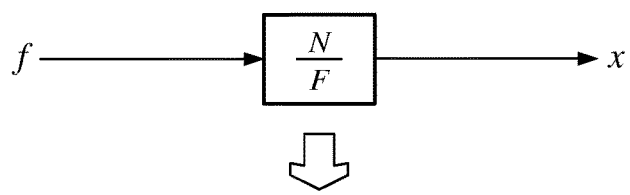
Figure 12C:
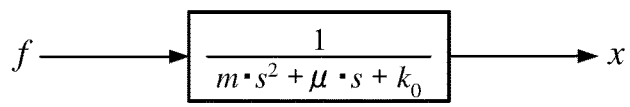

In FIG. 11, in the case that the feedforward control system is considered as a path of "a feedforward element 144→the actual plant P", this system is expressed as FIGS. 12A, 12B and 12C. Here, considering P as N/D (P=N/D), FIG. 12A can be expressed as FIG. 12B, and FIG. 12C is obtained by using the expression 20. Since an expression "f=(m·s²+μ·s+k₀)x" is satisfied from FIG. 12C, the following expression 29 is obtained by performing an inverse Laplace transform with respect to the expression "f=(m·s²+μ·s+k₀)x".

$$f = m\ddot{x} + \mu\dot{x} + k_0 x \quad \text{[Expression 29]}$$

Figure 13:
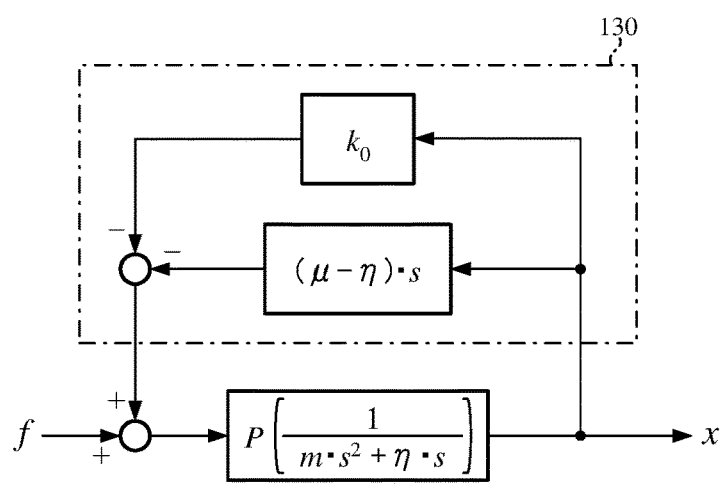
FIG. 13 is a block diagram showing the detailed principle of the viscoelastic model following control section.

On the other hand, considering a transfer function block of the feedforward control system as shown in FIG. 13, the following expression 30 is satisfied in the input f and the output x.

$$\{f - (\mu - \eta) \cdot s \cdot x - k_0 x\} \frac{1}{m \cdot s^2 + \eta \cdot s} = x \quad \text{[Expression 30]}$$

The following expression 31 is obtained by summarizing the expression 30, and the following expression 32 is derived by summarizing the expression 31 with respect to the input f.

$$f - \{(\mu-\eta) \cdot s + k_0\} \cdot x = (m \cdot s^2 + \eta \cdot s)x \quad \text{[Expression 31]}$$

$$f = \{m \cdot s^2 + (\mu-\eta+\eta) \cdot s + k_0\} \cdot x \quad \text{[Expression 32]}$$

Figure 14:
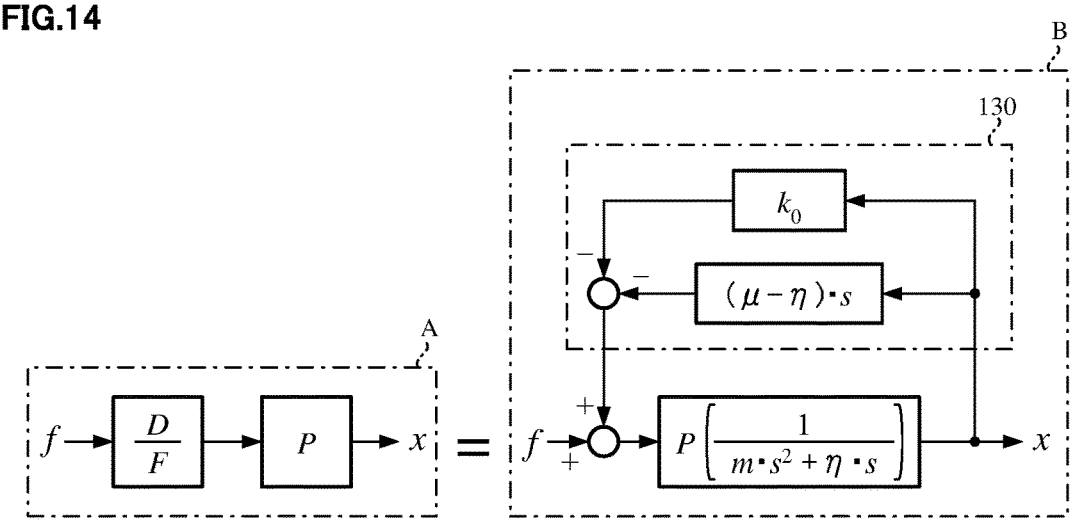
FIG. 14 is a block diagram showing the detailed principle of the viscoelastic model following control section.

The above expression 29 is obtained by performing the inverse Laplace transform on the expression 32. Consequently, the feedforward control sections A and B are equivalent each other as shown in FIG. 14.

Considering the above-described premise, concrete configuration examples of the present basic embodiment will be described with reference to FIG. 15 and FIG. 16. A third basic embodiment shown in FIG. 15 corresponds to the first basic embodiment shown in FIG. 6, the rack shaft force f is inputted into the feedforward element 144 (which is "D/F" shown in the expression 21) in the feedforward control section 130 and the feedback control section 140, and the rack displacement x is inputted into the feedback control section 140. Further, a fourth basic embodiment shown in FIG. 16 corresponds to the second basic embodiment shown in FIG. 7, the rack displacement x is inputted into a spring constant term 131 and a viscous friction coefficient term 132 in the feedforward control section 130, and the rack shaft force f is inputted into the feedback control section 140.

Figure 15:
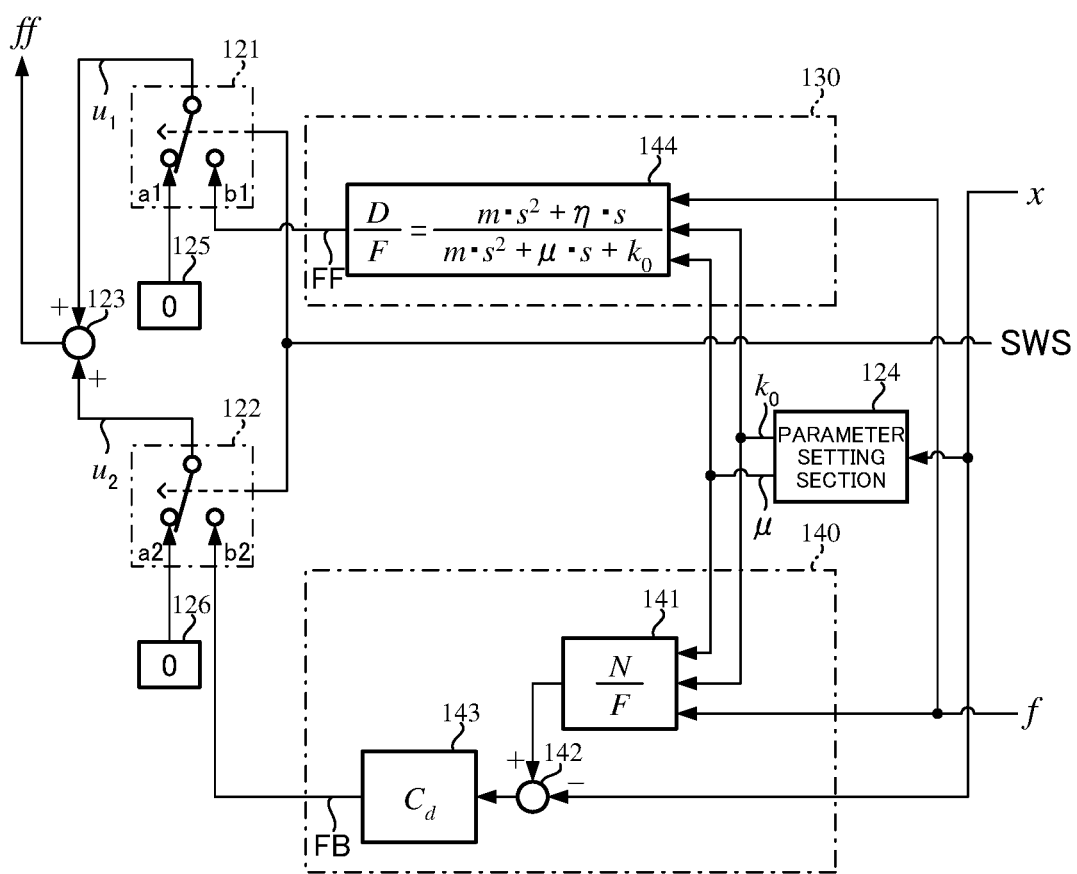
FIG. 15 is a block diagram showing a detailed configuration example (a third basic embodiment) of the viscoelastic model following control section.

In the third basic embodiment of FIG. 15, the rack shaft force FF is inputted into a contact point b1 of the switching section 121. Further, in the fourth basic embodiment of FIG. 16, outputs of the spring constant term 131 and the viscous friction coefficient term 132 are subtracted from zero at a subtracting section 133, and the rack shaft force FF of the subtracted result is inputted into a contact point b1 of the switching section 121. A fixed value "0" from a fixing section 125 is inputted into a contact point a1 of the switching section 121.

Figure 16:
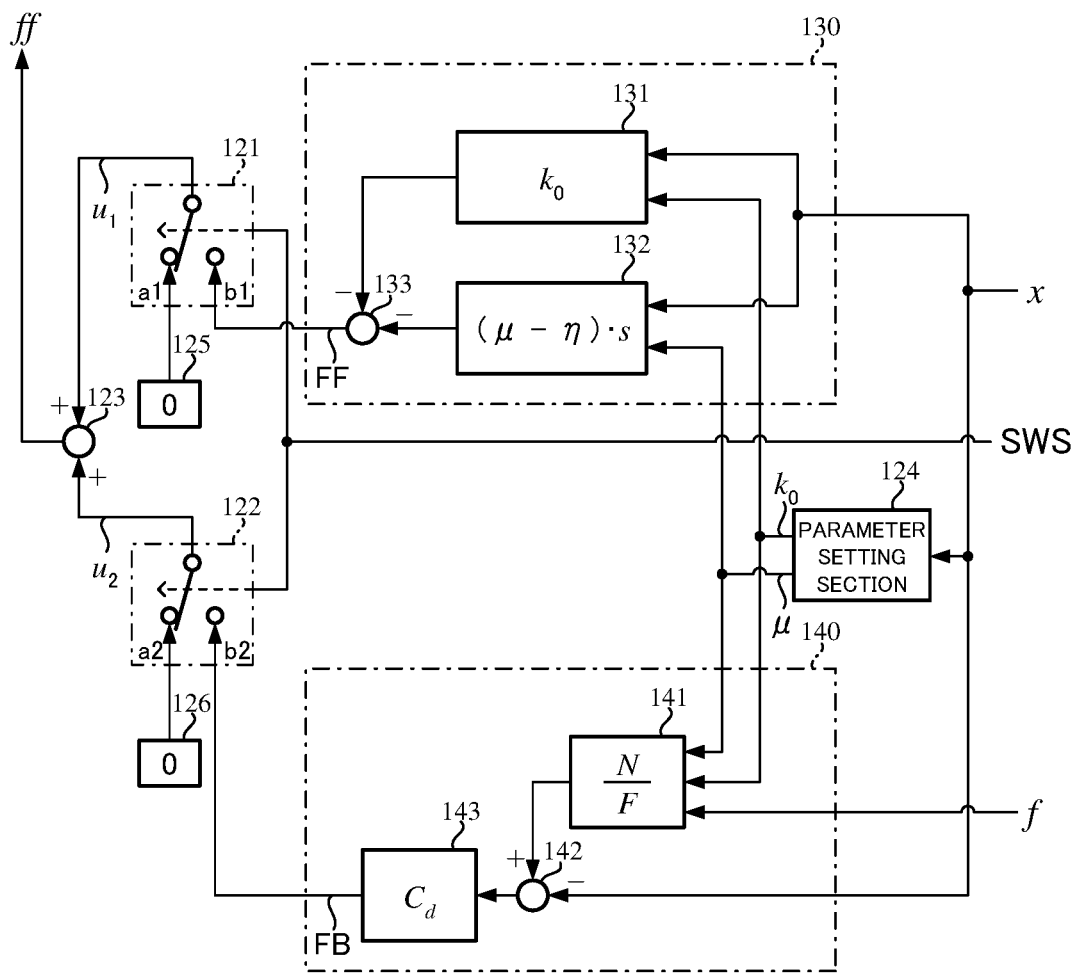
FIG. 16 is a block diagram showing a detailed configuration example (a fourth basic embodiment) of the viscoelastic model following control section.

In any of the third basic embodiment of FIG. 15 and the fourth basic embodiment of FIG. 16, the feedback control section 140 comprises the feedback element (N/F) 141, a subtracting section 142 and the control element section 143, and the rack shaft force FB from the feedback control section 140, that is, the output of the control element section 143 is inputted into a contact point b2 of the switching section 122. A fixed value "0" from a fixing section 126 is inputted into a contact point a2 of the switching section 122.

Figure 17:
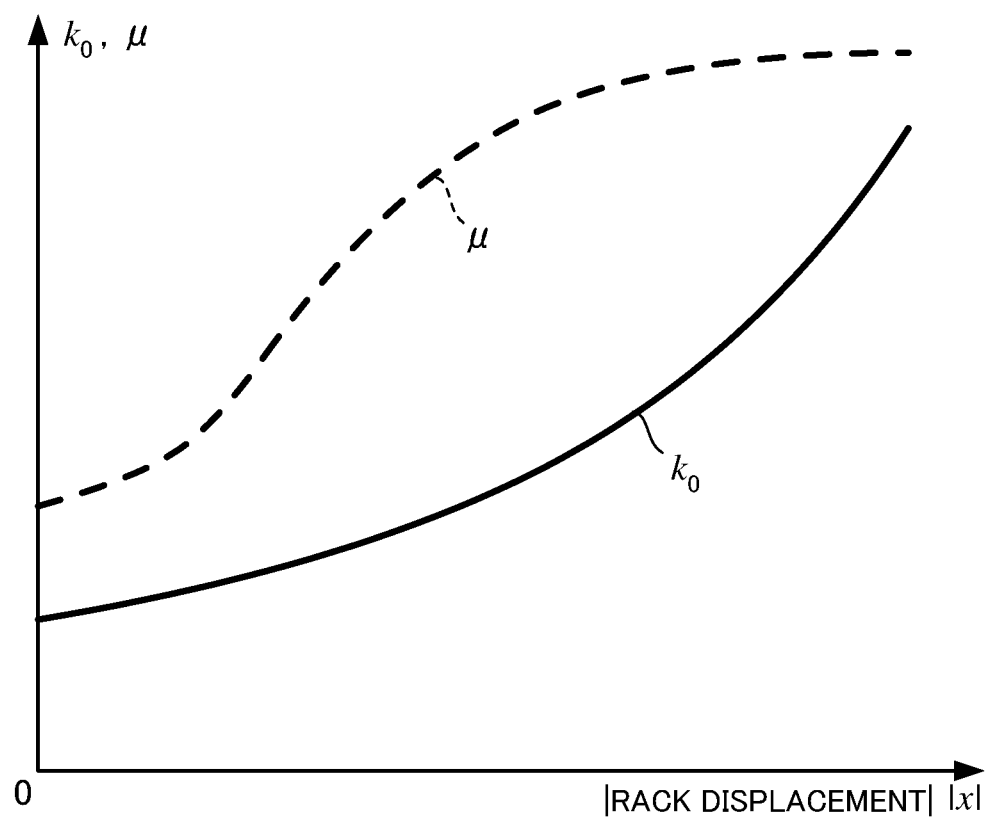
FIG. 17 is a diagram showing an example of changing parameters of a reference model in accordance with a rack displacement.

In the third basic embodiment of FIG. 15, the rack shaft force f is inputted into the feedforward element 144 in the feedforward control section 130 as well as the feedback element (N/F) 141 in the feedback control section 140. The rack displacement x is subtraction-inputted into the subtracting section 142 in the feedback control section 140 and a parameter setting section 124. The parameter setting section 124 outputs the spring constant $k_0$ and the viscous friction coefficient $\mu$ having characteristics as shown in FIG. 17, corresponding to the rack displacement x. The spring constant $k_0$ and the viscous friction coefficient $\mu$ are inputted into the feedforward element 144 in the feedforward control section 130 and the feedback element (N/F) 141 in the feedback control section 140. The characteristics of the spring constant $k_0$ and the viscous friction coefficient $\mu$ may be characteristics corresponding to not the rack displacement but the steering angle or the judgment rack position, which is another of the steering position information.

In the fourth basic embodiment of FIG. 16, the rack displacement x is inputted into the spring constant term 131 and the viscous friction coefficient term 132 in the feedforward control section 130 and the subtracting section 142 in the feedback control section 140 as well as the parameter setting section 124. The rack shaft force f is inputted into the feedback element (N/F) 141 in the feedback control section 140. The parameter setting section 124 outputs the spring constant $k_0$ and the viscous friction coefficient $\mu$ described above, corresponding to the rack displacement x. The spring constant $k_0$ is inputted into the spring constant term 131 and the feedback element (N/F) 141, and the viscous friction coefficient $\mu$ is inputted into the viscous friction coefficient term 132 and the feedback element 141.

Further, the switching signal SWS is inputted into the switching sections 121 and 122 in any of the third and the fourth basic embodiments, the contact points of the switching sections 121 and 122 are normally (the switching signal SWS="OFF") connected to the contact points a1 and a2 respectively, and are switched to the contact points b1 and b2 when the switching signal SWS becomes "ON".

Figure 18:
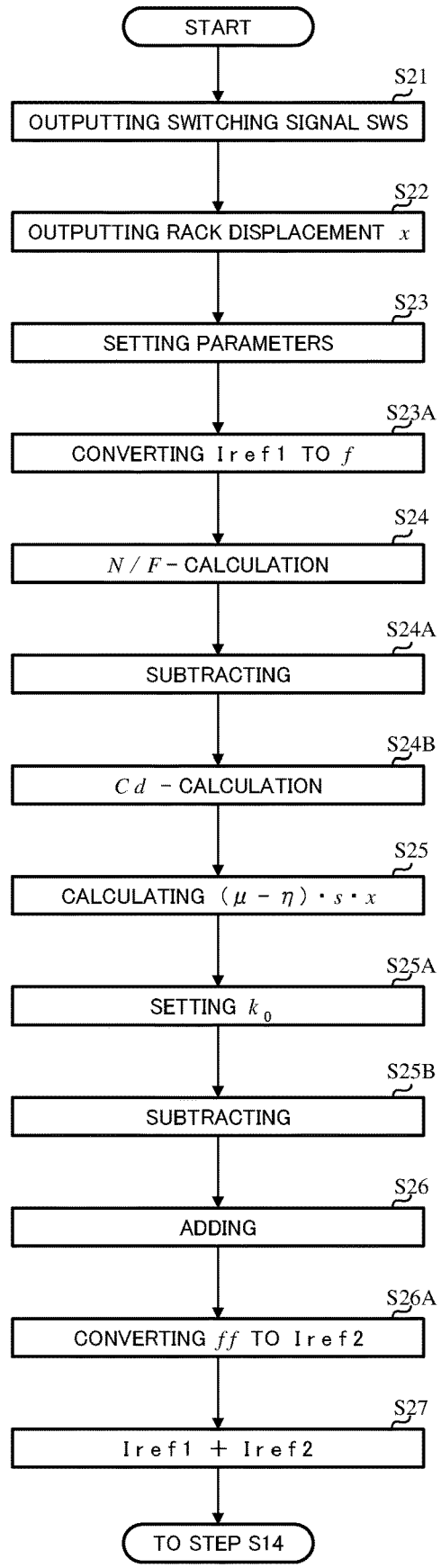
FIG. 18 is a flowchart showing an operating example (the fourth basic embodiment) of the viscoelastic model following control.

In such a configuration, an operating example of the fourth basic embodiment of FIG. 16 will be described with reference to a flowchart of FIG. 18.

The switching signal SWS is outputted from the rack end approach judging section 110 (Step S21), and the rack displacement x is outputted from it (Step S22). The rack displacement x is inputted into the spring constant term 131, the viscous friction coefficient term 132, the parameter setting section 124 and the subtracting section 142. The parameter setting section 124 sets the spring constant $k_0$ and the viscous friction coefficient $\mu$ which are obtained in accordance with the characteristics shown in FIG. 17 corresponding to the rack displacement x, into the spring constant term 131, the viscous friction coefficient term 132 and the feedback element (N/F) 141 (Step S23). Further, the converting section 101 converts the current command value Iref1 to the rack shaft force f (Step S23A), and the rack shaft force f is inputted into the feedback element (N/F) 141 and is N/F-calculated (Step S24). The N/F-calculated value is addition-inputted into the subtracting section 142, the rack displacement x is subtracted (Step S24A), and the subtracted result is Cd-calculated at the control element section 143 (Step S24B). The calculated rack shaft force FB is outputted from the control element section 143, and is inputted into the contact point b2 of the switching section 122.

The viscous friction coefficient term 132 in the feedforward control section 130 performs a calculation of "$(\mu-\eta)\cdot s$" based on the viscous friction coefficient $\mu$ (Step S25). The spring constant term 131 sets the spring constant $k_0$ (Step S25A). Subtractions of the "$k_0\cdot x$" and "$(\mu-\eta)\cdot s\cdot x$" are performed at the subtracting section 133 (Step S25B), and the rack shaft force FF is outputted as the subtracted result. The rack shaft force FF is inputted into the contact point b1 of the switching section 121. The calculation of "$s\cdot x$" is performed as a time-differential. The calculation order of the feedforward control section 130 and the feedback control section 140 is may be alternated.

The switching signal SWS from the rack end approach judging section 110 is inputted into the switching sections 121 and 122, and the contact points a1 and a2 of the switching sections 121 and 122 are respectively switched to the contact points b1 and b2. The rack shaft forces $u_1$ and $u_2$ from the switching sections 121 and 122 are added at the adding section 123 (Step S26), and the rack shaft force ff being the added result is converted to the current command value Iref2 at the converting section 102 (Step S26A). The current command value Iref2 is inputted into the adding section 103, is added to the current command value Iref1 (Step S27), the steering control is performed, and the operation continues to the step S14.

Moreover, the control element section 143 (Cd) may be configured as any of a proportional-integral-differential (PID) control, a PI control, or a PD control. Further, operations of the third basic embodiment shown in FIG. 15 are the same as those of the fourth basic embodiment except a portion (element) where the rack shaft force f and the rack displacement x are inputted. Although the both control calculations of the feedforward control section 130 and the feedback control section 140 are performed in the third basic embodiment of FIG. 15 and the fourth basic embodiment of FIG. 16, a configuration of only the feedforward control section 130 or a configuration of only the feedback control section 140 may be adopted. Although the current command value Iref1 is converted to the rack shaft force f at the converting section 101, and the rack shaft force ff is converted to the current command value Iref2 at the converting section 102, the functions of the converting sections 101 and 102 may be included in the viscoelastic model following control section 120 by multiplying parameters of the feedforward control section 130 and the feedback control section 140 respectively by G1 being a conversion coefficient in the converting section 101 and 1/G1 being a conversion coefficient in the converting section 102, so that the converting sections 101 and 102 may be removed. Control parameters (control gains: a proportional gain, an integral gain and a differential gain) of the control element section 143 may be changed based on the steering position information. For example, the control gains are decreased in the vicinity of the predetermined position $x_0$, and the control gains are increased in the vicinity of the rack end. This enables no occurrence of rapid change of the control output in the vicinity of the predetermined position $x_0$, and improvement in suppression of the impact in the vicinity of the rack end.

Next, embodiments of the present invention based on the basic embodiment will be described. In the embodiments, the rack shaft force (and the column shaft torque) is set so as to become positive when a steering wheel is turned to the right (hereinafter this state is referred to a "right turn steering"), and is set so as to become negative when the steering wheel is turned to the left (hereinafter this state is referred to a "left turn steering"). Further, the rack displacement to the rack end positioned in the right side toward an advancing direction of a vehicle has a positive value, and the rack displacement to the rack end positioned in the left side has a negative value. The steering velocity in the case of steering in a direction to the right rack end has a positive value, and the steering velocity in the case of steering in a direction to the left rack end has a negative value.

First, embodiments (a first to a fourth embodiments) limiting the maximum value of the assist force will be described.

Figure 19:
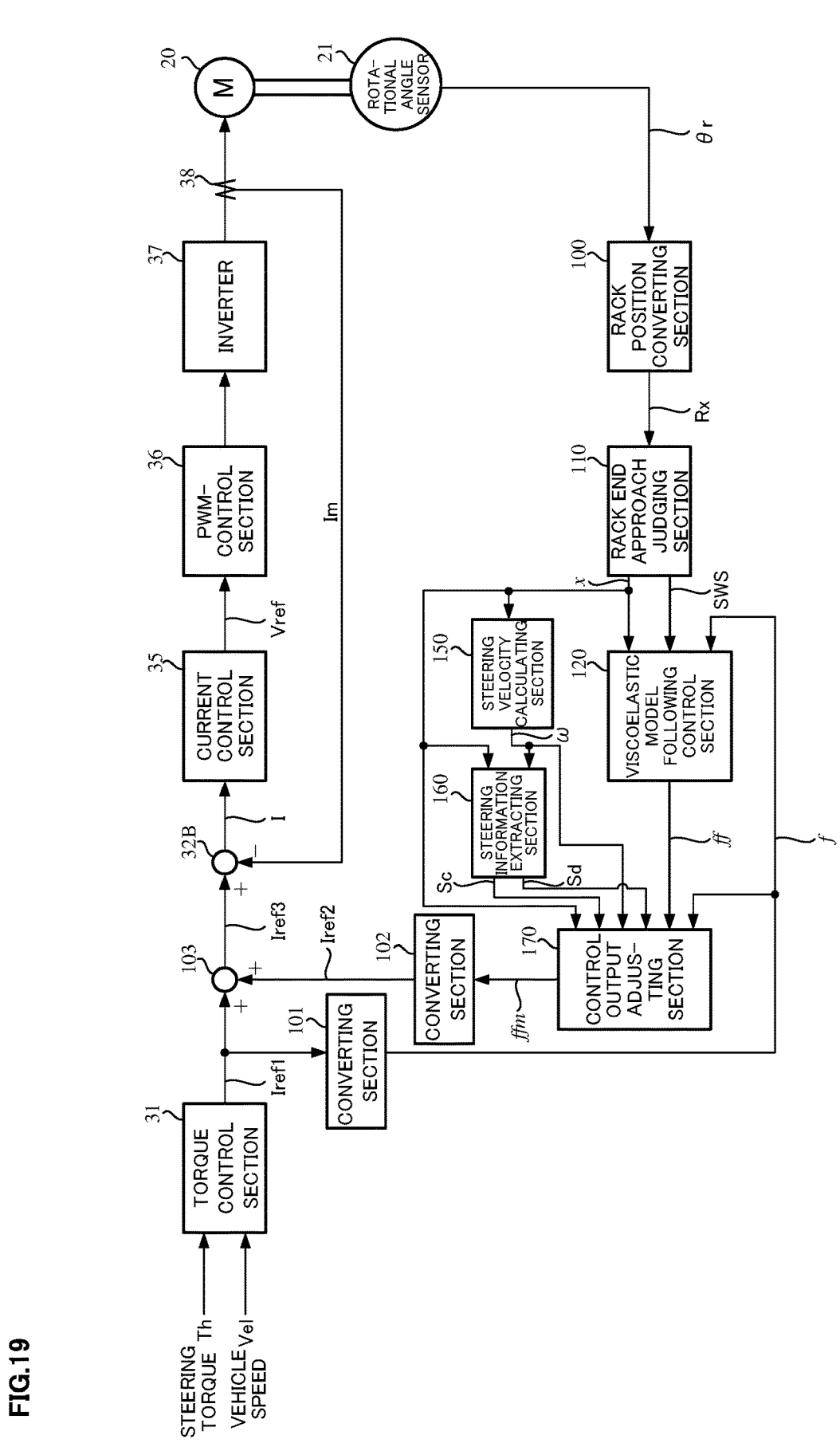
FIG. 19 is a block diagram showing a configuration example (a first embodiment) of the present invention.

FIG. 19 shows a configuration example of the first embodiment corresponding to FIG. 4. Compared with the configuration example shown in FIG. 4, a steering velocity calculating section 150, a steering information extracting section 160 and a control output adjusting section 170 are added, and these sections achieve the control output adjustment function.

The first embodiment limits the maximum value and the minimum value of the rack shaft force ff (the control output) outputted from the viscoelastic model following control section 120. In order to limit the rack shaft force ff, the first embodiment sets an upper limit and a lower limit as limit values, and, further, sets limit values in the right turn steering (in this case, an upper limit is referred to a "right turn upper limit", and a lower limit is referred to a "right turn lower limit") and limit values in the left turn steering (in this case, an upper limit is referred to a "left turn upper limit", and a lower limit is referred to a "left turn lower limit"). The first embodiment sets the limit values based on the rack shaft force f which the current command value Iref1 is converted to. That is, a right turn upper limit RU is set to a value obtained by adding an adjustment value Vf to a sign-inverted value of the rack shaft force f as shown by the following expression 33, and a right turn lower limit RL is set to a value obtained by adding an adjustment value Va to the sign-inverted value of the rack shaft force f as shown by the following expression 34. When the right turn upper limit RU exceeds a predetermined boundary value VF, the right turn upper limit RU is set to the boundary value VF, and when the right turn lower limit RL exceeds zero, the right turn lower limit RL is set to zero.

$$RU = -f + Vf \quad \text{[Expression 33]}$$

$$RL = -f + Va \quad \text{[Expression 34]}$$

A left turn upper limit LU and a left turn lower limit LL are set to values obtained by replacing one of the right turn upper limit RU and the right turn lower limit RL with the other as shown by the following expressions 35 and 36. When the left turn lower limit LL is smaller than a sign-inverted value (−VF) of the boundary value VF, the left turn lower limit LL is set to −VF, and when left turn upper limit LU is smaller than zero, the left turn upper limit LU is set to zero.

$$LU = -f - Va \quad \text{[Expression 35]}$$

$$LL = -f - Vf \quad \text{[Expression 36]}$$

Further, the adjustment value Vf is set to a predetermined value (for example, 2 newton meter (N·m)), and the adjustment value Va is set based on the steering velocity, the rack displacement and the steering state (turning or returning). A setting method of the adjustment value Va will be described.

Figure 20:
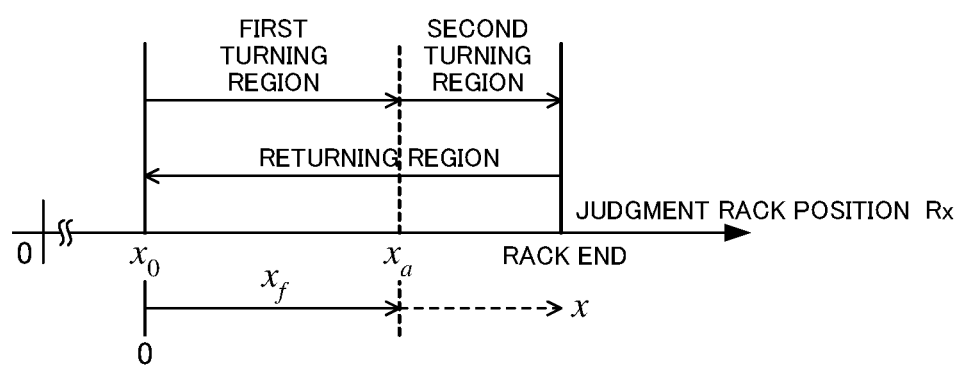
FIG. 20 is a diagram showing an example of regions defined in a rack end approach region.

For example, a predetermined position (hereinafter referred to a "threshold position") $x_a$ is set in the rack end approach region shown in FIG. 5 (the rack displacement x at this time is referred to as "$x_f$"). As shown in FIG. 20, in the case that the steering state is the turning, that is, the rack displacement x moves in the direction to the rack end, a region from the predetermined position $x_0$ (the rack displacement x=0) to the threshold position $x_a$ (the rack displacement x=$x_f$) is defined as a "first turning region", and a region from the threshold position $x_a$ to the rack end is defined as a "second turning region". In the case that the steering state is the returning, that is, the rack displacement x moves in the direction to the predetermined position $x_0$, the whole rack end approach region is defined as a "returning region". Although FIG. 20 shows only the right side to the origin, the same setting and definition as the above are applied to the left side.

Figure 21A:
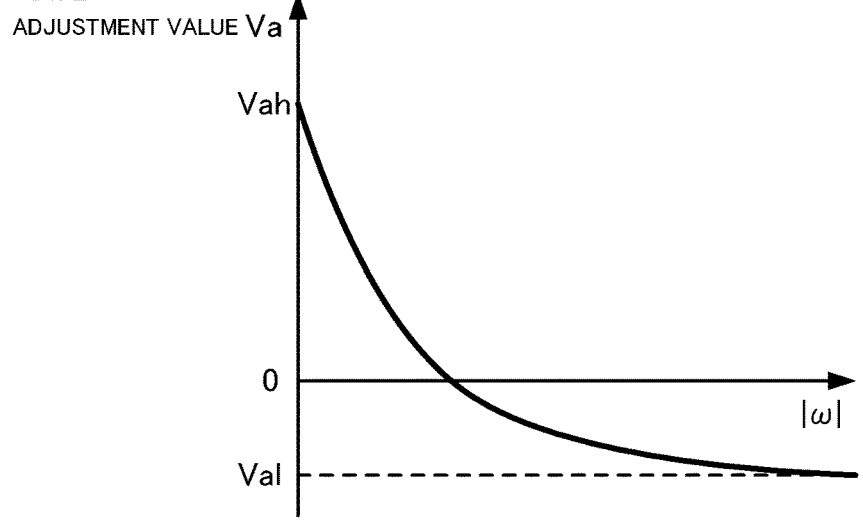
FIGS. 21A, 21B and 21C are diagrams showing characteristic examples of an adjustment value corresponding to a magnitude of a steering velocity.
Figure 21B:
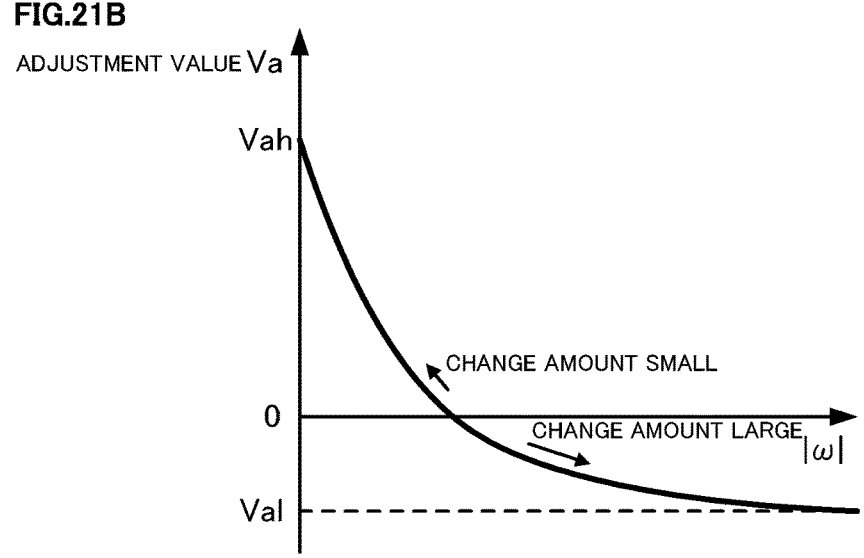
Figure 21C:
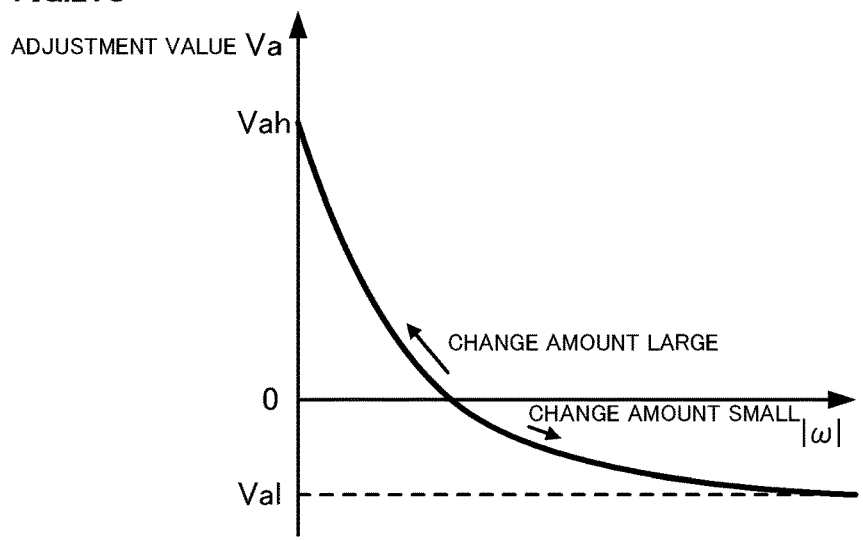

The adjustment value Va is variable to a magnitude (an absolute value) |ω| of the steering velocity ω. When the magnitude of the steering velocity ω is small, the adjustment value Va is increased so that the control output weakens, and as the magnitude of the steering velocity ω is increased, the adjustment value Va is decreased so that the control output strengthens. In the present embodiment, as shown in FIG. 21A, the maximum value (hereinafter referred to a "maximum adjustment value") of the adjustment value Va is Vah, the minimum value (hereinafter referred to a "minimum adjustment value") of the adjustment value Va is Val, the adjustment value Va becomes the maximum adjustment value Vah when the magnitude of the steering velocity ω is zero, and the adjustment value Va becomes close to the minimum adjustment value Val as the magnitude of the steering velocity ω is increased. Further, the present embodiment changes a change amount of the adjustment value Va depending on the above three regions. That is, in the first turning region, as shown in FIG. 21B, the present embodiment strongly suppresses a change of the adjustment value Va in the direction to the maximum adjustment value Vah even if the steering velocity ω becomes low, and the present embodiment substantially quickens a change of the adjustment value Va in the direction to the minimum adjustment value Val when the steering velocity ω is high. In the returning region, the present embodiment makes the adjustment value Va changed as with the change in the first turning region. In the second turning region, in contrast with the first turning region, as shown in FIG. 21C, the change of the adjustment value Va in the direction to the maximum adjustment value Vah follows a change of the steering velocity ω a little quickly, and the change of the adjustment value Va in the direction to the minimum adjustment value Val is strongly suppressed. By making the adjustment value Va changed in this way, in the first turning region, the adjustment value Va becomes close to the minimum adjustment value Val, and the present embodiment can strongly control a steering system so that the rack position reaches the virtual rack end in the direction to the rack end. On the other hand, in the second turning region, the adjustment value Va gradually approaches the maximum adjustment value Vah, the assist force in the direction to the rack end is gradually recovered, so that a driver can turn a steering wheel to the rack end. In the returning region, since the adjustment value Va quickly changes in the direction to the minimum adjustment value Val, when the steering direction becomes the turning direction again, the present embodiment can strongly control the steering system so as to rapidly form the virtual rack end.

The change of the change amount of the adjustment value Va is specifically performed by rate limit processing of limiting the change amount. For example, a change amount ΔVa is set to an absolute value of a difference between the present adjustment value and the previous adjustment value, and an upper limit ΔVamax is set with respect to the change amount ΔVa. When the change amount ΔVa exceeds the upper limit ΔVamax, an addition or a subtraction is applied to the adjustment value Va so that the change amount ΔVa becomes the upper limit ΔVamax. In the first turning region and the returning region, when the adjustment value Va changes in the direction to the maximum adjustment value Vah (hereinafter this change is referred to an "adjustment value up"), the upper limit ΔVamax is decreased so that the change amount ΔVa is decreased, and when the adjustment value Va changes in the direction to the minimum adjustment value Val (hereinafter this change is referred to an "adjustment value down"), the upper limit ΔVamax is increased or the upper limit is not set so that the change amount ΔVa is increased. In the second turning region, contrariwise, in the case of the "adjustment value up", the upper limit ΔVamax is increased or the upper limit is not set so that the change amount ΔVa is increased, and in the case of the "adjustment value down", the upper limit ΔVamax is decreased so that the change amount ΔVa is decreased.

Figure 22:
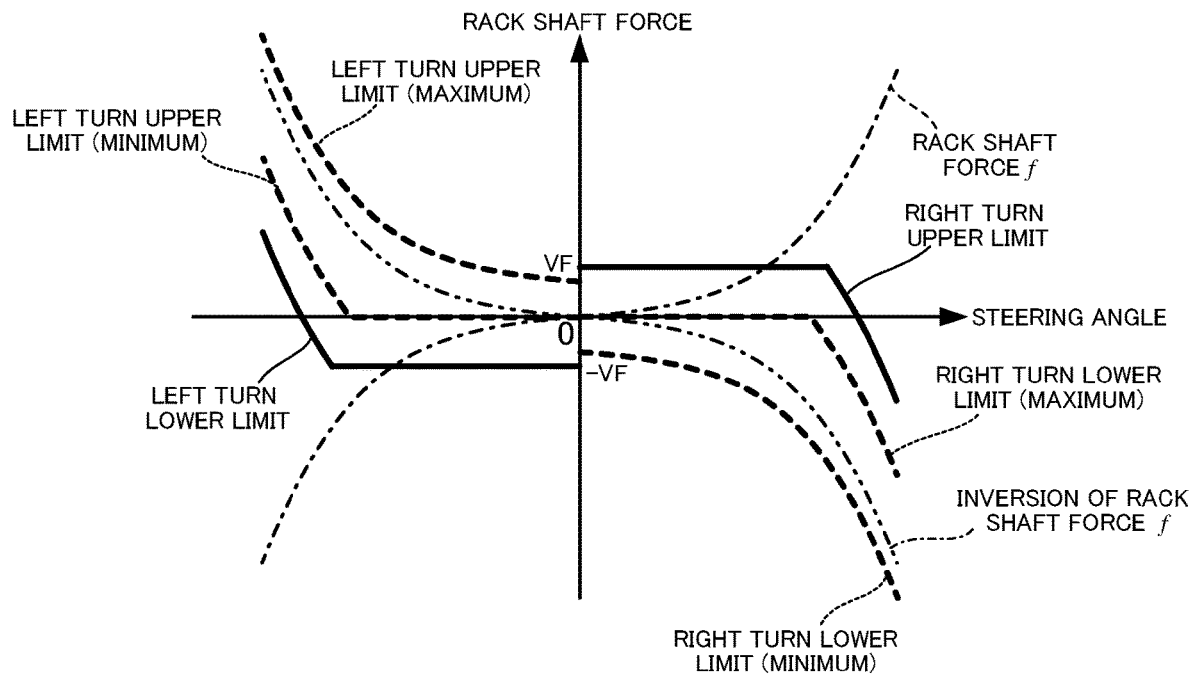
FIG. 22 is a diagram showing an example of changing a limit value.

In the case of setting the limit values in this way, for example, when the rack shaft force f changes corresponding to the steering angle as shown by the one dot chain line in FIG. 22, the right turn upper limit RU and the left turn lower limit LL change as shown by the solid line, and the maximum value and the minimum value of the right turn lower limit RL and the maximum value and the minimum value of the left turn upper limit LU change as shown by the broken line.

In the rate limit processing, instead of the absolute value of the difference, it is possible to limit the difference by setting an upper limit and a lower limit with respect to the difference itself. Further, instead of the change amount of the adjustment value Va, it is possible to limit a change rate (a rate of an increase or a decrease from the previous adjustment value) by setting an upper limit (and a lower limit) with respect to the change rate.

To return the description of the configuration example shown in FIG. 19, the steering velocity calculating section 150 inputs the rack displacement x outputted from the rack end approach judging section 110, and calculates the steering velocity ω by a change amount of the rack displacement x. The steering velocity ω is inputted into the steering information extracting section 160 and the control output adjusting section 170. The steering velocity ω may be calculated by a steering angle θ or the like.

Figure 23:
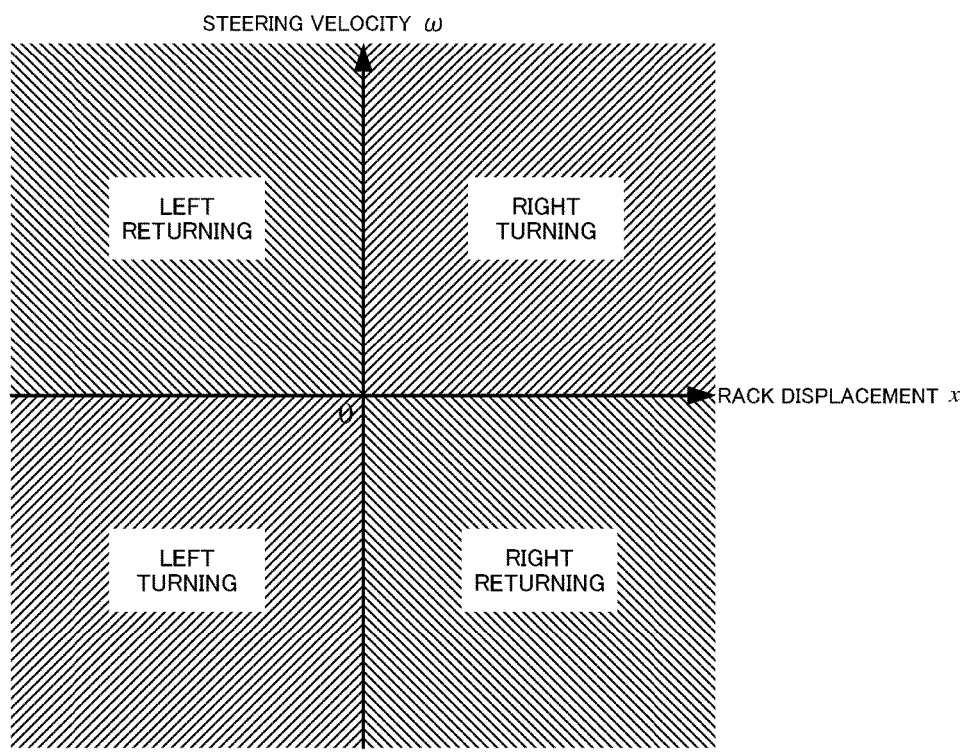
FIG. 23 is a diagram showing a judgment condition of a steering state and a steering direction.

The steering information extracting section 160 judges the steering state (turning or returning) and the steering direction (right turning or left turning) by using the rack displacement x and the steering velocity ω. That is, as shown in FIG. 23, in the case that signs of the rack displacement x and the steering velocity ω are matched, the steering information extracting section 160 judges the steering state as the "turning", in the case of not matched, the steering information extracting section 160 judges the steering state as the "returning", in the case that the rack displacement x is a positive value, the steering information extracting section 160 judges the steering direction as the "right turning", and in the case of a negative value, the steering information extracting section 160 judges the steering direction as the "left turning". The judged result of the steering state is outputted as a steering state signal Sc, and the judged result of the steering direction is outputted as a steering direction signal Sd. The steering angle θ or the like may be used instead of the rack displacement x.

Figure 24:
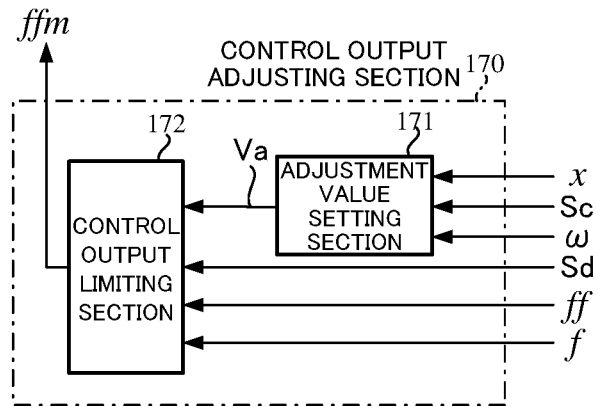
FIG. 24 is a block diagram showing a configuration example (the first embodiment) of a control output adjusting section.

The control output adjusting section 170 sets limit values based on the rack shaft force f, the rack displacement x, the steering velocity w, the steering state signal Sc and the steering direction signal Sd, and limits the rack shaft force ff by using the set limit values. A configuration example of the control output adjusting section 170 is shown in FIG. 24. The control output adjusting section 170 comprises an adjustment value setting section 171 and a control output limiting section 172. The adjustment value setting section 171 determines the adjustment value Va based on the rack displacement x, the steering velocity w and the steering state signal Sc. That is, in the case that the rack displacement x is smaller than or equal to the $x_f$ and the steering state signal Sc is the "turning", the adjustment value setting section 171 judges the steering in the first turning region, and determines the adjustment value Va by a magnitude |ω| of the steering velocity ω and the rate limit processing in accordance with the characteristics shown in FIGS. 21A and 21B. In the case that the rack displacement x exceeds the $x_f$ and the steering state signal Sc is the "turning", the adjustment value setting section 171 judges the steering in the second turning region, and determines the adjustment value Va by the magnitude |ω| of the steering velocity ω and the rate limit processing in accordance with the characteristics shown in FIGS. 21A and 21C. In the case that the steering state signal Sc is the "returning", the adjustment value setting section 171 judges the steering in the returning region, and determines the adjustment value Va by the magnitude |ω| of the steering velocity ω and the rate limit processing in accordance with the characteristics shown in FIGS. 21A and 21B. The control output limiting section 172 inputs the rack shaft forces f and ff and the steering direction signal Sd with the adjustment value Va. In the case that the steering direction signal Sd is the "right turning", the control output limiting section 172 calculates the right turn upper limit RU and the right turn lower limit RL in accordance with the expressions 33 and 34 by using the rack shaft force f, the adjustment value Va and the preset adjustment value Vf, and limits the rack shaft force ff by using the right turn upper limit RU and the right turn lower limit RL. In the case that the steering direction signal Sd is the "left turning", the control output limiting section 172 calculates the left turn upper limit LU and the left turn lower limit LL in accordance with the expressions 35 and 36 by using the rack shaft force f and the adjustment values Va and Vf, and limits the rack shaft force ff by using the left turn upper limit LU and the left turn lower limit LL. The limited rack shaft force ff is outputted to the converting section 102 as a rack shaft force ffm.

In such a configuration, an operating example of the first embodiment will be described with reference to flowcharts of FIGS. 25 to 27.

Figure 25:
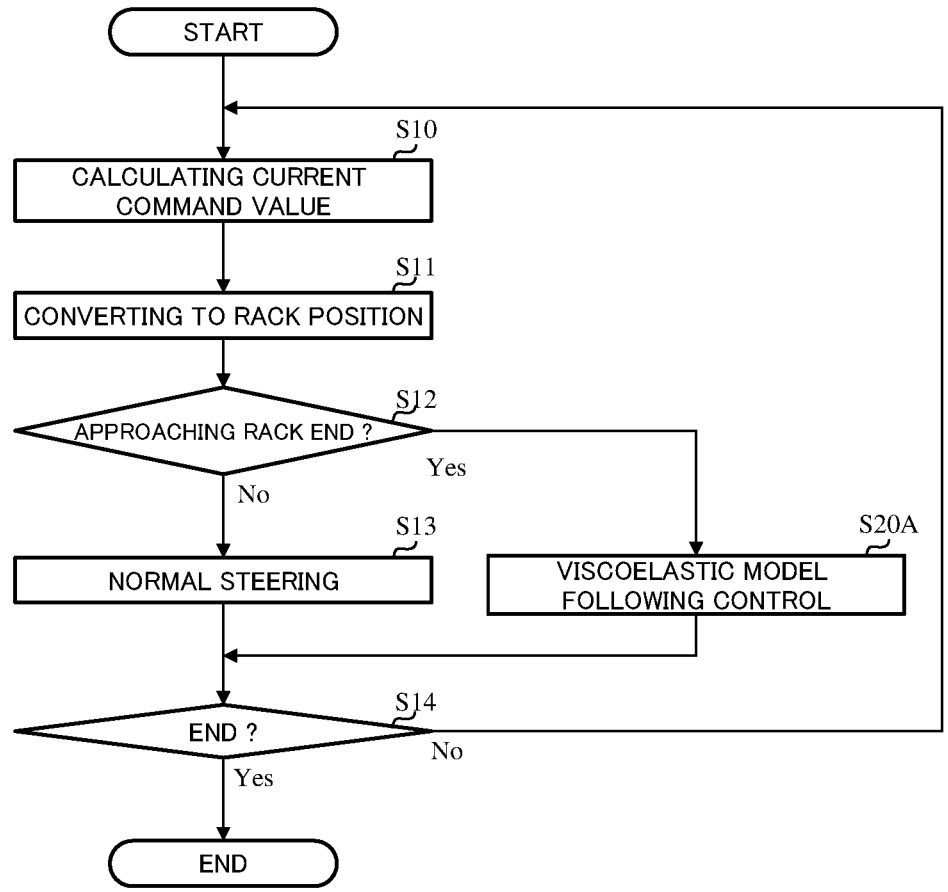
FIG. 25 is a flowchart showing a whole operating example (the first embodiment) of the present invention.

A whole operating example is shown by a flowchart in FIG. 25. Compared with the flowchart in FIG. 8, the step S20 is changed to a step S20A because processing by the control output adjustment function is added to the viscoelastic model following control.

Figure 26:
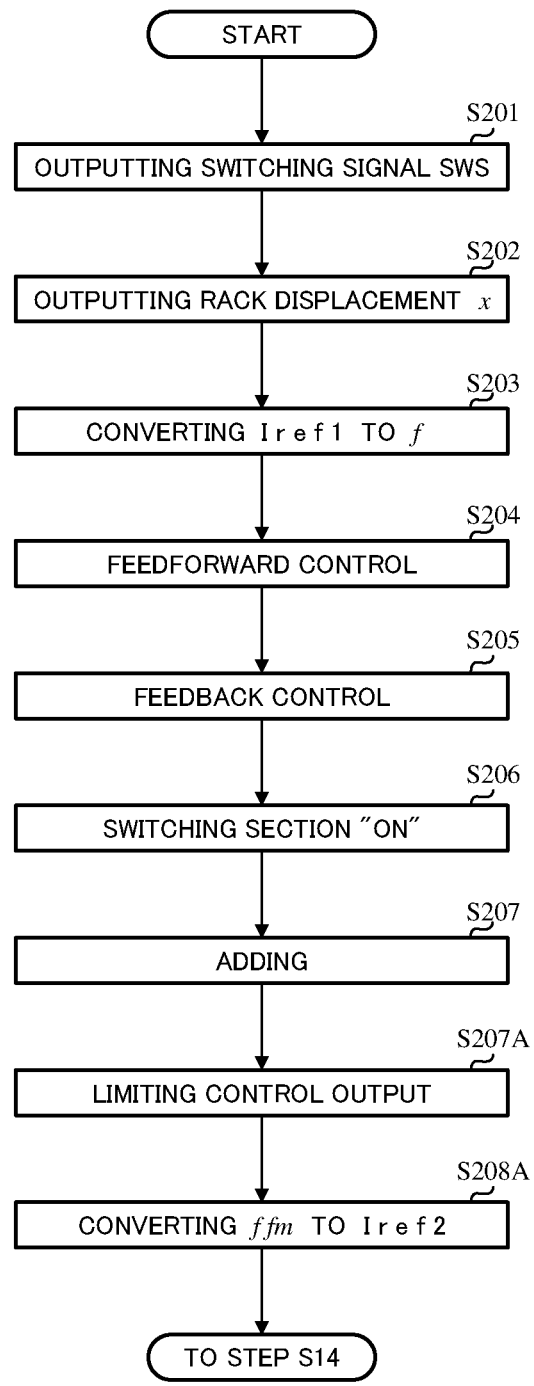
FIG. 26 is a flowchart showing an operating example (the first embodiment) of the viscoelastic model following control.
Figure 27:
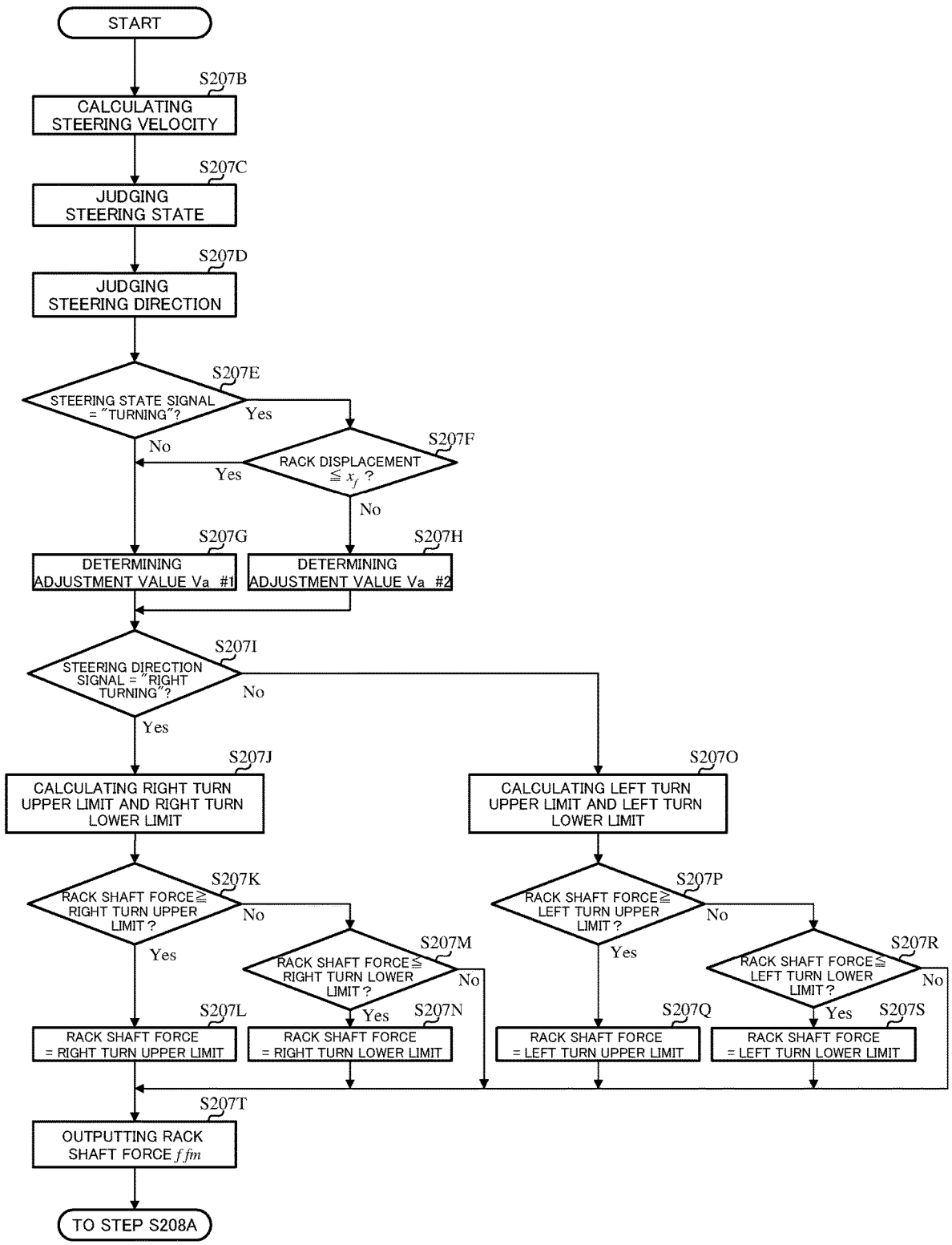
FIG. 27 is a flowchart showing an operating example (the first embodiment) of limiting a control output.

An operating example of the viscoelastic model following control (Step S20A) is shown by a flowchart in FIG. 26. Compared with the flowchart in FIG. 9, a step S207A is added, and the step S208 is changed to a step S208A. In the step S207A, the control output adjustment function is performed by the steering velocity calculating section 150, the steering information extracting section 160 and the control output adjusting section 170, and the rack shaft force ff outputted from the viscoelastic model following control section 120 is limited. A detailed operating example of the step S207A is shown in FIG. 27. The steering velocity calculating section 150 calculates the steering velocity ω based on the rack displacement x outputted from the viscoelastic model following control section 120 (Step S207B).

The steering information extracting section 160 inputs the rack displacement x and the steering velocity ω, judges whether the steering state is the "turning" or the "returning" in accordance with a condition judgment as shown in FIG. 23 (Step S207C), and outputs the judged result as the steering state signal Sc. At the same time, the steering information extracting section 160 judges whether the steering direction is the "right turning" or the "left turning" (Step S207D), and outputs the judged result as the steering direction signal Sd. The steering state signal Sc and the steering direction signal Sd are inputted into the control output adjusting section 170. The control output adjusting section 170 confirms a value of the steering state signal Sc at the adjustment value setting section 171 (Step S207E). In the case that the steering state signal Sc is the "turning", when the rack displacement x is smaller than or equal to the $x_f$ (Step S207F), the adjustment value setting section 171 determines the adjustment value Va by the magnitude |ω| of the steering velocity ω and the rate limit processing in accordance with the characteristics shown in FIGS. 21A and 21B (Step S207G). When the rack displacement x exceeds the $x_f$, the adjustment value setting section 171 determines the adjustment value Va by the magnitude |ω| of the steering velocity ω and the rate limit processing in accordance with the characteristics shown in FIGS. 21A and 21C (Step S207H). In the case that the steering state signal Sc is the "returning", the adjustment value setting section 171 determines the adjustment value Va by the magnitude |ω| of the steering velocity ω and the rate limit processing in accordance with the characteristics shown in FIGS. 21A and 21B (Step S207G). The adjustment value Va is inputted into the control output limiting section 172. The control output limiting section 172 confirms a value of the steering direction signal Sd (Step S207I). In the case that the steering direction signal Sd is the "right turning", the control output limiting section 172 calculates the right turn upper limit RU and the right turn lower limit RL in accordance with the expressions 33 and 34 by using the rack shaft force f, the adjustment value Va and the adjustment value Vf (Step S207J). When the rack shaft force ff is larger than or equal to the right turn upper limit RU (Step S207K), the control output limiting section 172 sets the rack shaft force ff to the right turn upper limit RU (Step S207L), when the rack shaft force ff is smaller than or equal to the right turn lower limit RL (Step S207M), the control output limiting section 172 sets the rack shaft force ff to the right turn lower limit RL (Step S207N), and otherwise, the control output limiting section 172 does not change the value of the rack shaft force ff. In the case that the steering direction signal Sd is the "left turning" (Step S207I), the control output limiting section 172 calculates the left turn upper limit LU and the left turn lower limit LL in accordance with the expressions 35 and 36 by using the rack shaft force f, the adjustment value Va and the adjustment value Vf (Step S207O). When the rack shaft force ff is larger than or equal to the left turn upper limit LU (Step S207P), the control output limiting section 172 sets the rack shaft force ff to the left turn upper limit LU (Step S207Q), when the rack shaft force ff is smaller than or equal to the left turn lower limit LL (Step S207R), the control output limiting section 172 sets the rack shaft force ff to the left turn lower limit LL (Step S207S), and otherwise, the control output limiting section 172 does not change the value of the rack shaft force ff. The limited rack shaft force ff is outputted as the rack shaft force ffm (Step S207T). The rack shaft force ffm is converted to the current command value Iref2 at the converting section 102 (Step S208A), and the current command value Iref2 is added to the current command value Iref1 at the adding section 103.

Here, an example of changes of data (signals) in the case of steering with approaching the rack end, will be described.

Figure 28A:
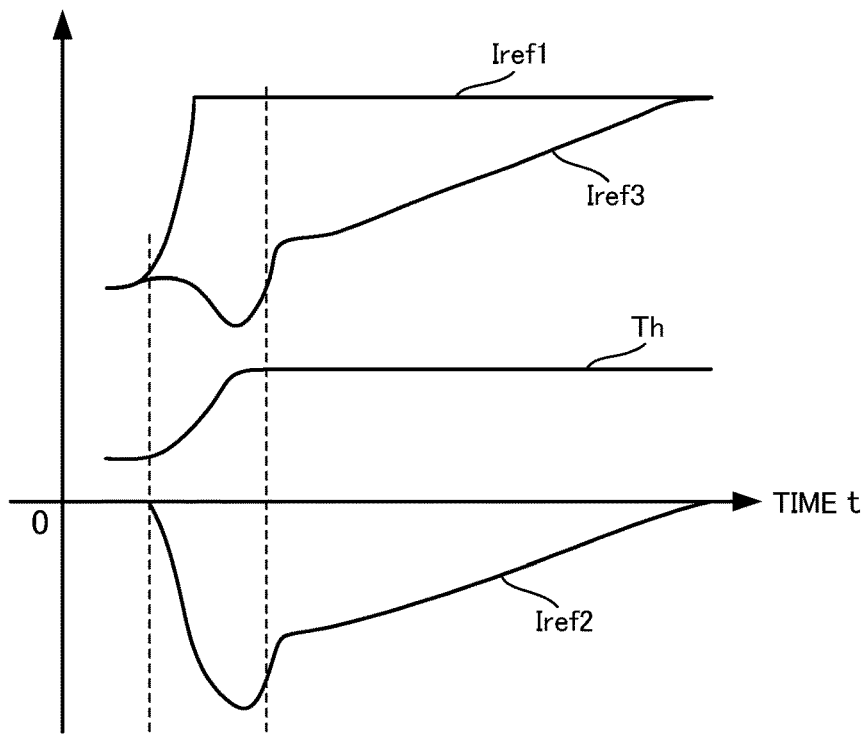
FIGS. 28A and 28B are diagrams showing an example of time-changes of respective data in the case of approaching a rack end.
Figure 28B:
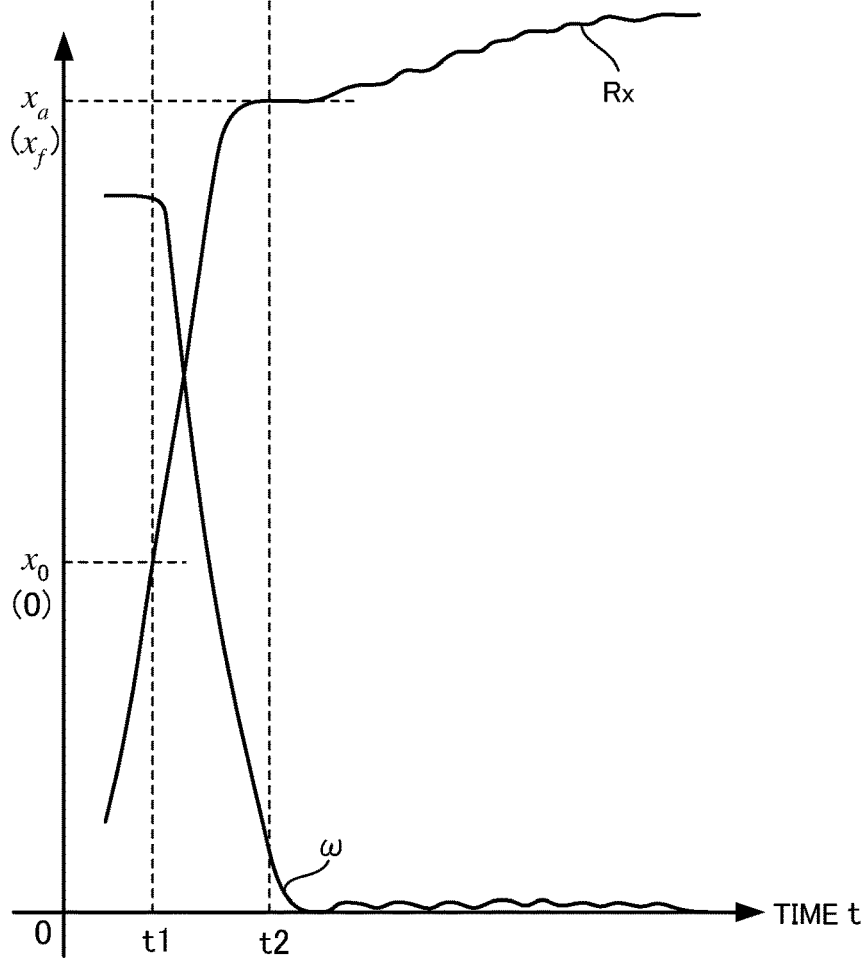

An appearance of the change in the case of steering in the direction to the right rack end, is shown in FIGS. 28A and 28B. FIG. 28A shows the appearances of the changes of the current command values Iref1, Iref2 and Iref3 and the steering torque Th, and FIG. 28B shows the appearances of the changes of the judgment rack position Rx and the steering velocity ω. In FIG. 28A, the horizontal axis shows a time t, and the vertical axis shows a current command value and a steering torque. In FIG. 28B, the horizontal axis shows a time t, the vertical axis shows a judgment rack position and a steering velocity, only a scale for the judgment rack position is described, and the corresponding rack displacement is shown in parentheses. In FIGS. 28A and 28B, the maximum adjustment value Vah is set to a value corresponding to the maximum value of the current command value Iref1.

The steering is performed in the direction to the right rack end, and when the judgment rack position Rx exceeds the predetermined position $x_0$ at the time point t1, the current command value Iref2 is outputted, so that the steering torque Th increases, and the steering velocity ω decreases. The steering is further performed in the direction to the rack end, the judgment rack position Rx exceeds the threshold position $x_a$ (the rack displacement x exceeds the $x_f$) at the time point t2 and enters the second turning region, the magnitude of the steering velocity ω becomes close to zero, and the adjustment value Va gradually changes toward the maximum adjustment value Vah. Even if the steering velocity ω fluctuates in the second turning region, the change in the direction to the maximum adjustment value Vah (the "adjustment value up") is set so as to become larger than the change in the direction to the minimum adjustment value Val (the "adjustment value down") in the second turning region, so that the adjustment value Va gradually changes in substantially one direction. Accordingly, the current command value Iref2 also gradually changes in substantially one direction at a substantially constant rate. Since the current command value Iref3, which is an added result of the current command values Iref1 and Iref2 and is an instruction to a final assist force, gradually increases, this allows a driver to steer in the direction to the rack end. Since the current command value Iref2 gradually changes in substantially one direction at a substantially constant rate, the assist force does not change rapidly, and a driver can steer in the direction to the rack end without uncomfortable feeling.

Although the present embodiment performs the rate limit processing with respect to the adjustment value Va, it is possible to perform rate limit processing with respect to the right turn lower limit RL or the left turn upper limit LU. In this case, the rate limit processing is performed at the control output limiting section 172. Although the adjustment value Vf is set to a predetermined value, it may be set to a value which is set based on the steering velocity, the rack displacement and the steering state as well as the adjustment value Va. Although the left turn upper limit and the left turn lower limit are set to values obtained by replacing one of the right turn upper limit and the right turn lower limit with the other, they may not be set to such values, or the same limit values may be used in the right turn steering and the left turn steering. In the latter case, since the steering direction signal Sd is unnecessary, the judgment of the steering direction at the steering information extracting section 160 and the switching of the operations by the steering direction signal Sd are also unnecessary.

Figure 29:
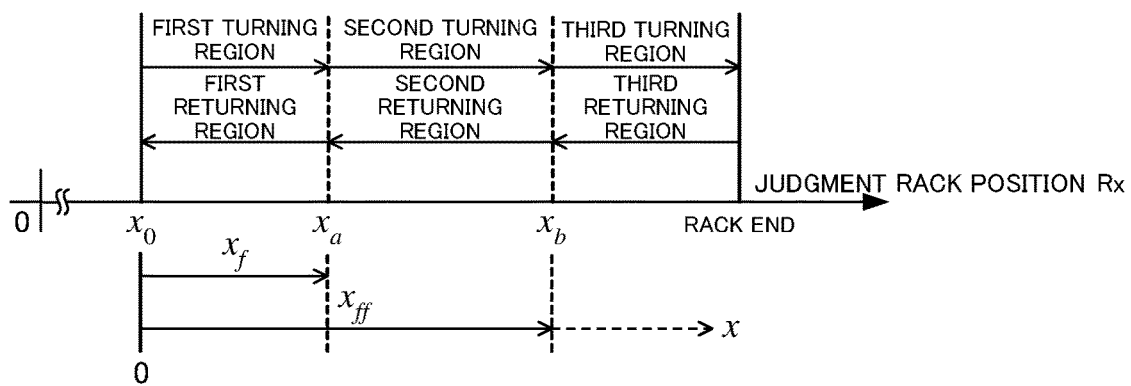
FIG. 29 is a diagram showing another example of regions defined in the rack end approach region.

Although the present embodiment separates the rack end approach region into two regions in the case that the steering state is the "turning", it is possible to separate it into three or more regions by setting a plurality of threshold positions or the like, and change the change amount of the adjustment value in respective regions. Further, even in the case that the steering state is the "returning", it is possible to separate the rack end approach region into a plurality of regions, and change the change amount of the adjustment value. For example, as shown in FIG. 29, an embodiment sets a threshold position $x_b$ (the rack displacement x at this time is referred to "$x_{ff}$") in addition to the threshold position $x_a$, separates the rack end approach region into three regions, distinguishes among the three regions even in the case that the steering state is the "returning", and sets six regions of a "first turning region", a "second turning region", a "third turning region", a "first returning region", a "second returning region", and a "third returning region". The embodiment sets the upper limit for the change amount $\Delta Va$ of the adjustment value Va, which is used in the rate limit processing, to a different value depending on each of the six regions and each of the "adjustment value up" and the "adjustment value down", as shown in the following table 1.

TABLE 1

|  | first turning region | second turning region | third turning region | first returning region | second returning region | third returning region |
|---|---|---|---|---|---|---|
| adjustment value up | $\Delta Vfu1$ | $\Delta Vfu2$ | $\Delta Vfu3$ | $\Delta Vbu1$ | $\Delta Vbu2$ | $\Delta Vbu3$ |
| adjustment value down | $\Delta Vfd1$ | $\Delta Vfd2$ | $\Delta Vfd3$ | $\Delta Vbd1$ | $\Delta Vbd2$ | $\Delta Vbd3$ |

For example, the upper limits shown in the table 1 are set so as to satisfy the following expression 37 in the following case: the change amount $\Delta Va$ in the "adjustment value up" becomes smaller (the limit becomes stronger) than that in the "adjustment value down" in the first turning region, the first returning region and the third returning region; the change amount $\Delta Va$ in the "adjustment value up" becomes larger (the limit becomes weaker) than that in the "adjustment value down" in the third turning region; and an intermediate change (limit) between the first turning region and the third turning region and an intermediate change (limit) between the first returning region and the third returning region respectively, are achieved in the second turning region and the second returning region.

$$\Delta Vfu1 < \Delta Vfd1, \Delta Vfu3 > \Delta Vfd3$$

$$\Delta Vbu1 < \Delta Vbd1, \Delta Vbu3 < \Delta Vbd3$$

$$\Delta Vfu1 \geq \Delta Vfu2 \geq \Delta Vfu3, \Delta Vfd1 \leq \Delta Vfd2 \leq \Delta Vfd3$$

$$\Delta Vbu1 \geq \Delta Vbu2 \geq \Delta Vbu3, \Delta Vbd1 \leq \Delta Vbd2 \leq \Delta Vbd3 \quad \text{[Expression 37]}$$

The upper limits are set so as to satisfy the following expression 38 in the following case: the change amount $\Delta Va$ in the "adjustment value up" becomes smaller (the limit becomes stronger) than that in the "adjustment value down" in the first turning region, the second turning region and all returning regions; and the change amount $\Delta Va$ in the "adjustment value up" becomes larger (the limit becomes weaker) than that in the "adjustment value down" in the third turning region.

$$\Delta Vfu1 < \Delta Vfd1, \Delta Vfu2 < \Delta Vfd2, \Delta Vfu3 > \Delta Vfd3$$

$$\Delta Vbu1 < \Delta Vbd1, \Delta Vbu2 < \Delta Vbd2, \Delta Vbu3 < \Delta Vbd3 \quad \text{[Expression 38]}$$

The upper limits are set so as to satisfy the following expression 39 in the following case: the change amount $\Delta Va$ in the "adjustment value up" becomes smaller (the limit becomes stronger) than that in the "adjustment value down" in the first turning region and all returning regions; and the change amount $\Delta Va$ in the "adjustment value up" becomes larger (the limit becomes weaker) than that in the "adjustment value down" in the second turning region and the third turning region.

$$\Delta Vfu1 < \Delta Vfd1, \Delta Vfu2 > \Delta Vfd2, \Delta Vfu3 > \Delta Vfd3$$

$$\Delta Vbu1 < \Delta Vbd1, \Delta Vbu2 < \Delta Vbd2, \Delta Vbu3 < \Delta Vbd3 \quad \text{[Expression 39]}$$

Although the regions in the turning and the returning coincide, they may not coincide. The number of regions set in the turning may be different from that in the returning, for example, it is possible to set three regions in the turning and set one or two regions in the returning.

The second embodiment of the present invention will be described.

The second embodiment adds a condition with respect to the steering torque Th to the setting condition of the second turning region. The second embodiment determines the adjustment value Va by the same processing as that in the second turning region in the first embodiment, in the case of satisfying a condition where the steering torque Th is larger than a predetermined threshold (a torque threshold) Thf (for example, 10 N·m) in addition to the setting condition of the second turning region in the first embodiment, where the steering state is the "turning" and the present region is a region from the threshold position $x_0$ to the rack end. When the steering torque Th is smaller than or equal to the predetermined threshold Thf, the second embodiment determines the adjustment value Va by the same processing as that in the first turning region and the returning region in the first embodiment. In this way, only when the steering torque is large, it is possible to steer to the rack end.

Figure 30:
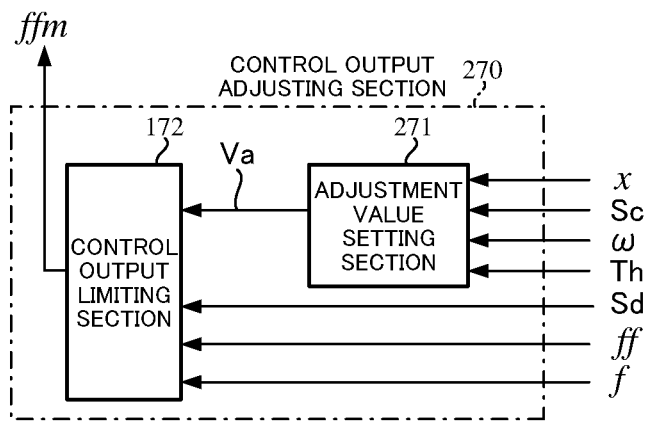
FIG. 30 is a block diagram showing a configuration example (a second embodiment) of the control output adjusting section.

Compared with the configuration example of the first embodiment shown in FIGS. 19 and 24, in a configuration example of the second embodiment, the steering torque Th is inputted into an adjustment value setting section of a control output adjusting section. A configuration example of the control output adjusting section in the second embodiment is shown in FIG. 30. In the control output adjusting section 270, the control output limiting section 172 is the same as that in the first embodiment, and the adjustment value setting section 271 determines the adjustment value Va based on the steering torque Th in addition to the rack displacement x, the steering velocity ω and the steering state signal Sc.

Figure 31:
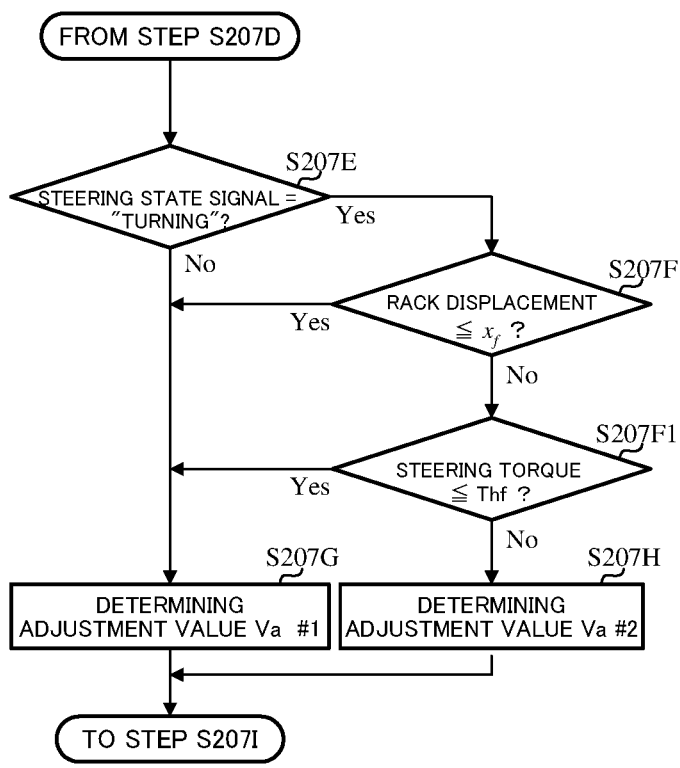
FIG. 31 is a flowchart showing an operating example (the second embodiment) of an adjustment value setting section.

With respect to operations of the second embodiment, the operation of the adjustment value setting section 271 is different from that in the operating example of the first embodiment, and the other operations are the same. An operating example of the adjustment value setting section 271 will be described with reference to a flowchart of FIG. 31.

After the operations in the steering velocity calculating section 150 and the steering information extracting section 160 (Steps S207B to 5207D) are performed, the adjustment value setting section 271 confirms a value of the steering state signal Sc (Step S207E). In the case that the steering state signal Sc is the "turning", the adjustment value setting section 271 confirms a value of the rack displacement x (Step S207F). In the case that the rack displacement x exceeds the $x_f$, when the steering torque Th is smaller than or equal to the threshold Thf (Step S207F1), the adjustment value setting section 271 determines the adjustment value Va by the magnitude $|\omega|$ of the steering velocity $\omega$ and the rate limit processing in accordance with the characteristics shown in FIGS. 21A and 21B (Step S207G). When the steering torque Th is larger than the threshold Thf (Step S207F1), the adjustment value setting section 271 determines the adjustment value Va by the magnitude $|\omega|$ of the steering velocity $\omega$ and the rate limit processing in accordance with the characteristics shown in FIGS. 21A and 21C (Step S207H). In the case that the rack displacement x is smaller than or equal to the $x_f$, the adjustment value setting section 271 determines the adjustment value Va by the magnitude $|\omega|$ of the steering velocity $\omega$ and the rate limit processing in accordance with the characteristics shown in FIGS. 21A and 21B (Step S207G). In the case that the steering state signal Sc is the "returning", the adjustment value setting section 271 determines the adjustment value Va by the same operation as that in the above case where the rack displacement x is smaller than or equal to the $x_f$ (Step S207G). The adjustment value Va is inputted into the control output limiting section 172. The control output limiting section 172 outputs the rack shaft force ffm by the same operations as those in the first embodiment (Steps S207I to 5207T).

The third embodiment of the present invention will be described.

Figure 32A:
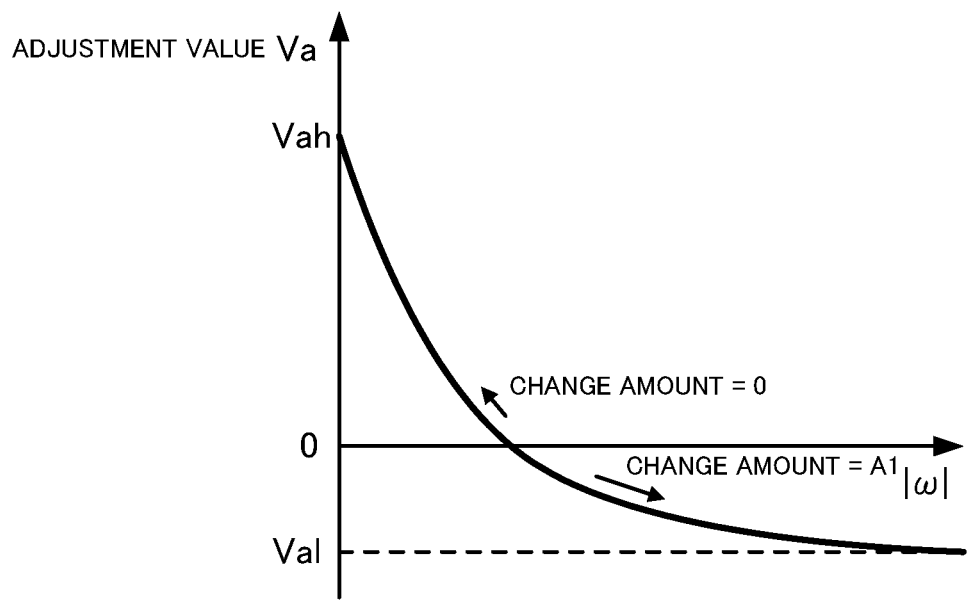
FIGS. 32A and 32B are diagrams showing characteristic examples of the adjustment value corresponding to the magnitude of the steering velocity in the case of simplifying a change of the adjustment value.
Figure 32B:
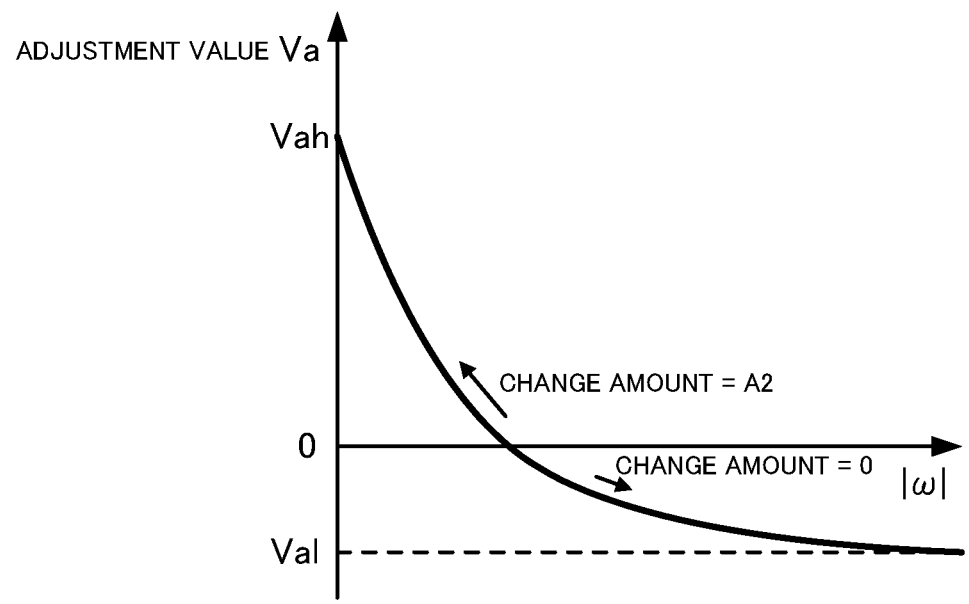

Although the first embodiment changes the adjustment value Va in the first turning region, the second turning region and the returning region in accordance with the characteristics as shown in FIGS. 21A to 21C, the third embodiment simplifies this change. Specifically, in the first turning region and the returning region, as shown in FIG. 32A, the change amount in the "adjustment value up" is set to zero, and the change amount in the "adjustment value down" is set to a predetermined small value A1 not being zero. In the second turning region, as shown in FIG. 32B, the change amount in the "adjustment value down" is set to zero, and the change amount in the "adjustment value up" is set to a predetermined small value A2 not being zero. The A1 and the A2 may be the same, or may be different. Such simplification as this enables reduction of a calculation amount and data amount for determining the adjustment value Va.

A configuration example of the third embodiment is basically the same as the configuration example of the first embodiment shown in FIGS. 19 and 24, and the operation of the adjustment value setting section in the control output adjusting section is different. That is, in the first turning region and the returning region, the adjustment value setting section sets the change amount in the "adjustment value up" to zero, and sets the change amount in the "adjustment value down" to A1. In the second turning region, the adjustment value setting section sets the change amount in the "adjustment value up" to A2, and sets the change amount in the "adjustment value down" to zero. In the case that the change amount is zero, the adjustment value Va becomes a constant value close to the maximum adjustment value Vah when the magnitude of the steering velocity $\omega$ is small, and the adjustment value Va becomes a constant value close to the minimum adjustment value Val when the magnitude of the steering velocity $\omega$ is large.

With respect to operations of the third embodiment, the operation of the adjustment value setting section is different from that in the operating example of the first embodiment as described above, and the other operations are the same.

The simplification of the change of the adjustment value Va in the third embodiment may be applied to the second embodiment. That is, in addition to in the first turning region and in the returning region, when the steering torque Th is smaller than or equal to the threshold value Thf in the second turning region the adjustment value setting section sets the change amount in the "adjustment value up" to zero, and sets the change amount in the "adjustment value down" to A1. Only when the steering torque Th is larger than the threshold value Thf in the second turning region, the adjustment value setting section sets the change amount in the "adjustment value down" to zero, and sets the change amount in the "adjustment value up" to A2.

The fourth embodiment of the present invention will be described.

Since the control output adjustment function provided for the first to the third embodiments enables the steering to the rack end, the fourth embodiment detects a steering angle (a rack displacement) at the time of actually steering to the rack end (accurately, at the time of judging the steering to the rack end), and corrects the rack end approach region so that the virtual rack end is in an appropriate range to an actual rack end by using the detected steering angle (rack displacement).

Figure 33:
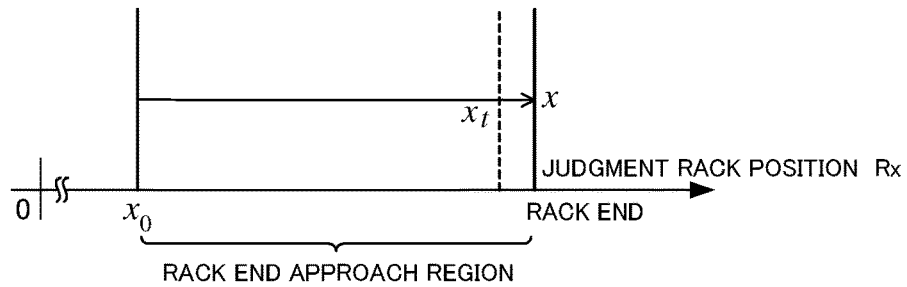
FIG. 33 is a diagram showing an example of setting a threshold for the rack displacement.

A configuration example of the fourth embodiment is basically the same as the configuration examples of the other embodiments, and an operation of a rack end approach judging section is different. That is, the rack end approach judging section judges whether to steer to the rack end based on the rack displacement x in the case of setting the origin to the predetermined position $x_0$ being a start position (a set value) of the rack end approach region, and when judging the steering has been performed to the rack end, the rack end approach judging section updates the predetermined position $x_0$ by using the rack displacement x at this point. The judgment whether to steer to the rack end is performed by setting a threshold (a virtual end threshold) for the rack displacement x. For example, as shown in FIG. 33, the fourth embodiment sets a threshold $x_t$ as the virtual end threshold in the vicinity of the rack end, and when the rack displacement x exceeds the threshold $x_t$, the fourth embodiment judges that the steering is performed to the rack end. FIG. 33 shows only the right side to the origin, and the virtual end threshold in the left side is also similarly set. The update of the predetermined position $x_0$ is performed by calculating a length (hereinafter referred to an "excess length") Ex ($=x-x_t$) in which the rack displacement x exceeds the threshold $x_t$, and adding the excess length Ex to the predetermined position $x_0$. The update of the predetermined position $x_0$ is performed when the fourth embodiment judges that the judgment rack position Rx is smaller than or equal to the predetermined position $x_0$, that is, the judgment rack position Rx is out of the rack end approach region after judging that the steering has been performed to the rack end. In the case of judging the steering to the rack end multiple times until judging out of the rack end approach region, the fourth embodiment updates the predetermined position $x_0$ by using the maximum value (hereinafter referred to a "maximum excess length") Exm among the excess lengths Ex calculated at respective times. It is possible not to use the maximum value, but to use an average or the like.

Figure 34:
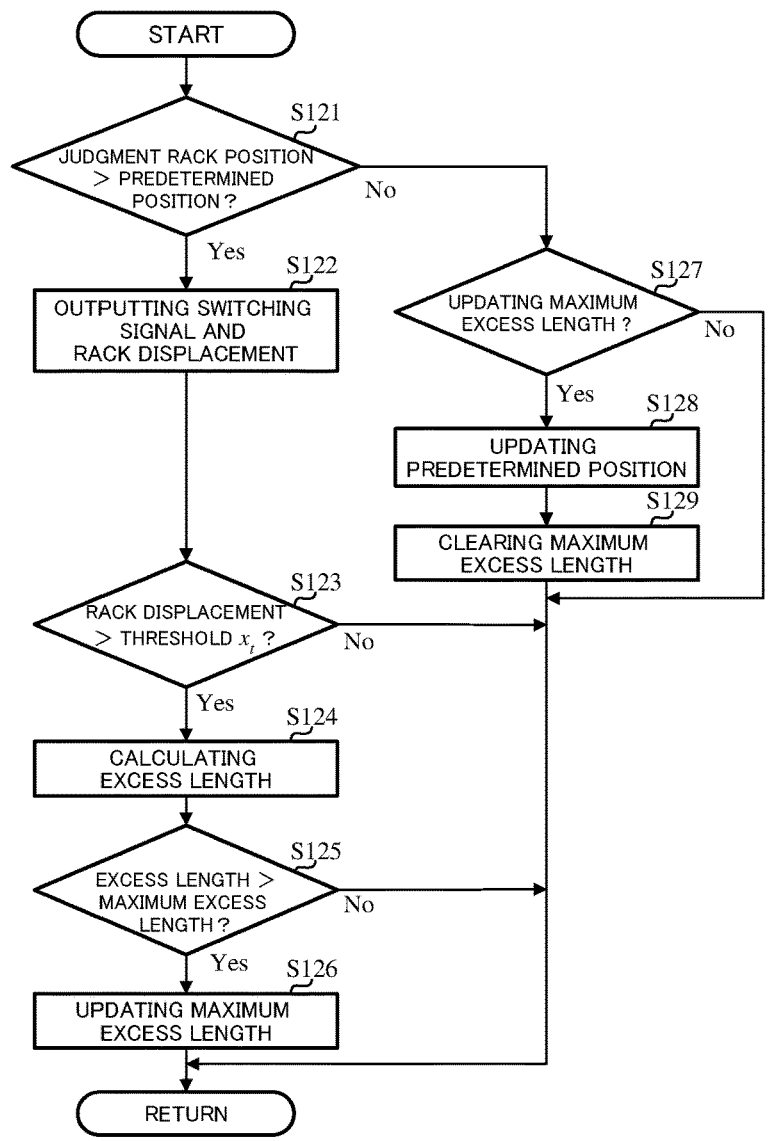
FIG. 34 is a flowchart showing an operating example (a fourth embodiment) of a rack end approach judging section.

With respect to operations of the fourth embodiment, the operation of the rack end approach judging section is different from those in the operating examples of the other embodiments as described above, and the other operations are the same. An operating example of the rack end approach judging section in the fourth embodiment will be described with reference to a flowchart of FIG. 34. When the operation is started, the maximum excess length Exm is set to zero.

The rack end approach judging section inputs the judgment rack position Rx outputted from the rack position converting section 100, and confirms whether the judgment rack position Rx exceeds the predetermined position $x_0$ or not (Step S121). In the case that the judgment rack position Rx exceeds the predetermined position $x_0$, the rack end approach judging section judges the rack end approach, and outputs the switching signal SWS and the rack displacement x (Step S122). Further, in the case that the rack displacement x exceeds the threshold $x_t$ (Step S123), the rack end approach judging section calculates the excess length Ex (Step S124). In the case that the excess length Ex is larger than the maximum excess length Exm (Step S125), the rack end approach judging section assigns the excess length Ex to the maximum excess length Exm (Step S126). In the case that the excess length Ex is smaller than or equal to the maximum excess length Exm, the update of the maximum excess length Exm is not performed, and in the case that the rack displacement x does not exceed the threshold $x_t$, the calculation of the excess length Ex is not also performed. In the case that the judgment rack position Rx does not exceed the predetermined position $x_0$, when the maximum excess length Exm has been updated (Step S127), the rack end approach judging section updates the predetermined position $x_0$ by using the maximum excess length Exm (Step S128), and clears the maximum excess length Exm (Step S129). When the maximum excess length Exm is not updated (Step S127), the update of the predetermined position $x_0$ and the clear of the maximum excess length Exm are not performed.

Although the threshold $x_t$ is set to a fixed value, the threshold $x_t$ may be changed by, for example, subtracting a smaller value than the maximum excess length Exm from the threshold $x_t$, or the like, at each update of the predetermined position $x_0$. Further, although the update of the predetermined position $x_0$ is performed in the rack end approach judgments in the left and the right directions, the magnitude of the set threshold $x_t$ may be changed depending on the direction. The judgment whether to steer to the rack end and the update of the predetermined position $x_0$ may be performed based on not the rack displacement x but the judgment rack position Rx, setting a position being a threshold for the judgment rack position Rx. The judgment whether to steer to the rack end may be performed by using a column shaft angle (a steering wheel angle) and a column shaft angle threshold $\theta_t$ (a value corresponding to the threshold $x_t$).

Even in the second to the fourth embodiments, for example, as shown in FIG. 29, it is possible to separate the rack end approach region into three or more regions, and change the change amount of the adjustment value in respective regions. Even in the case that the steering state is the "returning", it is possible to separate the rack end approach region into a plurality of regions, and change the change amount of the adjustment value. In this case, the region furthest from the rack end (the region from the predetermined position $x_0$ to the threshold position $x_a$ in FIG. 29) is included in a region far from the rack end, and the region closest to the rack end (a region from the threshold position $x_b$ to the rack end in FIG. 29) is included in a region close to the rack end.

Next, embodiments (a fifth to a ninth embodiments) performing processing considering the increase of the reaction force, will be described.

Figure 35:
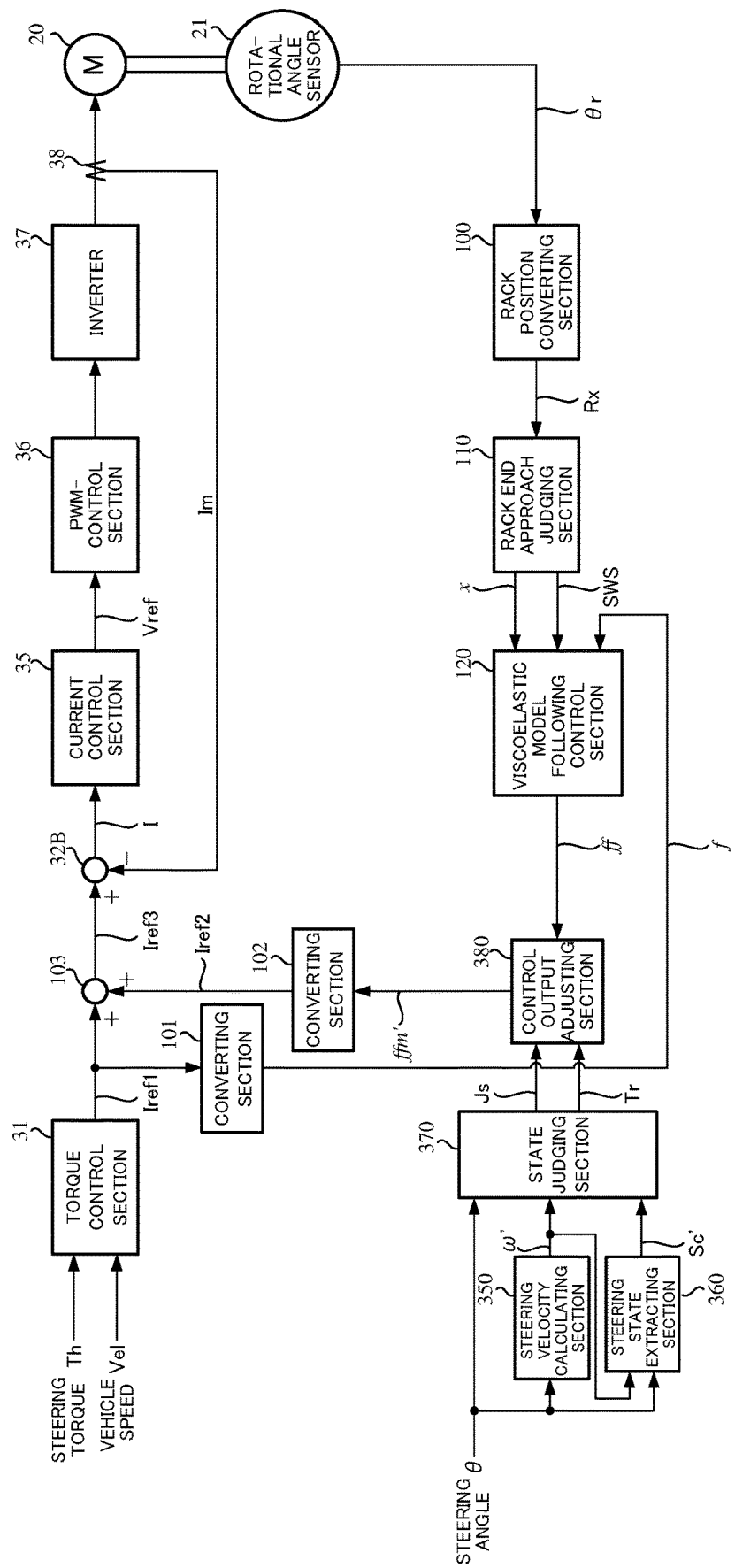
FIG. 35 is a block diagram showing a configuration example (a fifth embodiment) of the present invention.

FIG. 35 shows a configuration example of the fifth embodiment corresponding to FIG. 4. Compared with the configuration example shown in FIG. 4, a steering velocity calculating section 350, a steering state extracting section 360, a state judging section 370, and a control output adjusting section 380 are added, and these sections achieve the control output adjustment function.

In the present embodiment, a state of steering at a steering velocity ωz [deg/sec] (for example, 5 deg/sec) in a region where a magnitude |θ| of a steering angle is larger than or equal to θd, is assumed (hereinafter the steering velocity ωz is referred to a "virtual steering velocity"). Further, it is assumed that the reaction force (SAT) approximately increases at an inclination Bi, as shown in FIG. 3. An increase rate Ft [N·m/sec] of the reaction force in this case is obtained in accordance with the following expression 40.

$$Ft \text{ [N·m/sec]} = Bi \text{ [N·m/deg]} \times \omega z \text{[deg/sec]} \qquad \text{[Expression 40]}$$

Therefore, in order to compensate the increase of the reaction force, the compensatory assist force may be also increased at the above increase rate of Ft. Further, in a state (an assist increasing state) where the magnitude |θ| of the steering angle exceeds the threshold θz, a magnitude |ω'| of a steering velocity ω' is small than the virtual steering velocity ωz, and the steering state is the "turning", the compensatory assist force is made increased. It is because in the case that the magnitude |ω'| of the steering velocity is larger than or equal to the virtual steering velocity ωz, a whole assist force is recovered to a level of steering at its steering velocity, so that it is unnecessary to recover the assist force to more than its level. It is also because in the case that the steering state is the "returning", the assist in the returning direction is necessary and it is necessary to decrease the compensatory assist force.

The steering velocity calculating section 350 calculates the steering velocity ω' from the steering angle θ. The steering velocity ω' may be calculated from the rack displacement x or the like.

Figure 36:
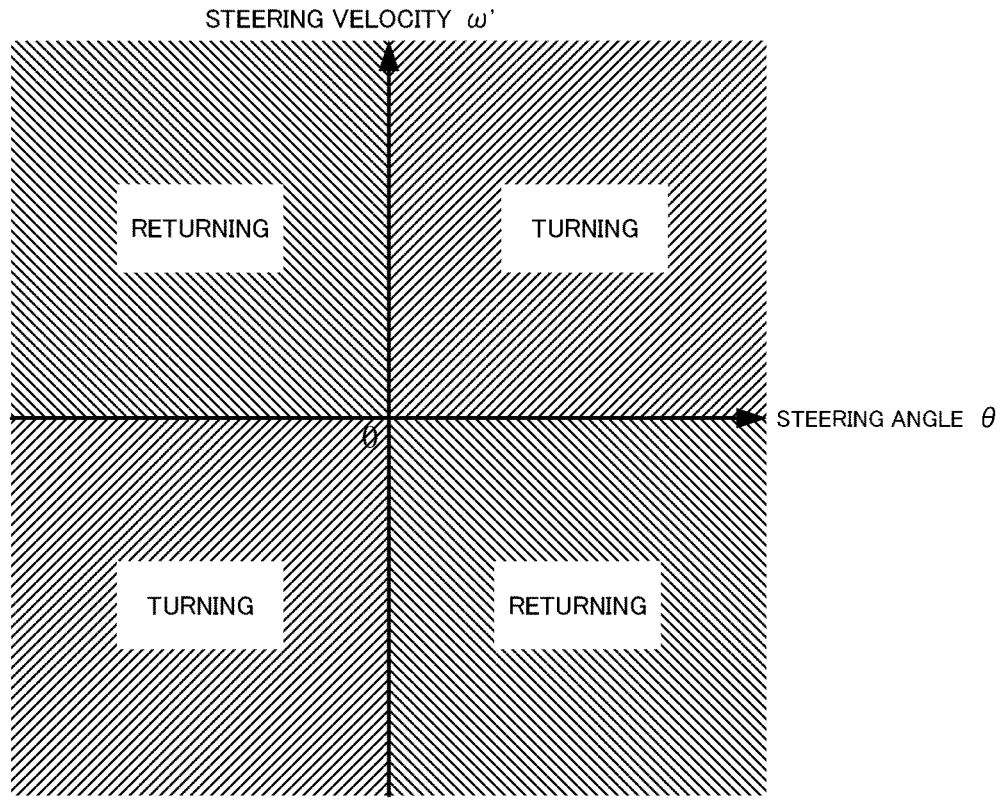
FIG. 36 is a diagram showing a judgment condition of the steering state.

The steering state extracting section 360 judges the steering state (turning or returning) by using the steering angle 19 and the steering velocity ω'. That is, as shown in FIG. 36, when signs of the steering angle θ and the steering velocity ω' are matched, the steering state extracting section 360 judges the steering state as the "turning", and when not matched, the steering state extracting section 360 judges the steering state as the "returning". The judged result is outputted as a steering state signal Sc'. The rack displacement x or the like may be used instead of the steering angle θ.

The state judging section 370 judges a state of approaching the rack end, which determines increase or decrease in the compensatory assist force, by using the steering angle θ, the steering velocity ω' and the steering state signal Sc', and outputs the judged result as a judgment signal Js. Specifically, in the case that the magnitude |θ| of the steering angle is smaller than or equal to the threshold θz, the state judging section 370 sets Js=0. In the case that the magnitude |θ| of the steering angle is larger than the threshold θz, when the magnitude |ω'| of the steering velocity is smaller than the virtual steering velocity ωz and the steering state signal Sc' is the "turning", the state judging section 370 sets Js=1. When the magnitude |ω'| of the steering velocity is larger than or equal to the virtual steering velocity ωz and the steering state signal Sc' is the "turning", the state judging section 370 sets Js=2. When the steering state signal Sc' is the "returning", the state judging section 370 sets Js=3. In the case of outputting the judgment signal Js set to 3, the state judging section 370 outputs also a time (hereinafter referred to a "decrease time") Tr calculated in accordance with the following expression 41.

$$Tr = \frac{|\theta| - \theta_Z}{|\omega'|} \quad \text{[Expression 41]}$$

Assuming that in the case that the steering state becomes the "returning" after the magnitude |θ| of the steering angle exceeds the threshold θz, the steering at the steering velocity at the time when the steering state becomes the "returning" is continued afterwards, the decrease time Tr represents a time until the magnitude |θ| of the steering angle becomes the threshold θz. The control output adjusting section 380 decreases the compensatory assist force at a decrease rate calculated from this decrease time Tr, in the case that the judgment signal Js is 3.

The control output adjusting section 380 adjusts the rack shaft force ff outputted from the viscoelastic model following control section 120 based on a value of the judgment signal Js by increase or decrease in the compensatory assist force. In the case that the judgment signal Js is 0, the control output adjusting section 380 does not add the compensatory assist force to the rack shaft force ff because of the steering in a region where it is unnecessary to compensate the increase of the reaction force. In the case that the judgment signal Js is 1, the control output adjusting section 380 adds the compensatory assist force increased at the increase rate Ft to the rack shaft force ff. In the case that the judgment signal Js is 2, since the whole assist force has been recovered, the control output adjusting section 380 does not increase the compensatory assist force, and adds the compensatory assist force in the previous control period to the rack shaft force ff. In the case that the judgment signal Js is 3, since the steering state is the returning, the control output adjusting section 380 adds the decreased compensatory assist force to the rack shaft force ff.

Figure 37:
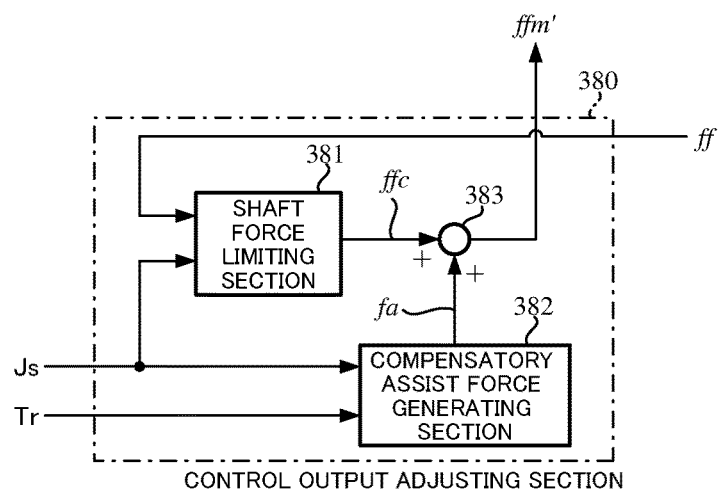
FIG. 37 is a block diagram showing a configuration example (the fifth embodiment) of the control output adjusting section.

A configuration example of the control output adjusting section 380 is shown in FIG. 37. The control output adjusting section 380 comprises a shaft force limiting section 381, a compensatory assist force generating section 382 and an adding section 383.

The shaft force limiting section 381 limits the rack shaft force ff depending on the judgment signal Js. That is, when the judgment signal Js changes from 0 to 1, the shaft force limiting section 381 stores the rack shaft force ff at this time as a rack shaft force ffx, limits the rack shaft force ff by using the rack shaft force ffx as a limit value until the judgment signal Js becomes 0, and outputs the limited rack shaft force as a rack shaft force ffc. In the case that the judgment signal Js is 0, the shaft force limiting section 381 outputs the rack shaft force ff as the rack shaft force ffc.

The compensatory assist force generating section 382 generates a compensatory assist force fa corresponding to the judgment signal Js. In the case that the judgment signal Js is 0, the compensatory assist force generating section 382 sets the compensatory assist force fa to zero. In the case that the judgment signal Js is 1, the compensatory assist force generating section 382 increases the compensatory assist force fa at the increase rate Ft. That is, the compensatory assist force generating section sets an initial value of the compensatory assist force fa to zero, and increases the compensatory assist force fa at the increase rate Ft in proportion to time. In the case that the judgment signal Js is 2, the compensatory assist force generating section 382 neither increases nor decreases the compensatory assist force fa, and leaves it to be the previous value. In the case that the judgment signal Js is 3, the compensatory assist force generating section 382 decreases the compensatory assist force fa at a decrease rate (=fa/Tr) [N·m/sec] obtained by dividing the compensatory assist force fa at this time by the decrease time Tr. Since the compensatory assist force generating section 382 uses the decrease rate calculated in each control period, the compensatory assist force fa becomes zero when the magnitude |e| of the steering angle becomes the threshold θz.

The rack shaft force ffc and the compensatory assist force fa are added at the adding section 383, and the added result is outputted as a rack shaft force ffm'.

Thus, the control output adjusting section 380 limits the rack shaft force from a time point of becoming the assist increasing state at the shaft force limiting section 381, adjusts the compensatory assist force added to the rack shaft force at the compensatory assist force generating section 382 in a region where the magnitude |e| of the steering angle exceeds the threshold θz, so that the control output adjusting section 380 can perform the control considering the increase of the reaction force. Since the compensatory assist force compensates for the increase of the reaction force, a driver can steer to the rack end, and this enables reduction in an influence on a turning radius. Further, when the steering velocity is fast, since the assist force is not increased, it is possible to lower a possibility of hitting the rack end at a high velocity.

In such a configuration, an operating example of the fifth embodiment will be described with reference to flowcharts of FIGS. 38 to 40. The compensatory assist force fa in the compensatory assist force generating section 382 is set to zero as an initial value.

Figure 38:
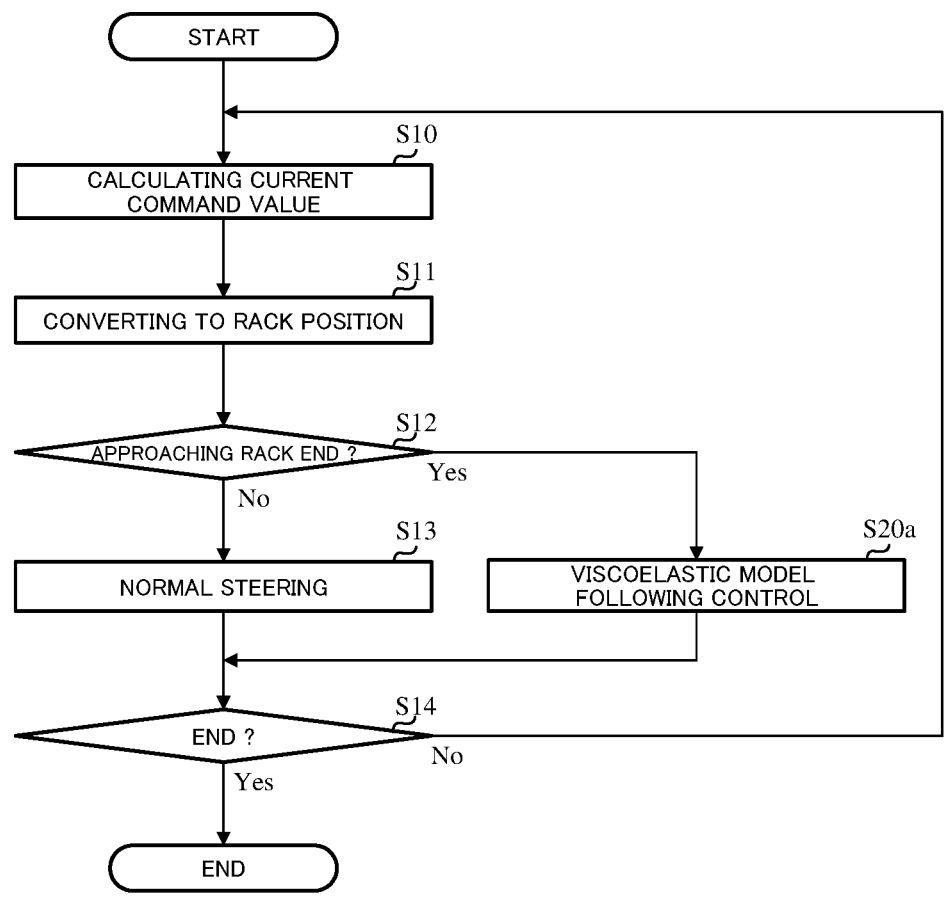
FIG. 38 is a flowchart showing a whole operating example (the fifth embodiment) of the present invention.

A whole operating example is shown by a flowchart in FIG. 38. Compared with the flowchart in FIG. 8, the step 20 is changed to a step S20a because processing by the control output adjustment function is added to the viscoelastic model following control.

Figure 39:
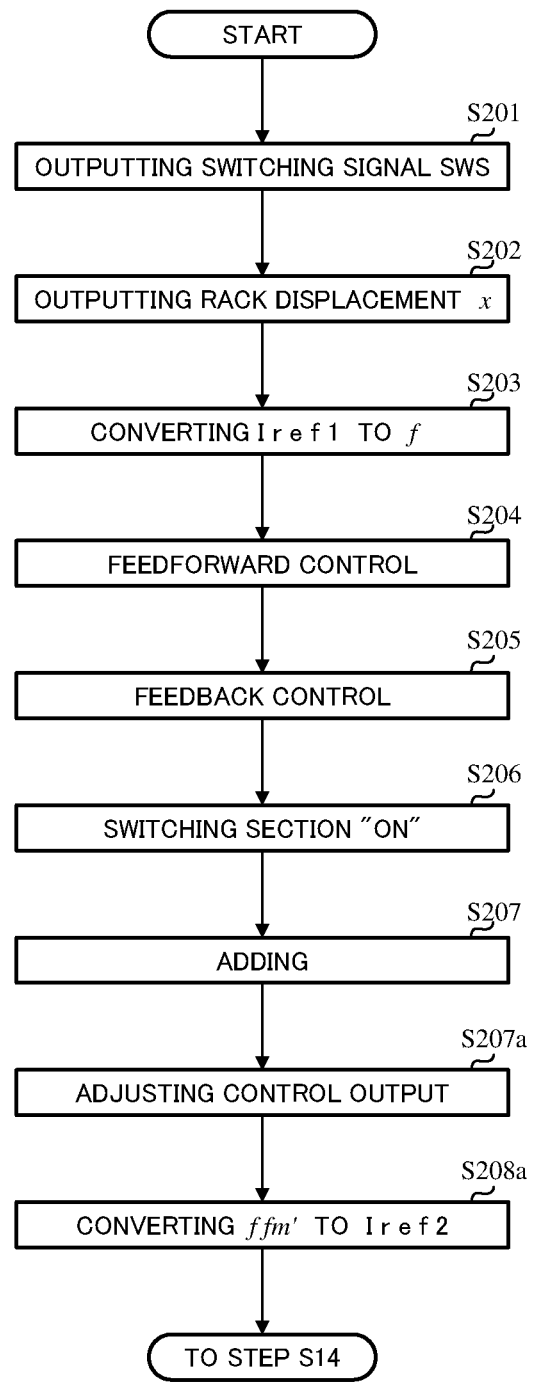
FIG. 39 is a flowchart showing an operating example (the fifth embodiment) of the viscoelastic model following control.
Figure 40:
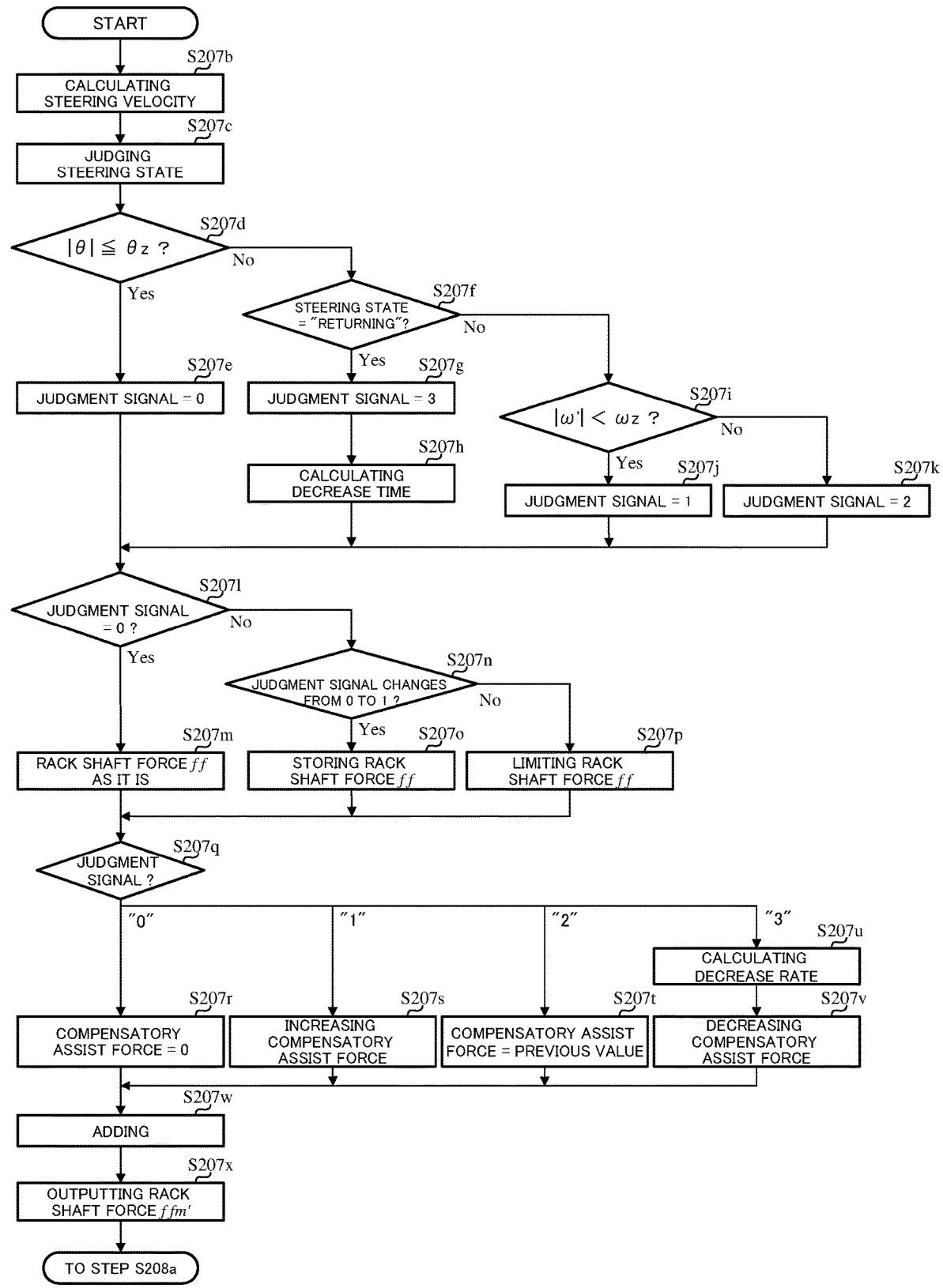
FIG. 40 is a flowchart showing an operating example (the fifth embodiment) of adjusting the control output.

An operating example of the viscoelastic model following control (Step S20a) is shown by a flowchart in FIG. 39. Compared with the flowchart in FIG. 9, a step S207a is added, and the step S208 is changed to a step S208a. In the step S207a, the control output adjustment function is performed by the steering velocity calculating section 350, the steering state extracting section 360, the state judging section 370 and the control output adjusting section 380, and the rack shaft force ff outputted from the viscoelastic model following control section 120 is adjusted. A detailed operating example of the step S207a is shown in FIG. 40. The steering velocity calculating section 350 inputs the steering angle θ, and calculates a steering velocity ω' from the steering angle θ (Step S207b). The steering velocity ω' is inputted into the steering state extracting section 360 and the state judging section 370. The steering state extracting section 360 inputs the steering angle θ with the steering velocity ω', judges whether the steering state is the "turning" or the "returning" in accordance with the condition judgment as shown in FIG. 36 (Step S207c), and outputs the judged result as the steering state signal Sc' to the state judging section 370. The state judging section 370 inputs the steering angle θ, the steering velocity ω' and the steering state signal Sc', judges the state of approaching the rack end, and outputs the judgment signal Js. Specifically, in the case that the magnitude |θ| of the steering angle is smaller than or equal to the threshold θz (Step S207d), the state judging section 370 sets the judgment signal Js to 0 (Step S207e). In the case that the magnitude |θ| of the steering angle is larger than the threshold θz (Step S207d), when the steering state signal Sc' is the "returning" (Step S207f), the state judging section 370 sets the judgment signal Js to 3 (Step S207g), calculates the decrease time Tr in accordance with the expression 41 (Step S207h), and outputs the decrease time Tr to the control output adjusting section 380. When the steering state signal Sc' is the "turning" (Step S207f), in the case that the magnitude |ω'| of the steering velocity is smaller than the virtual steering velocity ωz (Step S207i), the state judging section 370 sets the judgment signal Js to 1 (Step S207j). In the case that the magnitude |ω'| of the steering velocity is larger than or equal to the virtual steering velocity ωz (Step S207i), the state judging section 370 sets the judgment signal Js to 2 (Step S207k). The judgment signal Js is inputted into the control output adjusting section 380. In the control output adjusting section 380, the shaft force limiting section 381 confirms a value of the judgment signal Js. In the case that the judgment signal Js is 0 (Step S207l), the shaft force limiting section 381 outputs the rack shaft force ff as the rack shaft force ffc (Step S207m). In the case that the judgment signal Js is other than 0 (Step S207l), when the judgment signal Js just changes from 0 to 1 (Step S207n), the shaft force limiting section 381 stores the inputted rack shaft force ff as the rack shaft force ffx (Step S207o), and outputs the rack shaft force ffx as the rack shaft force ffc. Otherwise, the shaft force limiting section 381 limits the rack shaft force ff by using the rack shaft force ffx as a limit value (Step S207p), and outputs the limited rack shaft force ff as the rack shaft force ffc. The rack shaft force ffc is inputted into the adding section 383. The compensatory assist force generating section 382 also confirms the value of the judgment signal Js (Step S207q). In the case that the judgment signal Js is 0, the compensatory assist force generating section 382 outputs the compensatory assist force fa set to 0 (Step S207r). In the case that the judgment signal Js is 1, the compensatory assist force generating section 382 outputs the compensatory assist force fa increased at the increase rate Ft (Step S207s). In the case that the judgment signal Js is 2, the compensatory assist force generating section 382 outputs the compensatory assist force fa left to be the previous value (Step S207t). In the case that the judgment signal Js is 3, the compensatory assist force generating section 382 calculates the decrease rate by dividing the compensatory assist force fa at this time by the decrease time Tr (Step S207u), and outputs the compensatory assist force fa decreased at the calculated decrease rate (Step S207v). The compensatory assist force fa is inputted into the adding section 383, is added to the rack shaft force ffc (Step S207w), and the added result is outputted as the rack shaft force ffm' (Step S207x). The rack shaft force ffm' is converted to the current command value Iref2 at the converting section 102 (Step S208a), and the current command value Iref2 is added to the current command value Iref1 at the adding section 103. The order of the operations of the shaft force limiting section 381 and the compensatory assist force generating section 382 in the control output adjusting section 380 may be reverse, or both operations may be performed in parallel.

The sixth embodiment of the present invention will be described.

Figure 41:
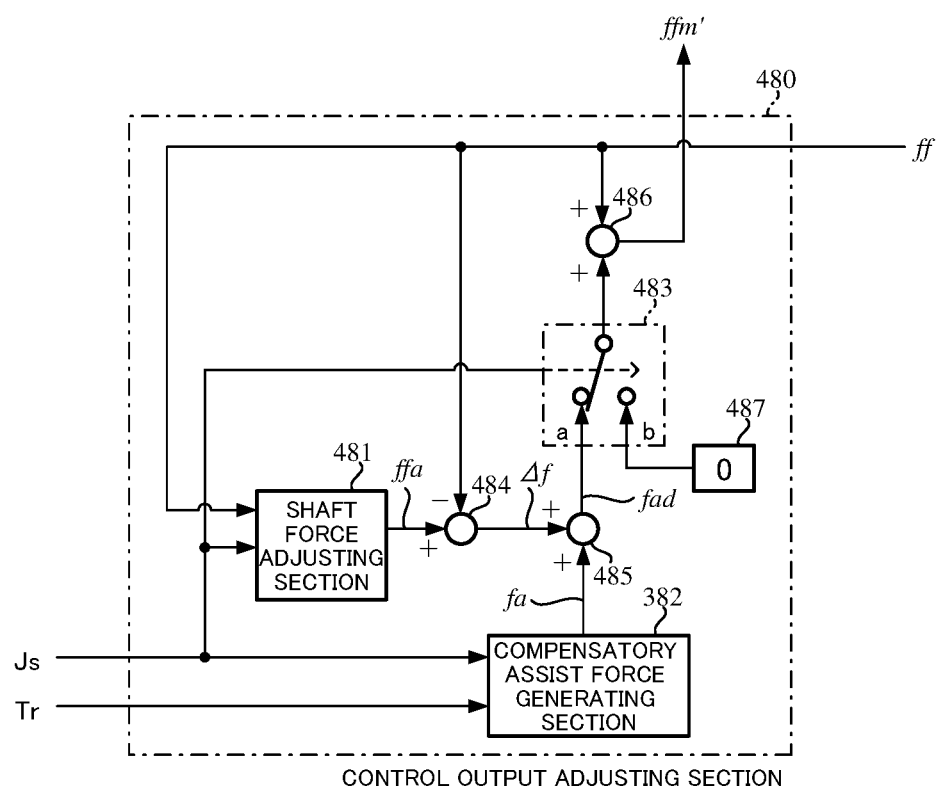
FIG. 41 is a block diagram showing a configuration example (a sixth embodiment) of the control output adjusting section.

In the fifth embodiment, the shaft force limiting section 381 in the control output adjusting section 380 limits the rack shaft force ff by using the rack shaft force ffx as a limit value until the judgment signal Js becomes 0. It is, however, possible to outputs the rack shaft force ffx as the rack shaft force ffc until the judgment signal Js becomes 0. In this case, it is also possible to achieve the processing by a configuration different from the control output adjusting section 380. A configuration example (the sixth embodiment) of it is shown in FIG. 41. A control output adjusting section 480 of the sixth embodiment comprises a shaft force adjusting section 481, the compensatory assist force generating section 382, a switching section 483, a subtracting section 484, adding sections 485 and 486, and a fixing section 487.

When the judgment signal Js changes from 0 to 1, the shaft force adjusting section 481 stores the rack shaft force ff at this time as the rack shaft force ffx, and outputs the rack shaft force ffx as a rack shaft force ffa until the judgment signal Js becomes 0. When the judgment signal Js is 0, the shaft force adjusting section 481 outputs the rack shaft force ff as the rack shaft force ffa.

In the switching section 483, an addition value fad from the adding section 485 is inputted into a contact point "a", and a fixed value "0" outputted from the fixing section 487 is inputted into a contact point "b". The switching section 483 switches the contact points depending on a value of the judgment signal Js. That is, in the case that the judgment signal Js is 1, 2 or 3, the switching section 483 connects the contact point "a", and in the case that the judgment signal Js is 0, the switching section 483 connects the contact point "b".

The compensatory assist force generating section 382 is the same as that in the fifth embodiment.

A difference Δf (=ffa−ff) between the rack shaft force ffa and the rack shaft force ff is calculated at the subtracting section 484. The addition value fad (=Δf+fa) of the difference Δf and the compensatory assist force fa is calculated at the adding section 485. An output from the switching section 483 and the rack shaft force ff are added at the adding section 486, and the added result is outputted as the rack shaft force ffm'.

With this configuration, in the case that the judgment signal Js is 1, 2 or 3, the switching section 483 connects the contact point "a", so that the rack shaft force ffm' becomes an addition value of the rack shaft force ffa and the compensatory assist force fa as known from the following expression 42.

$$ffm' = ff + fad \qquad \text{[Expression 42]}$$
$$= ff + (\Delta f + fa)$$
$$= ff + (ffa - ff) + fa$$
$$= ffa + fa$$

In the case that the judgment signal Js is 1, 2 or 3, since the rack shaft force ffa is constant at the stored rack shaft force ffx, the rack shaft force ffm' is adjusted by increase or decrease in the compensatory assist force fa. In the case that the judgment signal Js is 0, since the switching section 483 connects the contact point "b" and "0" is added to the rack shaft force ff, the rack shaft force ff is outputted as the rack shaft force ffm'.

With respect to operations of the sixth embodiment, the above operation of the control output adjusting section 480 is different from that in the fifth embodiment, and the other operations are the same as those in the fifth embodiment.

Moreover, in the case that the judgment signal Js is 0, since the rack shaft force ffa and the compensatory assist force fa are not used, an operation may be acceptable that the shaft force adjusting section 481 and the compensatory assist force generating section 382 output nothing.

The seventh embodiment of the present invention will be described.

The fifth embodiment limits the rack shaft force ff at the shaft force limiting section 381 in the control output adjusting section 380, so that the fifth embodiment enables the adjustment of the rack shaft force ffm' by increase or decrease in the compensatory assist force fa. The seventh embodiment adjusts a parameter of the viscoelastic model following control section, so that the seventh embodiment obtains an effect equivalent to that by limiting the rack shaft force ff.

Figure 42:
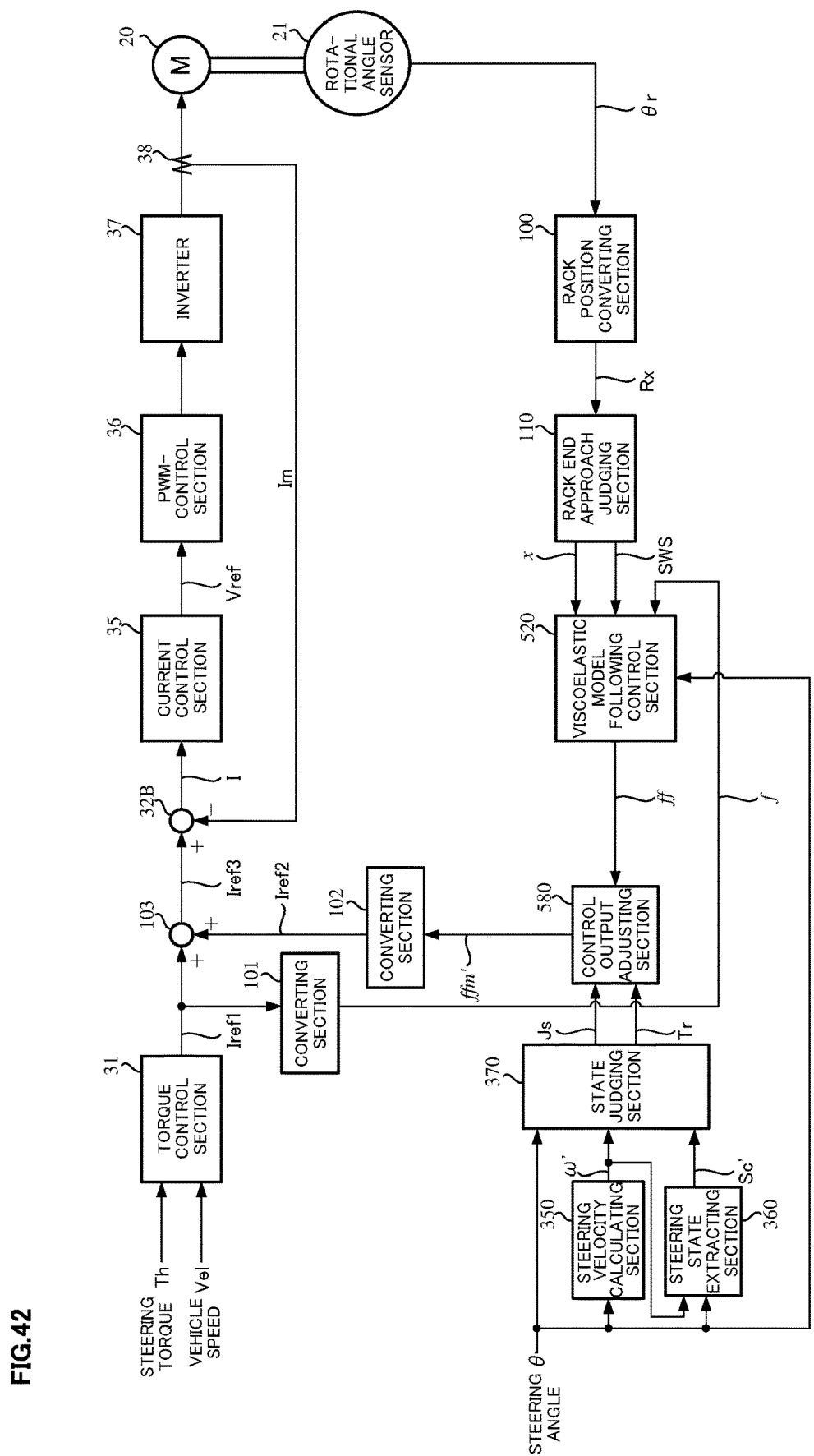
FIG. 42 is a block diagram showing a configuration example (a seventh embodiment) of the present invention.

A configuration example of the seventh embodiment is shown in FIG. 42. Compared with the configuration example of the fifth embodiment shown in FIG. 35, the viscoelastic model following control section and the control output adjusting section are changed, and the steering angle θ is inputted into a viscoelastic model following control section 520 in addition to the rack displacement x, the switching signal SWS and the rack shaft force f.

The seventh embodiment adjusts the spring constant $k_0$ among parameters of the viscoelastic model following control section. In the configuration example of the third basic embodiment shown in FIG. 15 and the configuration example of the fourth basic embodiment shown in FIG. 16, the characteristic of the spring constant $k_0$ is defined as a characteristic corresponding to the rack displacement x at the parameter setting section 124. Although the seventh embodiment also defines the characteristic of the spring constant $k_0$ at a parameter setting section, the characteristic of the spring constant $k_0$ is defined as a characteristic corresponding to not the rack displacement x but the steering angle θ. Therefore, the steering angle θ inputted into the viscoelastic model following control section 520 is inputted into the parameter setting section.

Figure 43:
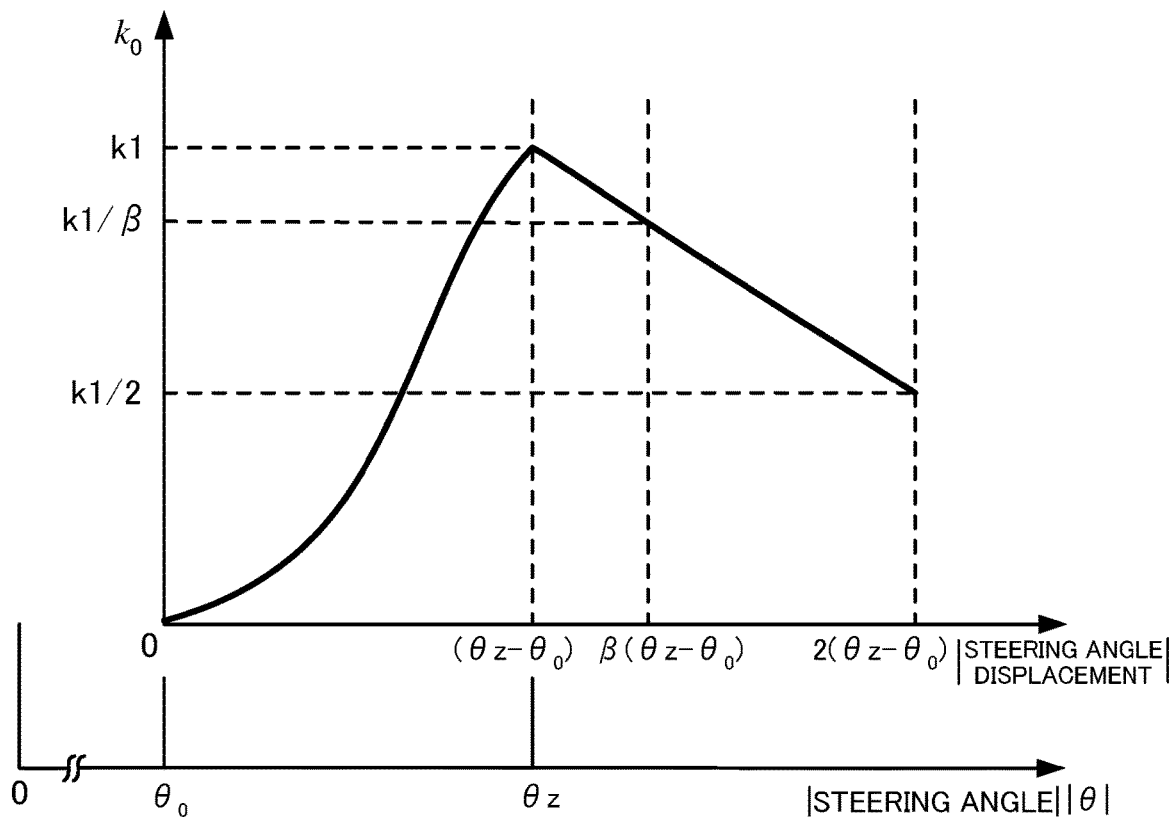
FIG. 43 is a diagram showing an example of changing a spring constant in accordance with the steering angle.

The characteristic of the spring constant $k_0$ is, for example, a characteristic as shown in FIG. 43. In FIG. 43, $θ_0$ is a steering angle corresponding to the predetermined position $x_0$ in front of the rack end, and a steering angle corresponding to the rack displacement x, that is, a steering angle in the case of setting the $θ_0$ to the origin is defined as a steering angle displacement. With respect to the characteristic of the spring constant $k_0$, in a region where the steering angle θ (or to be exact, the magnitude |θ| of the steering angle θ, but referred to the steering angle θ including its magnitude if not confused) does not exceed the threshold θz, the spring constant $k_0$ is increased as the steering angle θ (the rack displacement x in the case of the basic embodiments 3 and 4) is increased, as with the basic embodiments 3 and 4. However, in a region where the steering angle θ exceeds the threshold θz, in the case that a value of the spring constant $k_0$ at the steering angle being θz is k1, a value of the spring constant $k_0$ at the steering angle displacement being $β(θz-θ_0)$ (β>1) is made become k1/β so that a spring force at the steering angle being θz is equal to a spring force at the steering angle displacement being $β(θz-θ_0)$. In this way, limitation of not increasing the rack shaft force ff outputted from the viscoelastic model following control section 520 is performed in the region where the steering angle θ exceeds the threshold θz. Further, adjustment of the above setting enables a change of steering feeling. That is, when the spring constant $k_0$ at the steering angle displacement being $β(θz-θ_0)$ is set lower than the above setting, a resistance (a spring force) at the steering angle displacement being $β(θz-θ_0)$ becomes smaller than a resistance at the steering angle being θz, so that the steering becomes easier. On the contrary, when the spring constant $k_0$ at the steering angle displacement being $β(θz-θ_0)$ is set higher than the above setting, the resistance at the steering angle displacement being $β(θz-θ_0)$ becomes larger than the resistance at the steering angle being θz, so that the steering with feeling a resistance in the direction to the rack end is achieved.

Figure 44:
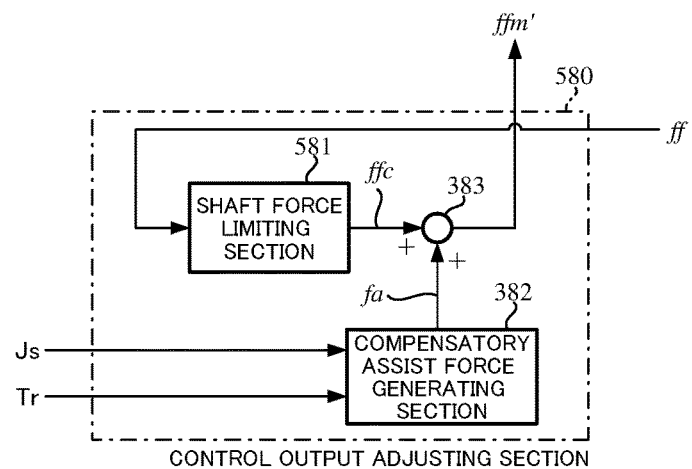
FIG. 44 is a block diagram showing a configuration example (the seventh embodiment) of the control output adjusting section.

A configuration example of a control output adjusting section 580 in the seventh embodiment is shown in FIG. 44. Compared with the configuration example of the control output adjusting section 380 shown in FIG. 37, the shaft force limiting section is changed. Although the shaft force limiting section 381 in the fifth embodiment limits the rack shaft force ff depending on the judgment signal Js, a shaft force limiting section 581 in the seventh embodiment is used in order to prevent the rack shaft force ff from extremely increasing by occurrence of an abnormality or the like, and limits the rack shaft force ff by using a limit value being a predetermined fixed value. Therefore, since the shaft force limiting section 581 does not use the judgment signal Js, the judgment signal Js is not inputted. Moreover, in such a case that the rack shaft force ff is not extremely increased, the shaft force limiting section 581 may be removed.

With respect to operations of the seventh embodiment, compared with the operations of the fifth embodiment, the setting of the spring constant $k_0$ at the viscoelastic model following control section 520 and an operation of the shaft force limiting section 581 in the control output adjusting section 580 are different, and the other operations are the same.

The viscoelastic model following control section 520 obtains the spring constant $k_0$ in accordance with the characteristic shown in FIG. 43 depending on the steering angle θ, in the parameter setting (corresponding to the step S23 in the flowchart shown in FIG. 18) performed at the parameter setting section between the step S202 where the rack displacement x is outputted and the step 203 where the current command value Iref1 is converted to the rack shaft force f in the flowchart shown in FIG. 39.

Figure 45:
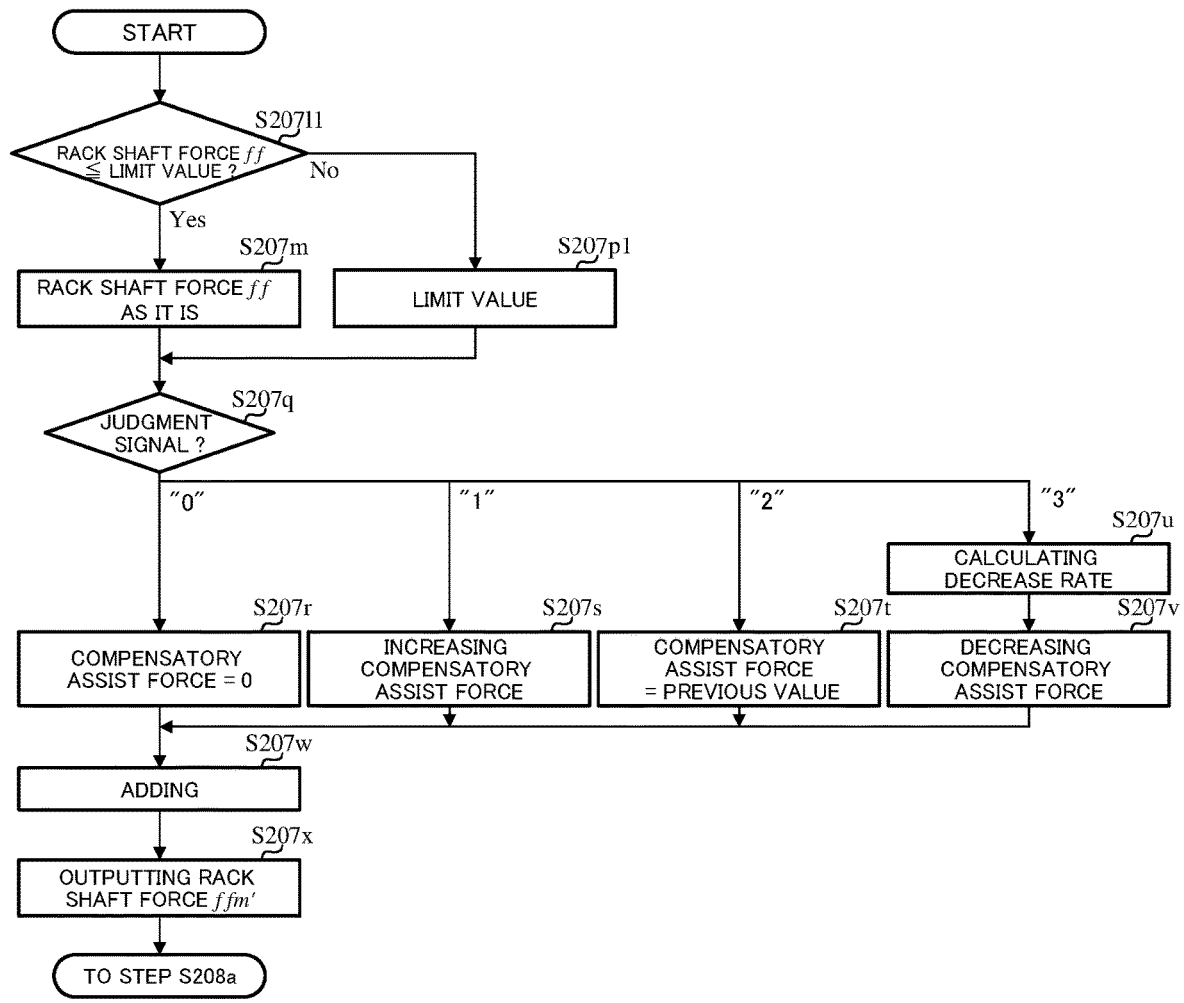
FIG. 45 is a flowchart showing an operating example (the seventh embodiment) of the control output adjusting section.

An operating example of the control output adjusting section 580 will be described with reference to a flowchart shown in FIG. 45. The shaft force limiting section 581 inputting the rack shaft force ff, outputs the rack shaft force ff as the rack shaft force ffc (Step S207m) in the case that the rack shaft force ff is smaller than or equal to the predetermined limit value (fixed value) (Step S2071l). In the case that the rack shaft force ff is larger than the limit value (Step S2071l), the shaft force limiting section 581 outputs the limit value as the rack shaft force ffc (Step S207p1). Afterwards, the control output adjusting section 580 performs the same operations as those of the control output adjusting section 380 in the fifth embodiment (from Step S207q).

Although the seventh embodiment adjusts only the spring constant $k_0$, it is possible to limit the rack shaft force ff by also adjusting the viscous friction coefficient μ depending on the steering angle θ. In this case, it is desired to set a characteristic of the viscous friction coefficient μ to a characteristic of holding a value of the viscous friction coefficient μ at the steering angle being θz in a region where the steering angle θ exceeds the threshold θz. Further, the characteristic of the parameter may be defined as not the characteristic corresponding to the steering angle θ but a characteristic corresponding to the rack displacement x as with the basic embodiments 3 and 4, and may be defined as a characteristic corresponding to the judgment rack position Rx.

The eighth embodiment of the present invention will be described.

The seventh embodiment obtains the effect equivalent to that by limiting the rack shaft force ff, by adjusting the parameter of the viscoelastic model following control section. The eighth embodiment obtains the effect equivalent to that by limiting the rack shaft force ff, by limiting the rack displacement x.

Figure 46:
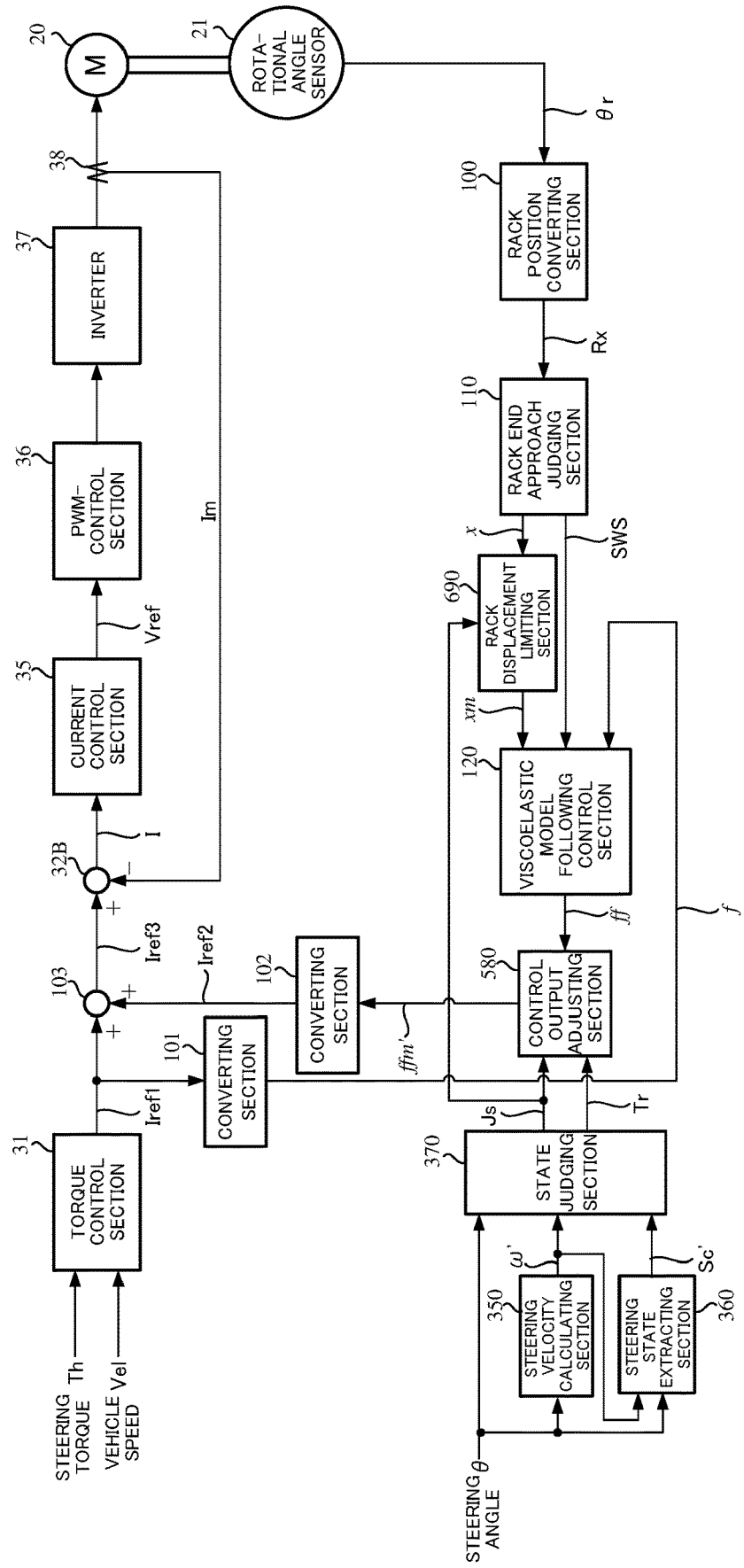
FIG. 46 is a block diagram showing a configuration example (an eighth embodiment) of the present invention.

A configuration example of the eighth embodiment is shown in FIG. 46. Compared with the configuration example of the fifth embodiment shown in FIG. 35, a rack displacement limiting section 690 is provided between the rack end approach judging section 110 and the viscoelastic model following control section 120, and the control output adjusting section 580 in the seventh embodiment is used as a control output adjusting section.

The rack displacement limiting section 690 inputs the rack displacement x and the judgment signal Js, and limits the rack displacement x depending on the judgment signal Js. That is, when the judgment signal Js changes from 0 to 1, the rack displacement limiting section 690 stores the rack displacement x at this time as a rack displacement xf, limits the rack displacement x by using the rack displacement xf as a limit value until the judgment signal Js becomes 0, and outputs the limited rack displacement as a rack displacement xm. When the judgment signal Js is 0, the rack displacement limiting section 690 outputs the rack displacement x as the rack displacement xm. By inputting such a limited rack displacement xm into the viscoelastic model following control section 120, the rack shaft force ff outputted from the viscoelastic model following control section 120 is limited as a result. Since the limitation is performed at the rack displacement limiting section 690, the same control output adjusting section 580 as that in the seventh embodiment is used.

With respect to operations of the eighth embodiment, compared with the operations of the fifth embodiment, an operation of the rack displacement limiting section 690 is added, the operation of the control output adjusting section is the operation of the control output adjusting section 580 in the seventh embodiment.

Figure 47:
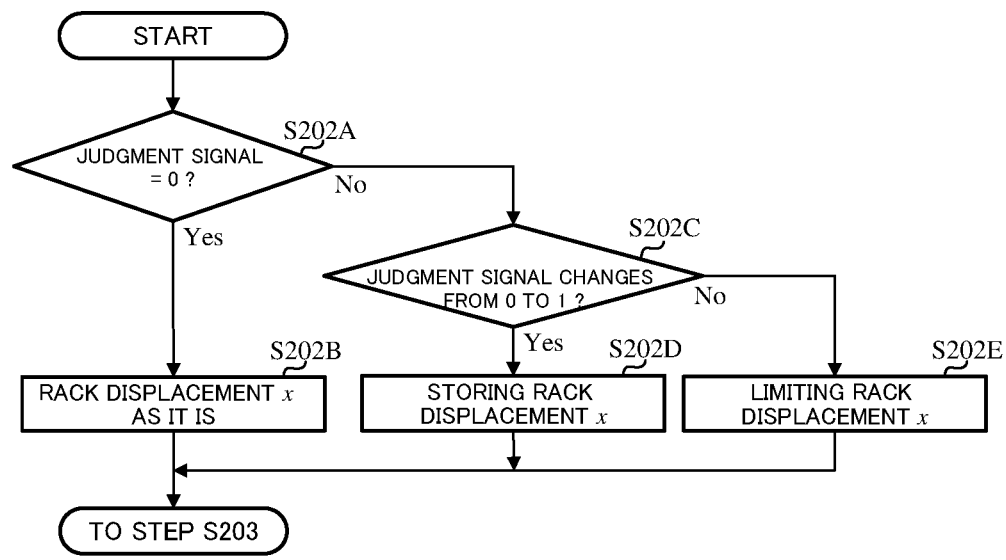
FIG. 47 is a flowchart showing an operating example of a rack displacement limiting section.

The operation of the rack displacement limiting section 690 is added after the step S202 where the rack displacement x is outputted in the flowchart shown in FIG. 39. An operating example of the rack displacement limiting section 690 will be described with reference to a flowchart of FIG. 47. The rack displacement x is inputted into the rack displacement limiting section 690 with the judgment signal Js. The rack displacement limiting section 690 confirms a value of the judgment signal Js. In the case that the judgment signal Js is 0 (Step S202A), the rack displacement limiting section 690 outputs the rack displacement x as the rack displacement xm (Step S202B). In the case that the judgment signal Js is other than 0 (Step S202A), when the judgment signal Js changes from 0 to 1 (Step S202C), the rack displacement limiting section 690 stores the inputted rack displacement x as the rack displacement xf (Step S202D), and outputs the rack displacement xf as the rack displacement xm. Otherwise, the rack displacement limiting section 690 limits the rack displacement x by using the rack displacement xf as a limit value (Step S202E), and outputs the limited rack displacement as the rack displacement xm. The rack displacement xm is inputted into the viscoelastic model following control section 120. Afterwards, the operation continues to the step S203.

The rack displacement limiting section 690 may not limits the rack displacement x by using the rack displacement xf as a limit value until the judgment signal Js becomes 0, but may output the rack displacement xf as the rack displacement xm until the judgment signal Js becomes 0. Further, the rack displacement limiting section 690 may limit not the rack displacement x but the judgment rack position Rx.

By adopting the fifth to the eighth embodiments, the assist force is increased in a steering angle range where the reaction force becomes large. This enables a driver to steer to an actual rack end. Therefore, it is possible to equip these embodiments with the function provided for the fourth embodiment. That is, in the case of actually steering to the rack end (or to be exact, in the case of judging that the steering is performed to the rack end), by using the steering angle (the rack displacement) detected at this time, the rack end approach region is corrected so that the virtual rack end is in an appropriate range to the actual rack end. A configuration example (the ninth embodiment) in this case is basically the same as the configuration examples of the fifth to the eighth embodiments, and an operation of a rack end approach judging section is the operation of the rack end approach judging section in the fourth embodiment.

In the fifth to the ninth embodiments, the rack shaft force ffm' continues to increase in the assist increasing state, and, for example, even in a steering holding state where the steering velocity ω' is zero, the rack shaft force ffm' continues to increase, so that it is possible to put a brake on the increase. For example, a limiter is provided at a rear stage of the control output adjusting section, sets a limit value to zero, and limits the rack shaft force ffm'. Or a limiter is provided at a rear stage of the compensatory assist force generating section in the control output adjusting section, and limits the compensatory assist force fa. As a limit value in the case of limiting the compensatory assist force fa, for example, a value obtained by subtracting a predetermined value Mx from an absolute value of the output (the rack shaft force ffc or ffa) of the shaft force limiting section or the shaft force adjusting section, is used. In the case of setting Mx=0, this case is the same as the case of limiting the rack shaft force ffm' by setting a limit value to zero.

Figure 48:
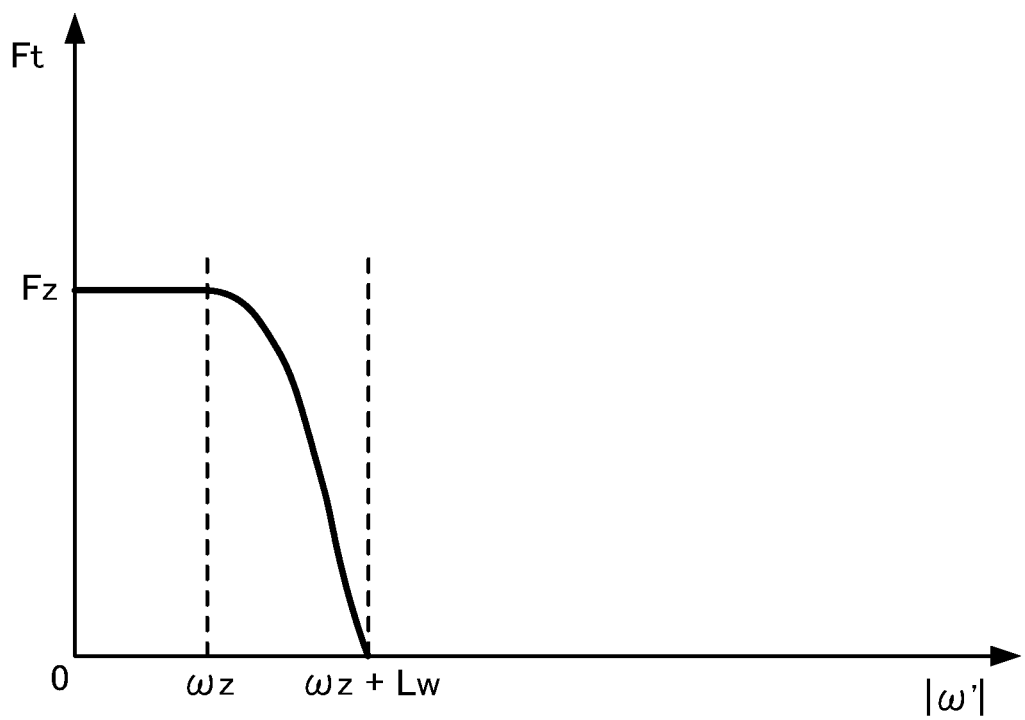
FIG. 48 is a diagram showing an example of changing an increase rate in accordance with the steering velocity.

Although the compensatory assist force generating section increases the compensatory assist force fa at the constant increase rate Ft in proportion to time, it may increase the compensatory assist force fa not proportionally but curvilinearly. Further, it may change the increase rate Ft depending on the magnitude |ω'| of the steering velocity. For example, as shown in FIG. 48, it is possible that until the magnitude |ω'| of the steering velocity becomes the virtual steering velocity ωz, the increase rate Ft is constant at a predetermined value Fz, after the magnitude |ω'| of the steering velocity exceeds the virtual steering velocity ωz, the increase rate Ft is decreased as the magnitude |ω'| of the steering velocity is increased, and the increase rate Ft becomes zero at ωz+Lw (Lw is a fixed value). In the case of decreasing the compensatory assist force fa, the compensatory assist force fa may be decreased curvilinearly, or it is possible to set the decrease rate to a fixed value or a value calculated by another calculation expression.

Although the state judging section performs the judgment by using the magnitudes (the absolute values) of the steering angle θ and the steering velocity ω', it may set positive and negative thresholds and the virtual steering velocity, and may perform the judgment by using the steering angle θ and the steering velocity ω' as they are. In this case, the magnitudes of the thresholds and the virtual steering velocity may be changed depending on whether the value is positive or negative.

In the above embodiments, in the case that the magnitude |θ| of the steering angle is larger than the threshold θz, when the magnitude |ω'| of the steering velocity is smaller than the virtual steering velocity ωz and the steering state signal Sc' is the "turning", Js=1 is set. A condition with respect to the steering torque may be added to these conditions. When a driver intends to steer to the rack end, the steering torque is supposed to be a large value (for example, 10 N·m). Therefore, a threshold Thf (for example, 10 N·m) is set for the steering torque Th, in the case that the magnitude |θ| of the steering angle is larger than the threshold θz, when the magnitude |ω'| of the steering velocity is smaller than the virtual steering velocity ωz, the steering torque Th is larger than the threshold Thf, and the steering state signal Sc' is the "turning", Js=1 is set. In the operating example of adjusting the control output shown in FIG. 40, the judgment in the step S207i becomes that "the magnitude |ω'| of the steering velocity is smaller than the virtual steering velocity ωz, and the magnitude |Th| of the steering torque is larger than the threshold Thf". This enables better judgment of the 'turning".

EXPLANATION OF REFERENCE NUMERALS 1 steering wheel
2 column shaft (steering shaft, handle shaft)
10 torque sensor
12 vehicle speed sensor
13 battery
14 steering angle sensor
20 motor
21 rotational angle sensor
30 control unit (ECU)
31 torque control section
35 current control section
36 PWM-control section
100 rack position converting section
101, 102 converting section
110 rack end approach judging section
120, 520 viscoelastic model following control section
121, 122 switching section
124 parameter setting section
130 feedforward control section
140 feedback control section
150, 350 steering velocity calculating section
160 steering information extracting section
170, 270, 380, 480, 580 control output adjusting section
171, 271 adjustment value setting section
172 control output limiting section
360 steering state extracting section
370 state judging section
381, 581 shaft force limiting section
382 compensatory assist force generating section
481 shaft force adjusting section
690 rack displacement limiting section

The invention claimed is:

1. An electric power steering apparatus that calculates a first current command value based on at least a steering torque, and performs an assist-control of a steering system by driving a motor based on said first current command value, comprising:

a rack end approach judging section that performs judgment of being in a rack end approach region being a predetermined range in front of a rack end based on steering position information, and outputs a rack displacement and a switching signal;

a viscoelastic model following control section that generates a second shaft force, setting a viscoelastic model as a reference model, based on at least one of a first shaft force obtained by performing a first conversion for said first current command value, and said rack displacement, and said switching signal; and a control output adjusting section that sets a limit value for said second shaft force based on at least said steering position information, a steering velocity, and a steering state signal which shows turning or returning, and limits said second shaft force;

wherein said electric power steering apparatus performs said assist-control by correcting said first current command value by a second current command value which is obtained by performing a second conversion for said limited second shaft force.

2. The electric power steering apparatus according to claim 1,
wherein a parameter of said viscoelastic model following control section is changed by said steering position information.

3. The electric power steering apparatus according to claim 1,
wherein said electric power steering apparatus does not perform at least one of said first conversion and said second conversion, and incorporates a conversion coefficient of said not performed conversion into a parameter in said viscoelastic model following control section.

4. The electric power steering apparatus according to claim 1,
wherein when said steering velocity is low, said control output adjusting section sets a first limit value as said limit value so that a control output of said second shaft force becomes weak, and
when said steering velocity is high, said control output adjusting section sets a second limit value as said limit value so that said control output becomes strong.

5. The electric power steering apparatus according to claim 4,
wherein said control output adjusting section changes a mode of a change of said limit value depending on said steering state signal.

6. The electric power steering apparatus according to claim 5,
wherein by setting a threshold for said steering position information, said control output adjusting section separates said rack end approach region into two regions when a steering state is in turning, and makes said rack end approach region to be one region when said steering state in returning; and
wherein said control output adjusting section sets said limit value so that
when said steering position information is in a region far from said rack end and said steering state signal shows turning, or when said steering state signal shows returning, a speed at which said limit value changes from said first limit value to said second limit value corresponding to said steering velocity is faster than a speed at which said limit value changes from said second limit value to said first limit value corresponding to said steering velocity, and when said steering position information is in a region close to said rack end and said steering state signal shows turning, said speed at which said limit value changes from said second limit value to said first limit value corresponding to said steering velocity is faster than said speed at which said limit value changes from said first limit value to said second limit value corresponding to said steering velocity.

7. The electric power steering apparatus according to claim 6,
wherein said control output adjusting section sets said limit value so that
when said steering position information is in said region far from said rack end and said steering state signal shows turning, or when said steering state signal shows returning, said speed at which said limit value changes from said first limit value to said second limit value is a predetermined first value, and said speed at which said limit value changes from said second limit value to said first limit value is zero, and
when said steering position information is in said region close to said rack end and said steering state signal shows turning, said speed at which said limit value changes from said second limit value to said first limit value is a predetermined second value, and said speed at which said limit value changes from said first limit value to said second limit value is zero.

8. The electric power steering apparatus according to claim 6,
wherein said control output adjusting section sets said limit value based on said steering velocity, said steering state signal, said steering position information, and said steering torque, and
even when said steering position information is in said region close to said rack end and said steering state signal shows turning, when said steering torque is smaller than or equal to a predetermined torque threshold, said control output adjusting section sets said speed in a way equivalent to a way when said steering position information is in said region far from said rack end and said steering state signal shows turning, and a way when said steering state signal shows returning.

9. The electric power steering apparatus according to claim 5,
wherein by setting a threshold for said steering position information, said control output adjusting section separates said rack end approach region into a plurality of regions, and said regions include a region far from said rack end and a region close to said rack end; and
wherein said control output adjusting section sets said limit value so that
when said steering position information is in said region far from said rack end and said steering state signal shows turning, or when said steering state signal shows returning, a speed at which said limit value changes from said first limit value to said second limit value corresponding to said steering velocity is faster than a speed at which said limit value changes from said second limit value to said first limit value corresponding to said steering velocity, and
when said steering position information is in said region close to said rack end and said steering state signal shows turning, said speed at which said limit value changes from said second limit value to said first limit value corresponding to said steering velocity is faster than said speed at which said limit value changes from said first limit value to said second limit value corresponding to said steering velocity.

10. The electric power steering apparatus according to claim 9,
wherein said control output adjusting section sets said limit value so that
when said steering position information is in said region far from said rack end and said steering state signal shows turning, or when said steering state signal shows returning, said speed at which said limit value changes from said first limit value to said second limit value is a predetermined first value, and said speed at which said limit value changes from said second limit value to said first limit value is zero, and
when said steering position information is in said region close to said rack end and said steering state signal shows turning, said speed at which said limit value changes from said second limit value to said first limit value is a predetermined second value, and said speed at which said limit value changes from said first limit value to said second limit value is zero.

11. The electric power steering apparatus according to claim 9,
wherein said control output adjusting section sets said limit value based on said steering velocity, said steering state signal, said steering position information, and said steering torque, and
even when said steering position information is in said region close to said rack end and said steering state signal shows turning, when said steering torque is smaller than or equal to a predetermined torque threshold, said control output adjusting section sets said speed in a way equivalent to a way when said steering position information is in said region far from said rack end and said steering state signal shows turning, and a way when said steering state signal shows returning.

12. The electric power steering apparatus according to claim 5,
wherein by setting a threshold for said steering position information, said control output adjusting section separates said rack end approach region into a plurality of regions; and
wherein said control output adjusting section sets said limit value so that
when said steering position information is in a region furthest from said rack end and said steering state signal shows turning, or when said steering state signal shows returning, a speed at which said limit value changes from said first limit value to said second limit value corresponding to said steering velocity is faster than a speed at which said limit value changes from said second limit value to said first limit value corresponding to said steering velocity,
when said steering position information is in a region closest to said rack end and said steering state signal shows turning, said speed at which said limit value changes from said second limit value to said first limit value corresponding to said steering velocity is faster than said speed at which said limit value changes from said first limit value to said second limit value corresponding to said steering velocity, and
when said steering position information is in a region between said region furthest from said rack end and said region closest to said rack end and said steering state signal shows turning, a speed in said region between said region furthest from said rack end and said region closest to said rack end becomes a speed intermediate between said speed in said region furthest from said rack end and said speed in said region closest to said rack end.

13. The electric power steering apparatus according to claim 12,
wherein said control output adjusting section sets said limit value so that
when said steering position information is in said region far from said rack end and said steering state signal shows turning, or when said steering state signal shows returning, said speed at which said limit value changes from said first limit value to said second limit value is a predetermined first value, and said speed at which said limit value changes from said second limit value to said first limit value is zero, and
when said steering position information is in said region close to said rack end and said steering state signal shows turning, said speed at which said limit value changes from said second limit value to said first limit value is a predetermined second value, and said speed at which said limit value changes from said first limit value to said second limit value is zero.

14. The electric power steering apparatus according to claim 12,
wherein said control output adjusting section sets said limit value based on said steering velocity, said steering state signal, said steering position information, and said steering torque, and
even when said steering position information is in said region close to said rack end and said steering state signal shows turning, when said steering torque is smaller than or equal to a predetermined torque threshold, said control output adjusting section sets said speed in a way equivalent to a way when said steering position information is in said region far from said rack end and said steering state signal shows turning, and a way when said steering state signal shows returning.

15. The electric power steering apparatus according to claim 5,
wherein when said steering velocity is low including zero and the steering state signal shows turning, said control output adjusting section gradually changes said limit value so that said corrected first current command value is increased at a substantially constant rate.

16. The electric power steering apparatus according to claim 1,
wherein said control output adjusting section sets said limit value depending on a steering direction.

17. The electric power steering apparatus according to claim 1,
wherein said control output adjusting section sets said limit value based on said first shaft force.

18. The electric power steering apparatus according to claim 1,
wherein in a case of judging that steering is performed to said rack end, said rack end approach judging section updates a set value which determines said predetermined range in front of said rack end.

19. The electric power steering apparatus according to claim 18,
wherein when said steering position information exceeds a virtual end threshold which is set near said rack end, said rack end approach judging section judges that said steering is performed to said rack end, and updates said set value based on said steering position information exceeding said virtual end threshold.

20. The electric power steering apparatus according to claim 1,
wherein said steering position information is one of at least a steering angle, a rack position and said rack displacement.

21. The electric power steering apparatus according to claim 1,
wherein said rack displacement is equivalent to a column shaft angle.

22. An electric power steering apparatus that calculates a first current command value based on at least a steering torque, and performs an assist-control of a steering system by driving a motor based on said first current command value, comprising:
a rack end approach judging section that performs judgment of being in a rack end approach region being a predetermined range in front of a rack end based on steering position information, and outputs a rack displacement and a switching signal;
a viscoelastic model following control section that generates a second shaft force, setting a viscoelastic model as a reference model, based on at least one of a first shaft force obtained by performing a first conversion for said first current command value, and said rack displacement, and said switching signal; and
a state judging section that sets a threshold for separating said rack end approach region into two regions, judges a state of approaching said rack end based on at least a result of comparing said steering position information with said threshold, a steering velocity, and a steering state signal which shows turning or returning, and outputs a judgment signal; and
a control output adjusting section that adjusts said second shaft force based on said judgment signal;
wherein said electric power steering apparatus performs said assist-control by correcting said first current command value by a second current command value which is obtained by performing a second conversion for said adjusted second shaft force.

23. The electric power steering apparatus according to claim 22,
wherein a parameter of said viscoelastic model following control section is changed in accordance with said steering position information.

24. The electric power steering apparatus according to claim 23,
wherein in a case of judging said state of approaching said rack end as an assist increasing state where a magnitude of said steering position information exceeds said threshold, said steering velocity is smaller than a predetermined magnitude, and said steering state signal shows turning, from said judgment signal, said control output adjusting section increases said second shaft force at a preset increase rate; and
wherein a parameter of said viscoelastic model following control section is set so that said second shaft force outputted from said viscoelastic model following control section, is substantially constant in a range where a magnitude of said steering position information exceeds said threshold.

25. The electric power steering apparatus according to claim 23,
wherein in a case of judging said state of approaching said rack end as an assist increasing state where a magnitude of said steering position information exceeds said threshold, said steering velocity is smaller than a predetermined magnitude, said steering torque is larger than a predetermined value, and said steering state signal shows turning, from said judgment signal, said control output adjusting section increases said second shaft force at a preset increase rate; and wherein a parameter of said viscoelastic model following control section is set so that said second shaft force outputted from said viscoelastic model following control section, is substantially constant in a range where a magnitude of said steering position information exceeds said threshold.

26. The electric power steering apparatus according to claim 22, wherein said electric power steering apparatus does not perform at least one of said first conversion and said second conversion, and incorporates a conversion coefficient of said not performed conversion into a parameter in said viscoelastic model following control section.

27. The electric power steering apparatus according to claim 22, wherein in a case of judging said state of approaching said rack end as an assist increasing state where a magnitude of said steering position information exceeds said threshold, said steering velocity is smaller than a predetermined magnitude, and said steering state signal shows turning, from said judgment signal, said control output adjusting section increases said second shaft force at a preset increase rate.

28. The electric power steering apparatus according to claim 27, wherein said control output adjusting section increases said second shaft force based on said second shaft force which has been stored from a time of becoming said assist increasing state.

29. The electric power steering apparatus according to claim 27, wherein said electric power steering apparatus further comprises a rack displacement limiting section that stores said steering position information at a time of becoming said assist increasing state, and limits said rack displacement inputted into said viscoelastic model following control section, in at least said assist increasing state by using said stored steering position information.

30. The electric power steering apparatus according to claim 22, wherein in a case of judging said state of approaching said rack end as an assist increasing state where a magnitude of said steering position information exceeds said threshold, said steering velocity is smaller than a predetermined magnitude, said steering torque is larger than a predetermined value, and said steering state signal shows turning, from said judgment signal, said control output adjusting section increases said second shaft force at a preset increase rate.

31. The electric power steering apparatus according to claim 30, wherein said control output adjusting section increases said second shaft force based on said second shaft force which has been stored from a time of becoming said assist increasing state.

32. The electric power steering apparatus according to claim 30, wherein said electric power steering apparatus further comprises a rack displacement limiting section that stores said steering position information at a time of becoming said assist increasing state, and limits said rack displacement inputted into said viscoelastic model following control section, in at least said assist increasing state by using said stored steering position information.

33. The electric power steering apparatus according to claim 22, wherein in a case of judging that steering is performed to said rack end, said rack end approach judging section updates a set value which determines said predetermined range in front of said rack end.

34. The electric power steering apparatus according to claim 33, wherein when said steering position information exceeds a virtual end threshold which is set near said rack end, said rack end approach judging section judges that said steering is performed to said rack end, and updates said set value based on said steering position information exceeding said virtual end threshold.

35. The electric power steering apparatus according to claim 22, wherein said steering position information is one of at least a steering angle, a rack position and said rack displacement.

36. The electric power steering apparatus according to claim 22, wherein said rack displacement is equivalent to a column shaft angle.

\* \* \* \* \*